(12) United States Patent
McVickers

(10) Patent No.: US 7,659,680 B1
(45) Date of Patent: Feb. 9, 2010

(54) MOTOR BATTERY SYSTEMS

(76) Inventor: Jack C. McVickers, 9642 E. Windrose Dr., Scottsdale, AZ (US) 85260

( * ) Notice: Subject to any disclaimer, the term of this patent is extended or adjusted under 35 U.S.C. 154(b) by 0 days.

(21) Appl. No.: 12/508,507

(22) Filed: Jul. 23, 2009

Related U.S. Application Data

(63) Continuation-in-part of application No. 11/963,639, filed on Dec. 21, 2007, now Pat. No. 7,576,507.

(60) Provisional application No. 60/901,447, filed on Feb. 14, 2007.

(51) Int. Cl.
 *H02K 1/00* (2006.01)
(52) U.S. Cl. .................. 318/538; 318/542; 318/558; 310/40 R; 310/46; 310/66; 310/179; 310/254
(58) Field of Classification Search ......... 318/538–542, 318/558; 310/40 R, 46, 66, 179, 254
See application file for complete search history.

(56) References Cited

U.S. PATENT DOCUMENTS

| | | | |
|---|---|---|---|
| 3,757,846 A | 9/1973 | Herman | |
| 4,201,635 A | 5/1980 | Muller | |
| 4,319,152 A | 3/1982 | van Gils | |
| 4,484,097 A | 11/1984 | Kanayama et al. | |
| 4,893,042 A | 1/1990 | Tanaka | |
| 5,177,392 A | 1/1993 | Scott | |
| 5,240,569 A | 8/1993 | Waldron | |
| 5,869,200 A * | 2/1999 | Nunnally | 429/10 |
| 5,923,106 A | 7/1999 | Isaak et al. | |
| 5,965,965 A | 10/1999 | Umeda et al. | |
| 6,278,210 B1 | 8/2001 | Fatula, Jr. et al. | |
| 6,664,693 B2 | 12/2003 | Leger et al. | |
| 6,670,721 B2 | 12/2003 | Lof et al. | |
| 6,674,203 B2 | 1/2004 | Kurahashi et al. | |
| 6,720,102 B2 | 4/2004 | Edwards | |
| 6,741,440 B2 * | 5/2004 | O'Brien | 361/143 |
| 6,787,951 B2 | 9/2004 | Maslov et al. | |
| 6,984,913 B2 | 1/2006 | Neuenschwander | |
| 6,995,492 B1 | 2/2006 | Kouda et al. | |
| 7,129,614 B2 | 10/2006 | Hahn et al. | |
| 2004/0070309 A1 | 4/2004 | Nomura et al. | |
| 2009/0038408 A1 | 2/2009 | Lu et al. | |

\* cited by examiner

*Primary Examiner*—Bentsu Ro
*Assistant Examiner*—David S Luo
(74) *Attorney, Agent, or Firm*—Stoneman Volk Patent Group; Martin L. Stoneman; Michael D. Volk, Jr.

(57) ABSTRACT

A combined motor-battery system comprising an electric power source adapted to convert self-originating electrical current to mechanical power utilizing a set of common functional structures. Preferred embodiments include an electrochemical cell comprising field reactive electrodes that directly produce extractable mechanical forces in the presence of a magnetic field.

39 Claims, 27 Drawing Sheets

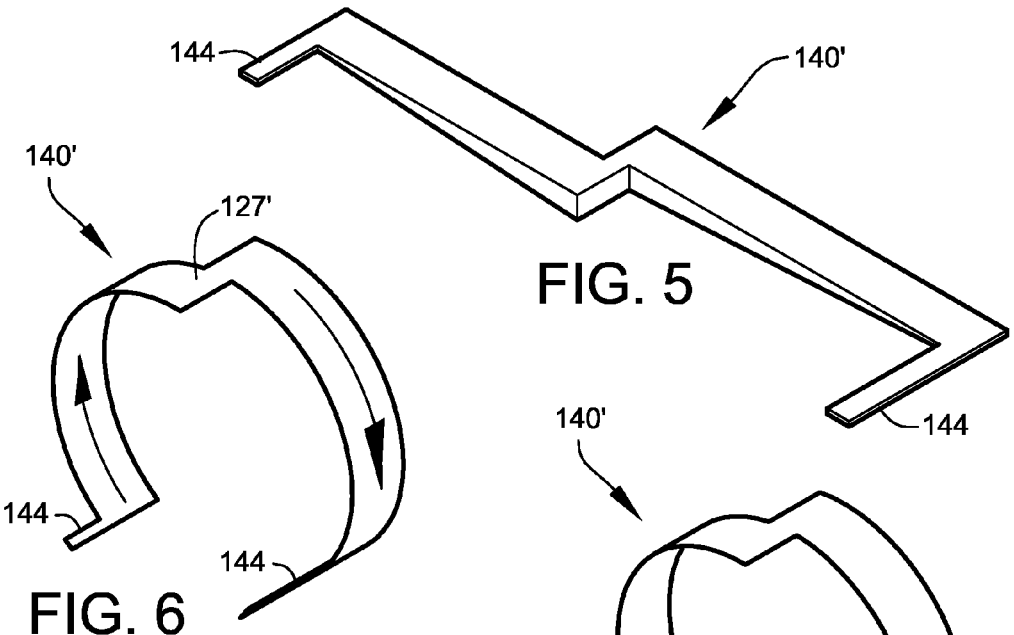
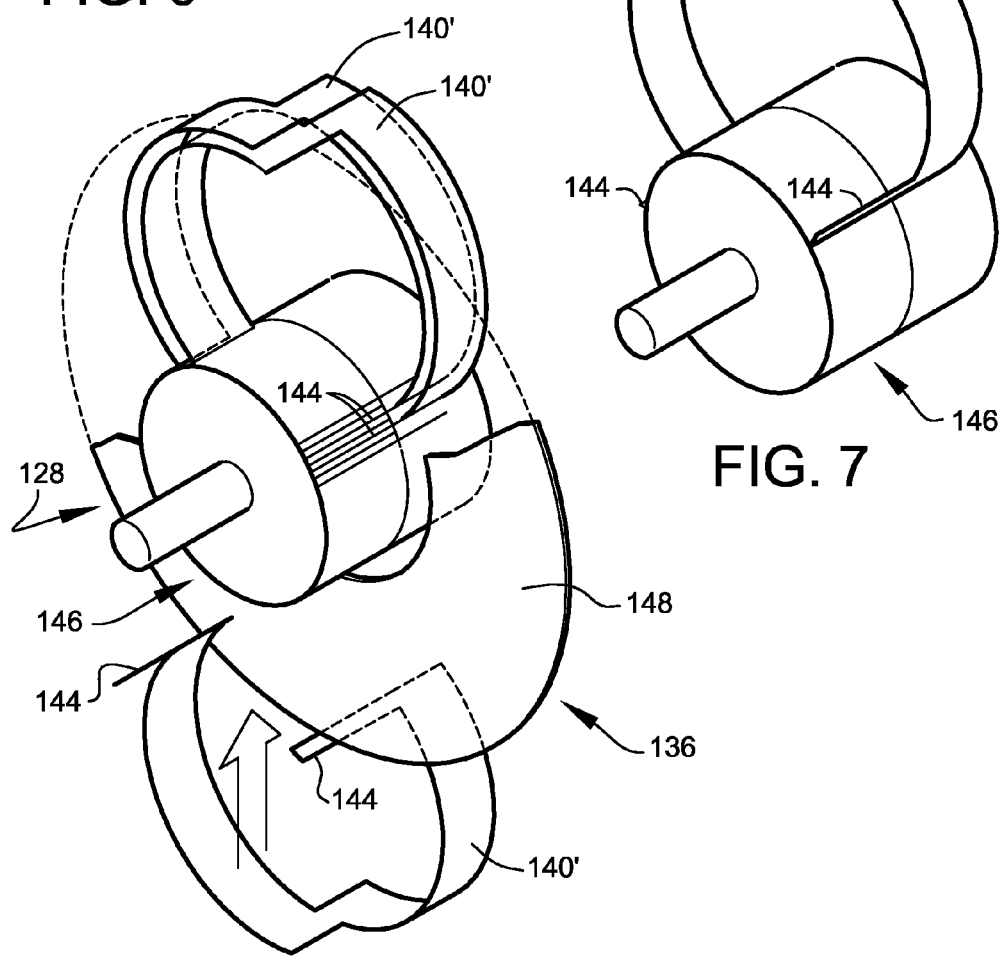

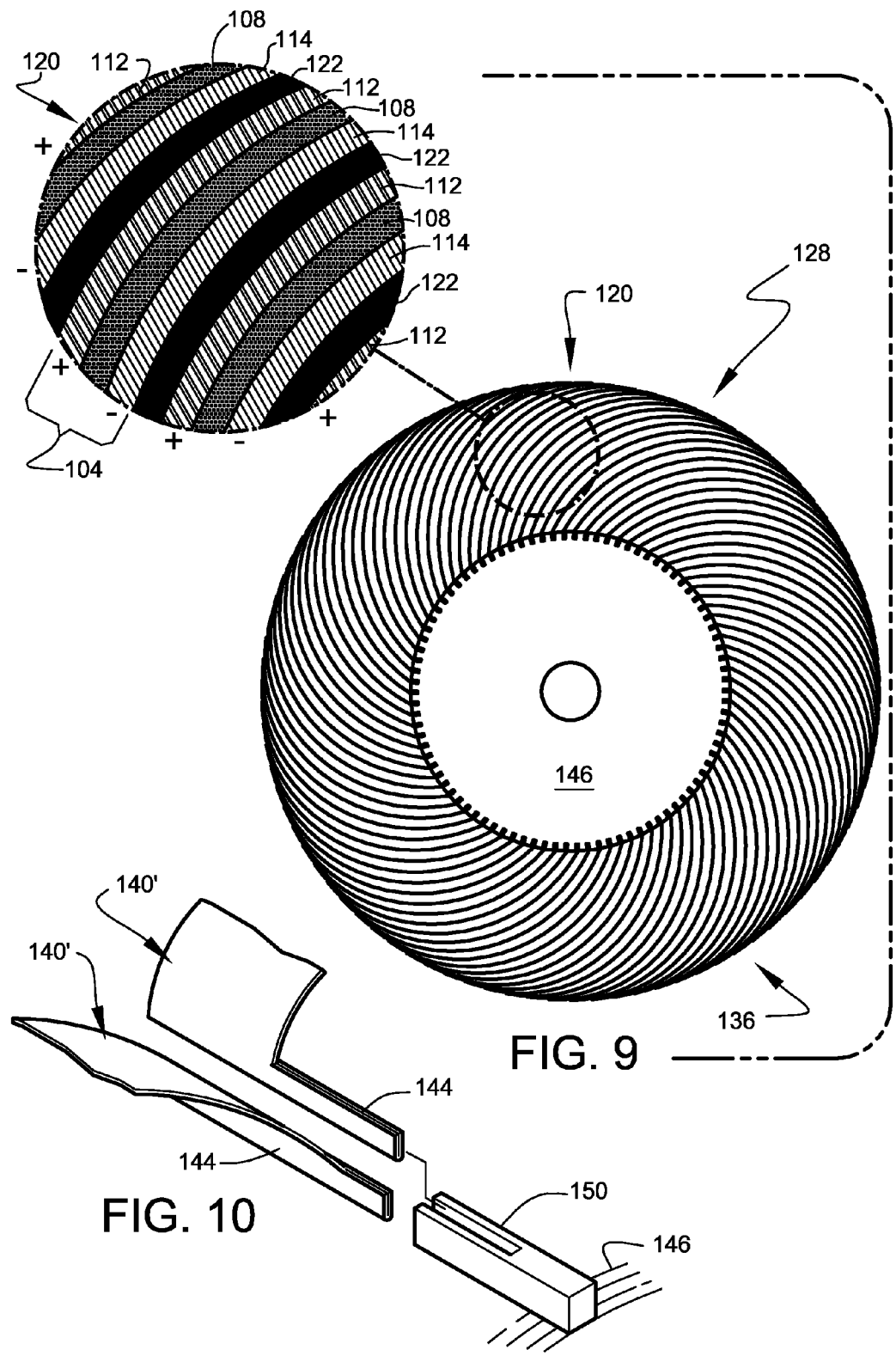

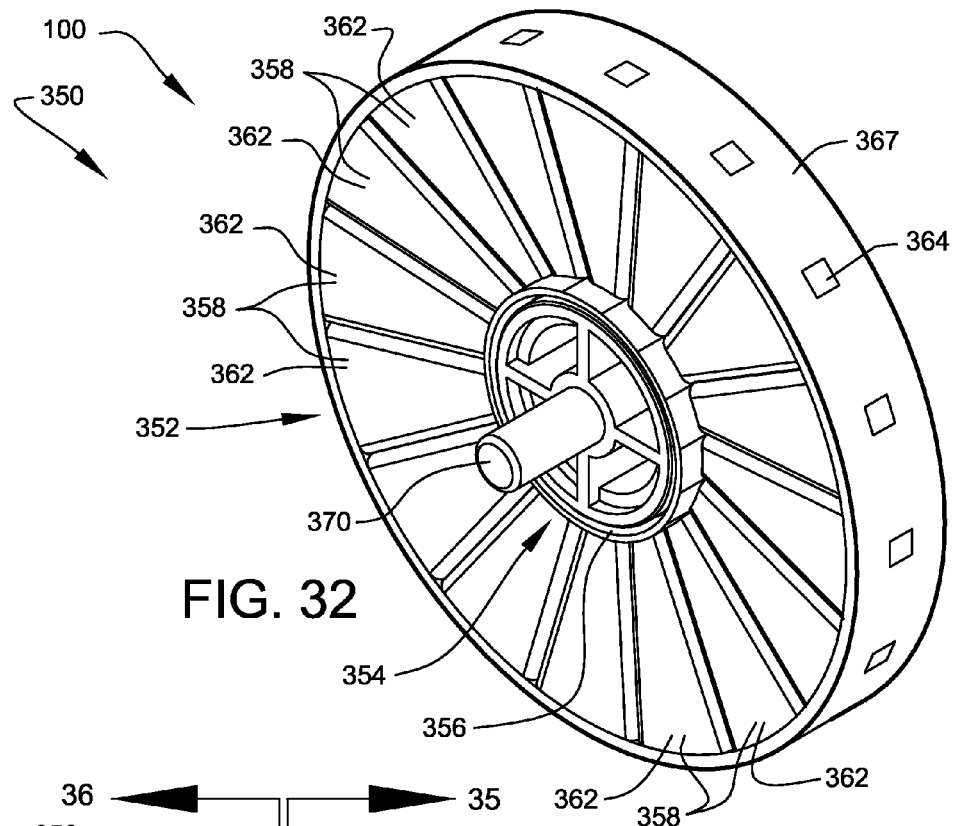
FIG. 32
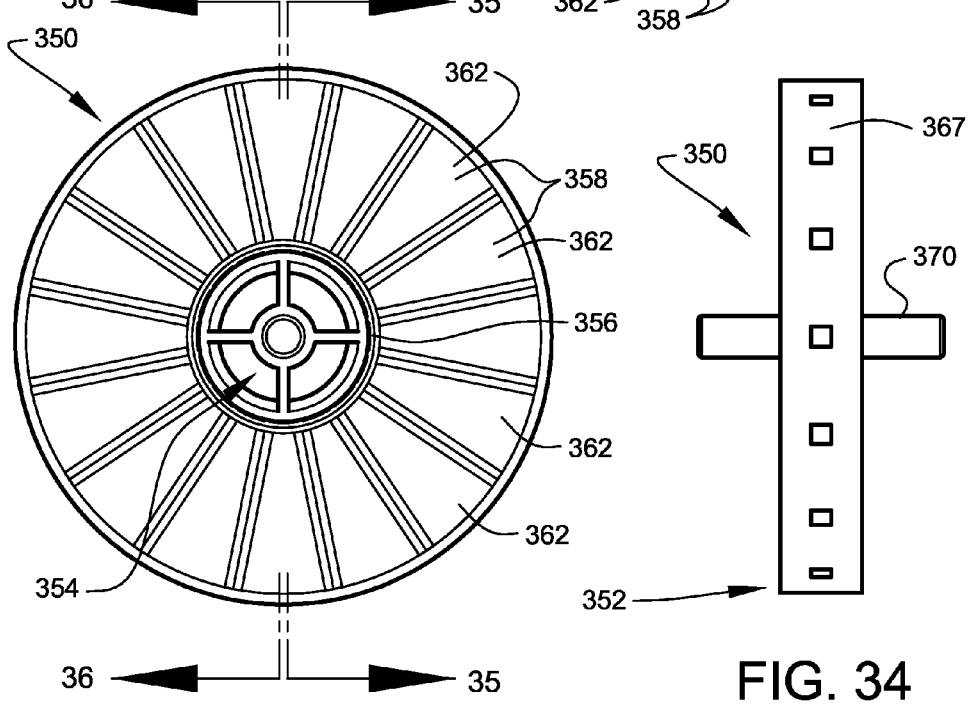
FIG. 33
FIG. 34

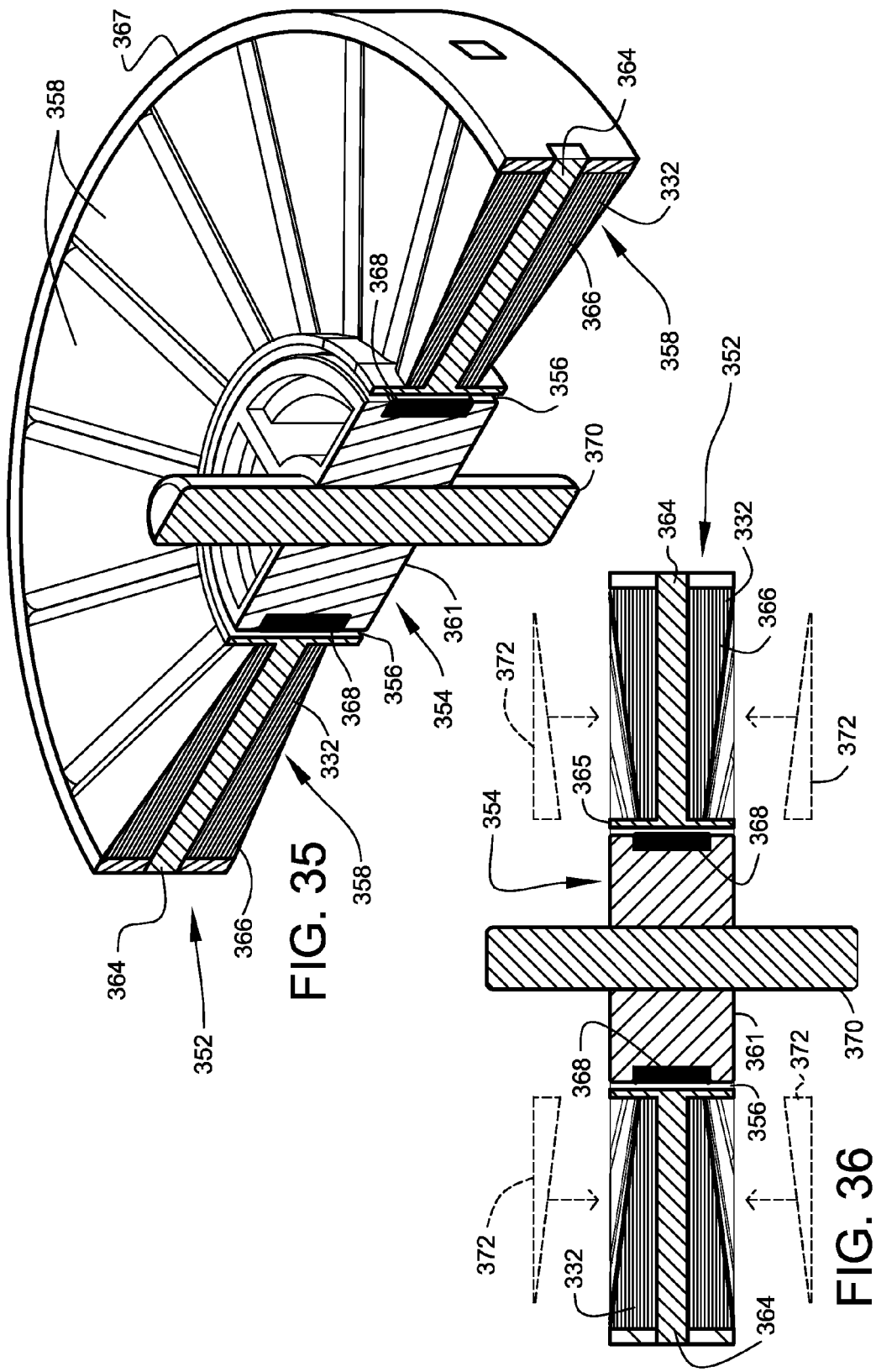

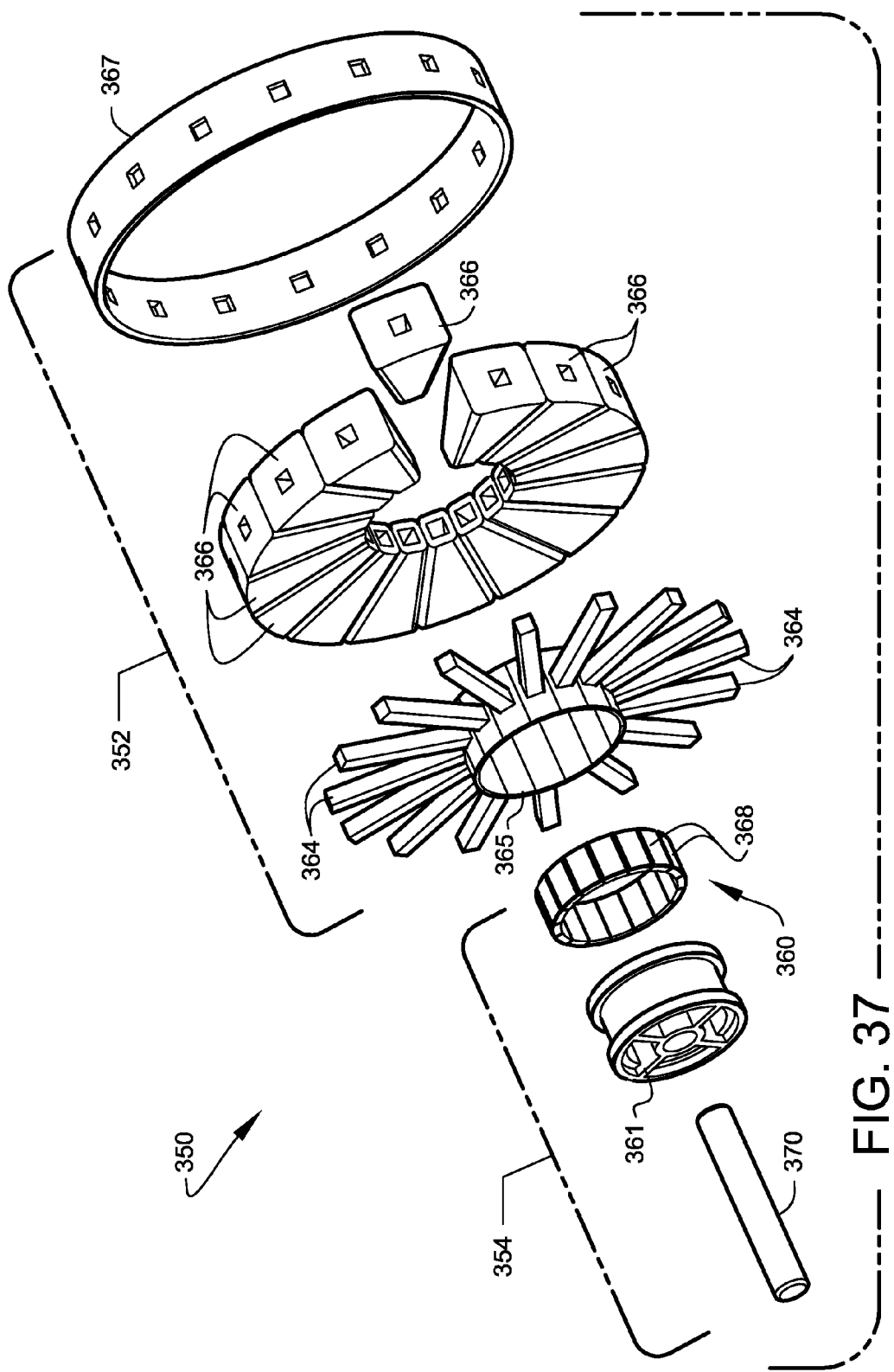

MOTOR BATTERY SYSTEMS

CROSS REFERENCE TO RELATED APPLICATION

The present application is a continuation-in-part of related application Ser. No. 11/963,639, filed Dec. 21, 2007, entitled "MOTOR BATTERY SYSTEMS", which is related to and claims priority from prior provisional application Ser. No. 60/901,447, filed Feb. 14, 2007, entitled "MOTOR BATTERY SYSTEMS", the contents of both of which are incorporated herein by this reference and are not admitted to be prior art with respect to the present invention by the mention in this cross-reference section.

BACKGROUND

This invention relates to improved motor-battery systems. More particularly, this invention relates to electric power sources adapted to convert self-generated electrical current to mechanical power utilizing a set of common functional structures.

The performance of most moving mechanical systems is dependent on the overall weight (mass) of the system as it is accelerated or decelerated by a force-generating component. For example, in a motor-driven vehicle, performance is substantially dependent on the power output of the motor in relation to the overall weight of the vehicle. The term "power-to-weight ratio" is often used as an indication of likely performance. In general, the larger the "power-to-weight ratio" the more performance can be expected from the system. Improving power to weight ratio is accomplished in one of two ways. First, the power output of the driving motor can be increased to more easily overcome the inherent inertia of the system. Secondly, the overall mass of the system can be reduced to maximize the motor's ability to accelerate the system.

Foremost among the challenges to designers of motor driven systems is increased performance through the overall reduction in weight within the system. One possible approach to the reduction in system weight is the elimination of redundant structures within the system's operational functions. Reductions in overall weight are vital to producing systems of acceptable commercial performance and operational range. The development of new technologies that effectively reduce redundancy within operational structures would be of great benefit in a diverse range of technologies.

OBJECTS AND FEATURES OF THE INVENTION

A primary object and feature of the present invention is to overcome the above-described problems. Another primary object and feature of the present invention is to provide a motor-battery system combining essential electric motor and electrochemical battery functions into a common set of structures, thus reducing overall mass of the system.

It is a further object and feature of the present invention to provide such a system that is self-contained and carries its own source of energy. It is another object and feature of the present invention to provide such a system that provides and stores electrical power. It is a further object and feature of the present invention to provide such a system that can be electrically recharged from an onboard or external source.

It is another object and feature of the present invention to provide such a system that is configurable to function both as a motor and as a generator (e.g., to provide regenerative braking in electric or hybrid-electric vehicles). It is an additional object and feature of the present invention to provide such a system that is readily controllable, allowing starting, stopping, and operating at various speeds. It is a further object and feature of the present invention to provide such a system that can be configured to function as an energy-storing flywheel. A further primary object and feature of the present invention is to provide such a system that is efficient, inexpensive, and useful. Other objects and features of this invention will become apparent with reference to the following descriptions.

SUMMARY OF THE INVENTION

In accordance with a preferred embodiment hereof, this invention provides a power system comprising: magnetic field source means for producing at least one magnetic field having lines of flux extending in at least one first direction; electrochemical energy source means for producing at least one electrical potential from at least one electrochemical process; and positioner means for positioning such electrochemical energy source means in at least one position of interaction with such at least one magnetic field; wherein such electrochemical energy source means comprises electrode conductor means for conducting at least one flow of electrical current, derived from such at least one electrical potential, in at least one second direction generally perpendicular to such first direction; wherein such interaction between such at least one electric current and such at least one magnetic field produces at least one magnetic force acting on such electrochemical energy source means in at least one third direction generally perpendicular to both such at least one first direction and such at least one second direction; and wherein action of such at least one magnetic force extractable from such electrochemical energy source means as mechanical energy.

Moreover, it provides such a power system wherein: such positioner means comprises motion enabler means for enabling relative motion between such electrochemical energy source means and such magnetic field means; influence of such at least one force vector on such electrochemical energy source means produces such relative motion; and such relative motion comprises mechanical work extractable from such power system. Additionally, it provides such a power system wherein: such electrode conductor means comprises magnetic field concentrator means for concentrating such at least one magnetic field; whereby magnetic field interaction with such at least one electric current is enhanced. Also, it provides such a power system wherein: such motion enabler means comprises rotator means for allowing rotation of such electrochemical energy source means about at least one rotational axis; such at least one rotational axis comprises an orientation non-parallel with such third direction; and such at least one magnetic force produces at least one rotational torque about such at least one rotational axis.

In accordance with another preferred embodiment hereof, this invention provides a power system comprising: at least one magnetic field source structured and arranged to produce at least one magnetic field having lines of flux extending in at least one first direction; at least one electrochemical energy source structured and arranged to produce at least one electrical potential from at least one electrochemical process; and at least one positioner structured and arranged to position such at least one electrochemical energy source in at least one position of interaction with such at least one magnetic field; wherein such at least one electrochemical energy source comprises at least one electrode structured and arranged to conduct at least one flow of electrical current, derived from such at least one electrical potential, in at least one second direction perpendicular to such first direction; wherein such interaction between such at least one electric current and such at least one magnetic field produces at least one magnetic force acting on such at least one electrochemical energy source in a third direction perpendicular to both such at least one first direction and such at least one second direction; and wherein action of such at least one magnetic force on such at least one electrochemical energy source produces at least one useable mechanical force.

In addition, it provides such a power system wherein: such at least one positioner comprises at least one motion enabler structured and arranged to enable relative motion between such at least one electrochemical energy source and such at least one magnetic field source; influence of such at least one force vector on such at least one electrochemical energy source produces such relative motion; and such relative motion comprises mechanical work extractable from such power system. And, it provides such a power system wherein such at least one electrode comprises at least one magnetic field concentrator structured and arranged to concentrate such at least one magnetic field to enhance magnetic field interaction with such at least one electric current conducted within such at least one electrode. Further, it provides such a power system wherein: such at least one motion enabler comprises at least one rotator structured and arranged to allow rotation of such at least one electrochemical energy source about at least one rotational axis; such at least one rotational axis comprises an orientation non-parallel with such third direction; and such at least one magnetic force produces at least one rotational torque about such at least one rotational axis.

Even further, it provides such a power system wherein: such at least one electrochemical energy source comprises at least one electrochemical cell; such at least one electrochemical cell comprises at least one electrolyte structured and arranged to support such at least one electrochemical process, and such at least one electrode; such at least one electrode is conductively coupled with such at least one electrolyte; and such at least one electrode comprises at least one electrically conductive anode portion and at least one electrically conductive cathode portion each one structured and arranged to conduct at least one electrical charge generated by such at least one electrochemical process. Moreover, it provides such a power system wherein: such at least one electrically conductive anode portion and such at least one electrically conductive cathode portion each comprise at least one magnetically conductive material; such at least one electrically conductive anode portion and such at least one electrically conductive cathode portion are oriented to comprise at least one interstitial space; and such at least one electrolyte is laminated between such at least one electrically conductive anode portion and such at least one electrically conductive cathode portion substantially within such at least one interstitial space.

Additionally, it provides such a power system wherein such at least one electrochemical energy source comprises a plurality of such at least one electrochemical cells. Also, it provides such a power system wherein each such at least one electrochemical cell of such plurality comprises at least one electrical insulator structured and arranged to insulate electrically such at least one electrically conductive anode portion from such electrically conductive cathode portion of at least one adjacent such at least one electrochemical cell. In addition, it provides such a power system wherein: such plurality of such at least one electrochemical cells comprise at least one radial armature comprising at least one generally radial arrangement of such at least one electrochemical cells about such at least one rotational axis; and such at least one magnetic field source comprises at least one stator structured and arranged to allow rotation of such at least one radial armature within such at least one magnetic field. And, it provides such a power system wherein such rotator comprises at least one drive shaft structured and arranged to transfer torque from such at least one radial armature.

Further, it provides such a power system wherein such at least one electrochemical cells are electrically coupled to form at least one laminated coil. Even further, it provides such a power system wherein such at least one electrochemical cells are electrically coupled to form at least one parallel circuit. Moreover, it provides such a power system wherein such at least one electrochemical cells are electrically coupled to form at least one series circuit. Additionally, it provides such a power system further comprising at least one current controller structured and arranged to control levels of current interacting with such at least one magnetic field. Also, it provides such a power system wherein such at least one electrochemical cell comprises at least one secondary-type cell. In addition, it provides such a power system wherein such at least one current controller comprises at least one recharging circuit. And, it provides such a power system wherein such at least one magnetic field source comprises at least one electromagnetic field generator. Further, it provides such a power system wherein such at least one magnetic field source comprises at least one permanent magnet.

Even further, it provides such a power system further comprising at least one commutator structured and arranged to control current flow. Even further, it provides such a power system wherein such at least one commutator comprises at least one coordinator to coordinate the interaction of such at least one magnetic field and such at least one electrical current. Even further, it provides such a power system further comprising: at least one auxiliary energy source structured and arranged to recharge such at least one secondary-type cell; and at least one external electrical connection structured and arranged to recharge such at least one secondary-type cell from such at least one auxiliary energy source.

Furthermore, it provides such a power system wherein: such at least one radial armature comprises at least two discrete groupings of such plurality of such at least one electrochemical cells; at least one of such at least two discrete groupings is structured and arranged to interact with such at least one magnetic field to produce extractable power; and at least one of at least one of such at least two discrete groupings is isolated from such at least one magnetic field to allow at least one alternate non-power-producing function. Even further, it provides such a power system wherein such at least one alternate non-power-producing function comprises heat dissipation from such at least one of such at least two discrete groupings. Even further, it provides such a power system wherein such at least one alternate non-power-producing function comprises electrical recharging of such at least one of such at least two discrete groupings. Even further, it provides such a power system wherein such at least one radial armature comprises at least one flywheel assembly structured and arranged to store extractable kinetic energy.

In accordance with a preferred embodiment hereof, this invention provides a method related to making at least one wound magnetic field coil for a rotary electric device, such at least one wound magnetic field coil comprising at least one magnetically conductive core, such method comprising the steps of: providing at least one electrically-conductive thin-film battery cell; and winding such at least one electrically-conductive thin-film battery cell around the at least one magnetically conductive core to form at least one magnetic-fieldproducing battery-coil; wherein such at least one electrically-conductive thin-film battery cell is structured and arranged to produce electrical current derived from at least one electrochemical process; and such electrical current is usable to generate at least one magnetic field within such at least one magnetic-field-producing battery-coil. Moreover, it provides such a method wherein such at least one electrically-conductive thin-film battery cell comprises: at least one supportive substrate structured and arranged to support at least one cathode current collector, in operative relation with such at least one cathode current collector, at least one cathode; in operative relation with such at least one cathode, at least one electrolyte structured and arranged to support such at least one electrochemical process, in operative relation with such at least one electrolyte, at least one anode, and in operative relation with such at least one anode, at least one anode current collector; wherein such at least one supportive substrate comprises at least one substantially flexible ribbon having a longitudinal length substantially greater that its maximum width. Additionally, it provides such a method wherein such at least one electrically-conductive thin-film battery cell comprises at least one lithium-based chemistry. Also, it provides such a method further comprising the step of incorporating such at least one magnetic-field-producing battery-coil into at least one electromotive device structured and arranged to produce at least one useable mechanical force.

In accordance with another preferred embodiment hereof, this invention provides a combined electric motor-battery system comprising: at least one stator and at least one rotor separated from each other by at least one radial air gap for electromotive interaction therebetween; wherein such at least one stator comprises at least one stator magnetic field source structured and arranged to produce at least one salient magnetic pole oriented so as to face such at least one rotor through such radial air gap; wherein such at least one rotor comprises at least one rotor magnetic field source structured and arranged to produce at least one salient magnetic pole oriented so as to face such at least one stator through such radial air gap; wherein at least one of such at least one stator magnetic field source and such at least one rotor magnetic field source comprises at least one wound magnetic field coil; wherein such at least one wound magnetic field coil comprises at least one magnetically conductive core, and at least one field winding; wherein such at least one field winding is structured and arranged to produce electrical current derived from at least one electrochemical process; wherein such electrical current is used to energize such at least one wound magnetic field coil to produce such at least one salient magnetic pole; and wherein the electromotive interaction generated between at least two of such at least one salient magnetic poles is converted into motive power output.

In addition, it provides such a combined electric motor-battery system wherein such at least one field winding comprises at least one electrically-conductive thin-film battery cell. And, it provides such a combined electric motor-battery system wherein such at least one electrically-conductive thin-film battery cell comprises: at least one supportive substrate structured and arranged to support at least one cathode current collector, in operative relation with such at least one cathode current collector, at least one cathode; in operative relation with such at least one cathode, at least one electrolyte structured and arranged to support such at least one electrochemical process, in operative relation with such at least one electrolyte, at least one anode, and in operative relation with such at least one anode, at least one anode current collector; wherein such at least one supportive substrate comprises at least one substantially flexible ribbon having a longitudinal length substantially greater that its maximum width.

Further, it provides such a combined electric motor-battery system further comprising: at least one at least one commutator structured and arranged to dynamically control current flow within such at least one wound magnetic field coil; wherein such at least one stator comprises a plurality of such at least one wound magnetic field coils, each one structured and arranged to generate one such at least one salient magnetic pole of such at least one stator; wherein such at least one rotor comprises a plurality of permanent magnets, each one structured and arranged to generate one such at least one salient magnetic pole of such at least one rotor; wherein such plurality of permanent magnets are arranged along at least one outer periphery of such at least one rotor; wherein such at least one rotor is rotatably supported within such at least one stator; wherein each such at least one salient magnetic pole of such at least one rotor comprises at least one relational arrangement to each such at least one salient magnetic pole of such at least one stator enabling, in combination with the dynamic control of current flow within such plurality of such at least one wound magnetic field coils, rotation of such at least one rotor due to armature reaction between such at least one stator and such at least one rotor. Even further, it provides such a combined electric motor-battery system wherein such at least one electrically-conductive thin-film battery cell comprises at least one lithium-based chemistry.

In accordance with another preferred embodiment hereof, this invention provides a method related to converting a conventional rotary electric device to at least one combined electric motor-battery, such method comprising the steps of: substantially removing conventional magnetic windings from at least one magnetically-conductive core of the conventional rotary electric device; providing at least one electrically-conductive thin-film battery cell; and winding such at least one electrically-conductive thin-film battery cell around the at least one magnetically-conductive core to form at least one magnetic-field-producing battery-coil; wherein such at least one electrically-conductive thin-film battery cell is structured and arranged to produce electrical current derived from at least one electrochemical process; and such electrical current is usable to generate at least one magnetic field within such at least one magnetic-field-producing battery-coil.

In accordance with another preferred embodiment hereof, this invention provides a power system related to the production of at least one useable mechanical force using at least one magnetic field source structured and arranged to produce at least one magnetic field having lines of flux extending in at least one first direction, such power system comprising: at least one magnetically-conductive substrate to provide magnetically-conductive support; deposited on such at least one magnetically-conductive substrate, at least one electrochemical energy source structured and arranged to produce at least one electrical potential from at least one electrochemical process; and at least one positioner structured and arranged to position such at least one electrochemical energy source in at least one position of interaction with such at least one magnetic field; wherein such at least one electrochemical energy source comprises at least one electrode structured and arranged to conduct at least one flow of electrical current, derived from such at least one electrical potential, in at least one second direction perpendicular to such first direction; wherein interaction between such at least one electric current and such at least one magnetic field produces at least one interaction force acting substantially directly on such at least one electrochemical energy source in a third direction perpendicular to both such at least one first direction and such at least one second direction; and wherein action of such at least one interaction force on such at least one electrochemical energy source produces such at least one useable mechanical force.

Moreover, it provides such a power system wherein: such at least one electrochemical energy source comprises at least one electrolytic layer structured and arranged to support such at least one electrochemical process; such at least one electrode comprises at least one anode layer and at least one cathode layer, such at least one anode layer and such at least one cathode layer are structured and arranged to be in interactive relation with such at least one electrolytic layer; and such at least one anode layer, such at least one cathode layer, and such at least one electrolytic layer are formed substantially by at least one thin-film deposition process. Additionally, it provides such a power system wherein such at least one magnetically-conductive substrate comprises at least one substantially ferrous material. Also, it provides such a power system wherein: such least one substantially ferrous material comprises at least one electrically isolative coating; and such at least one electrically isolative coating comprises at least one ferrous oxide compound. In addition, it provides such a power system wherein: such at least one electrochemical energy source comprises a plurality of discrete current-producing cells, each discrete current-producing cell of such plurality structured and arranged to produce such at least one electrical potential from such at least one electrochemical process and such at least one magnetic force in the presence of such at least one magnetic field; such plurality of discrete current-producing cells comprise at least one substantially radial arrangement; and such at least one substantially radial arrangement comprises a central point of radial symmetry. And, it provides such a power system wherein: such at least one magnetically-conductive substrate comprises at least one disk-shaped member having a center point substantially coincidental with such central point of radial symmetry; and such plurality of discrete current-producing cells are arranged substantially symmetrically about such center point.

Further, it provides such a power system wherein: such at least one disk-shaped member comprises at least one substantially planar support surface structured and arranged to support such plurality of discrete current-producing cells; such plurality of discrete current-producing cells preferably comprise at least one stacked organization extending outwardly from such at least one substantially planar support surface in direction substantially perpendicular to such at least one substantially planar support surface. Even further, it provides such a power system further comprising: such at least one magnetic field source structured and arranged to produce such at least one magnetic field; wherein such at least one positioner is structured and arranged to position such at least one disk-shaped member and such at least one magnetic field source to provide at least one direct interaction of such at least one electrochemical energy source with such at least one magnetic force; wherein such at least one positioner comprises at least one magnetic field aligner structured and arranged to align at least one line of magnetic flux, of such at least one magnetic field, in at least one first direction, at least one electric-current aligner structured and arranged to align such at least one flow of electrical current conducted by such at least one electrode, in at least one second direction substantially perpendicular to such first direction, and at least one motion enabler structured and arranged to enable relative motion between such at least one electrochemical energy source and such at least one magnetic field source; wherein such at least one interaction force produces such relative motion; and wherein such at least one useable mechanical force is extractable from such relative motion. Moreover, it provides such a power system wherein: such at least one motion enabler comprises at least one rotator structured and arranged to allow rotation about at least one rotational axis; such at least one rotational axis comprises an orientation non-parallel with such third direction; and such at least one interaction force produces at least one rotational torque about such at least one rotational axis. Additionally, it provides such a power system wherein such at least one magnetic field source comprises at least one electromagnetic field generator. Also, it provides such a power system wherein such at least one magnetic field source comprises at least one permanent magnet. In addition, it provides such a power system further comprising: at least one current controller structured and arranged to control movement of such at least one electric current within such at least one electrode; wherein such control of such at least one electric current within such at least one magnetic field controls the level of such at least one interaction force. And, it provides such a power system wherein: such plurality of discrete current-producing cells are electrically coupled to form at least one parallel circuit; and such at least one current controller comprises at least one current reverser structured and arranged to controllably reverse the direction of current flow within such at least one electrode. Further, it provides such a power system wherein such at least one electrochemical cell comprises at least one secondary-type cell. Even further, it provides such a power system wherein such at least one current controller comprises at least one recharging circuit. Moreover, it provides such a power system further comprising: at least one vehicular wheel structured and arrange to providing rolling vehicular motivation using such rotational torque; wherein such at least one vehicular wheel comprises at least one vehicular mount structured and arranged to removably mount such at least one vehicular wheel to at least one vehicle. Additionally, it provides such a power system further comprising: such at least one vehicle structured and arrange to mountably receive such at least one vehicular wheel; wherein such at least one vehicle comprises at least one monitor structured and arranged to monitor the operational status of such at least one vehicular wheel, and at least one user control structured and arranged to provide at least partial user control of the operation of such at least one current controller. In accordance with another preferred embodiment hereof, this invention provides a transportation infrastructure system related to servicing of at least one motor-battery equipped vehicle, such roadway infrastructure system comprising: a plurality of recharging stations spaced along at least one route appropriate for vehicular travel use; wherein each recharging station of such plurality comprises at least one stock of motor-battery units, each one structured and arranged to be exchangeable with at least one motor-battery unit of such at least one motor-battery equipped vehicle, at least one motor-battery exchanging apparatus structured and arranged to assist exchanging at least one electrically depleted motor-battery unit of such at least one motor-battery equipped vehicle with at least one electrically-charged motor-battery of such at least one stock of motor-battery units; wherein each such motor-battery unit comprises at least one magnetic field source structured and arranged to produce at least one magnetic field, and at least one battery structured and arranged to produce electrical current from at least one electrochemical process; wherein such at least one battery comprises at least one battery electrode structured and arranged to conduct at least one flow of such electrical current; wherein interaction between such at least one flow of such electric current and such at least one magnetic field produces at least one electromotive force acting substantially directly on such at least one battery electrode; and wherein such at least one motor-battery unit is structured and arranged to convert such at least one electromotive force to at least one mechanical force usable to motivate such at least one motor-battery equipped vehicle. Also, it provides such a transportation infrastructure system wherein each recharging station of such plurality further comprises at least one motor-battery charger structured and arranged to produce such at least one electrically charged motor-battery by recharging such at least one electrically-depleted motor-battery unit. In addition, it provides such a transportation infrastructure system wherein each recharging station of such plurality further comprises: at least one motor-battery analyzer structured and arranged to analyze such at least one electrically-depleted motor-battery unit; wherein such at least one motor-battery analyzer comprises at least one charge-status tester structured and arranged to test the charge status of such at least one electrically-depleted motor-battery unit. And, it provides such a transportation infrastructure system wherein such at least one motor-battery unit comprises: at least one vehicular wheel structured and arrange to providing rolling vehicular motivation using such at least one mechanical force; wherein such at least one vehicular wheel comprises at least one vehicular mount structured and arranged to removably mount such at least one vehicular wheel to at least one vehicle. Further, it provides such a transportation infrastructure system wherein such at least one motor-battery exchanging apparatus comprises at least one automated wheel-mounting apparatus structured and arranged to provide substantially automated removal and mounting of such vehicular wheel. In accordance with another preferred embodiment hereof, this invention provides a motor-battery vehicle system related to motivating at least one motorless-vehicle chassis comprising: at least one vehicle wheel structured and arranged to provide rolling support of such at least one motorless-vehicle chassis; wherein each at least one vehicle wheel comprises contained substantially within such at least one vehicle wheel, at least one electrical motor structured and arranged to apply to such at least one vehicle wheel at least one rotational force usable to motivate such at least one motorless-vehicle chassis, contained substantially within such at least one vehicle wheel, at least one battery structured and arranged to supply operating electrical current to such at least one electrical motor, and at least one mount structured and arranged to rotationally mount such at least one vehicle wheel to such at least one vehicle chassis; wherein motivation of such at least one motorless-vehicle chassis by such at least one vehicle wheel is accomplished by operation of such at least one electrical motor utilizing such operating electrical current provided substantially entirely by such at least one battery contained substantially within such at least one vehicle wheel. In accordance with another preferred embodiment hereof, this invention provides a method related to motivating at least one motorless-vehicle chassis comprising the steps of: offering to provide at least one motor-containing vehicle wheel structured and arranged to provide rolling motivation of such at least one vehicle chassis when mounted thereon; arranging with at least one entity associated with the operation of such at least one motorless-vehicle chassis, at least one contract providing for the use of such at least one motor-containing vehicle wheel by such at least one entity; and receiving from such at least one entity, at least one compensation for such use; providing for delivery of such at least one motor-containing vehicle wheel to such at least one entity. Even further, it provides such a method further comprising the step of establishing, within such at least one contract, at least one lease arrangement for such use of such at least one motor-containing vehicle wheel by such at least one entity. Even further, it provides such a method further comprising the step of providing within each such at least one motor-containing vehicle wheel, at least one battery structured and arranged to electrically power such at least one motor-containing vehicle wheel.

Even further, it provides such a method further comprising the steps of: establishing a plurality of recharging stations spaced along at least one route appropriate for vehicular travel use; and providing within each such recharging station of such plurality at least one stock of such at least one motor-containing vehicle wheels, at least one wheel-exchanging apparatus structured and arranged to assist exchanging at least one electrically-depleted motor-containing vehicle wheel of such at least one motorless-vehicle chassis with at least one electrically-charged motor-containing vehicle wheel of such at least one stock, at least one charge-status tester structured and arranged to test the charge status of such at least one battery, and at least one transaction processor to process at least one payment transaction associated with the exchange of such at least one electrically-depleted motor-containing vehicle wheel with such at least one electrically-charged motor-containing vehicle wheel. Even further, it provides such a method further comprising the steps of: exchanging at least one electrically-depleted motor-containing vehicle wheel of such at least one motorless-vehicle chassis with at least one electrically-charged motor-containing vehicle wheel of such at least one stock; testing the charge status of such at least one battery; and processing at least one payment transaction associated with the exchange of such at least one electrically-depleted motor-containing vehicle wheel with such at least one electrically-charged motor-containing vehicle wheel.

In accordance with another preferred embodiment hereof, this invention provides a power system comprising: at least one magnetic field source structured and arranged to produce at least one magnetic field having lines of flux extending in at least one first direction; at least one electrochemical energy source structured and arranged to produce at least one electrical potential from at least one electrochemical process; and at least one positioner structured and arranged to position such at least one electrochemical energy source in at least one position of interaction with such at least one magnetic field; wherein such at least one electrochemical energy source comprises at least one electrode structured and arranged to conduct at least one flow of electrical current, derived from such at least one electrical potential, in at least one second direction perpendicular to such first direction; wherein interaction between such at least one electric current and such at least one magnetic field produces at least one magnetic force acting substantially directly on such at least one electrochemical energy source in a third direction perpendicular to both such at least one first direction and such at least one second direction; and wherein action of such at least one magnetic force on such at least one electrochemical energy source produces at least one useable mechanical force. In addition, it provides each and every novel feature, element, combination, step, and/or method disclosed or suggested by this patent application.

BRIEF DESCRIPTION OF THE DRAWINGS

FIG. 5 shows a perspective view of a single cell plate of the radial motor battery of FIG. 3, prior to assembly.

FIG. 6 shows a perspective view of the single cell plate of FIG. 5, configured for assembly.

FIG. 7 shows a perspective view of the single cell plate (FIG. 6) coupled to a mounting hub of the radial motor battery of FIG. 3.

FIG. 8 shows a perspective view, illustrating a progressive assembly of the radial motor battery of FIG. 3.

FIG. 9 shows a side view of an assembled rotor of the radial motor battery of FIG. 3, including an enlarged detail illustrating a preferred sequential lamination of cell plates.

FIG. 10 shows a perspective view illustrating connection of cell plates to an electrically conductive commutator bar.

FIG. 32 shows a perspective view illustrating an alternate radial motor battery according to a preferred embodiment of the present invention.

FIG. 33 shows a front view illustrating the alternate radial motor battery of FIG. 32.

FIG. 34 shows a side view illustrating the alternate radial motor battery of FIG. 32.

FIG. 35 shows a perspective view including a partial cutaway through the section 35-35 of FIG. 33.

FIG. 36 shows a sectional view through the section 36-36 of FIG. 33.

FIG. 37 shows an exploded perspective view illustrating preferred components of the alternate radial motor battery of FIG. 32.

DETAILED DESCRIPTION OF THE BEST MODES AND PREFERRED EMBODIMENTS OF THE INVENTION

Figure 1:
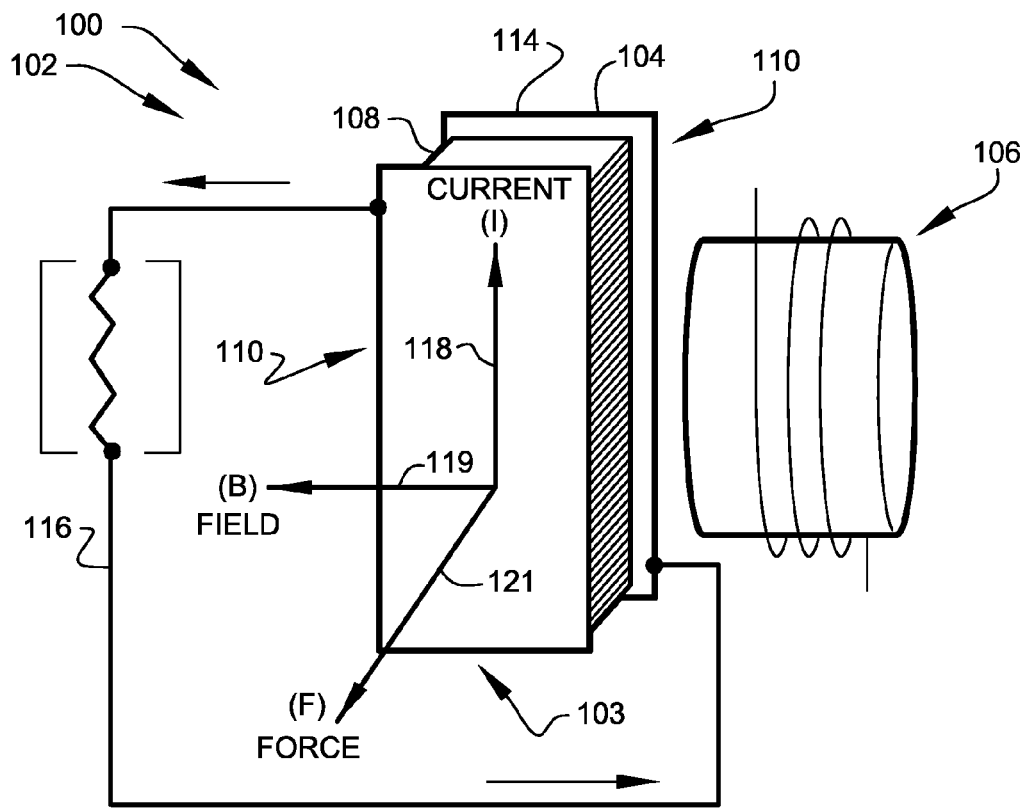
FIG. 1 shows a generalized schematic illustrating the essential operation of a single motor-battery cell of a motor-battery system according to a preferred embodiment of the present invention.

FIG. 1 shows a generalized schematic illustrating the essential operation of a single cell motor-battery 102 of motor-battery system 100 according to a preferred embodiment of the present invention. Preferred embodiments of motor-battery system 100 comprise a range of compact electrochemical power cells combining essential battery and electric motor functions into a common set of structures, thus reducing overall size and mass of the system. More specifically, preferred embodiments of motor-battery system 100 comprise self-powered, force-generating apparatus having relative low weight and compact size.

In general, the overall performance of an electrically driven motor system, especially those comprising an onboard power source is directly related to the overall weight (mass) of the system. A principal objective in the development of motor-battery system 100 is systemic mass reduction through the elimination of redundant structures and functions.

The single-cell motor-battery 102, schematically depicted in FIG. 1, preferably comprises at least one energy-source component 103 and at least one magnetic field source 106, as shown. Preferably, energy-source component 103 (at least embodying herein electrochemical energy source means for producing at least one electrical potential from at least one electrochemical process) comprises electrochemical cell 104, preferably functioning as the principal source of electrical energy during system operation. Most preferably, electrochemical cell 104 comprises at least one electrochemical process for directly converting chemical energy to electrical energy. Preferred embodiments of electrochemical cell 104 comprise at least one electrolyte 108 structured and arranged to interact with electrode laminations 110, as shown. Preferably, electrode laminations 110 comprise anode plate 112 and cathode plate 114, as shown. Preferably, anode plate 112 and cathode plate 114 comprise electrically conductive materials each suitable for supporting one-half of an electrochemical reaction. Most preferably, anode plate 112 and cathode plate 114 each comprise electrically conductive metallic materials, at least one preferably suitable for use in forming a magnetic circuit (preferably comprising relatively low magnetic reluctance).

In preferred embodiments of electrochemical cell 104, chemical energy is converted into electrical energy by at least one chemical reaction (for example, a reduction/oxidation reaction) that transfers charge between the interface of electrode laminations 110 and electrolyte 108. Such a reaction is responsible for electrical current flow through the cell, preferably generating at least one electrical current potential biased from cathode plate 114 to anode plate 112, as shown.

Preferably, electrochemical cell 104 comprises a secondary-type cell supporting cell recharging. A wide range of cell chemistries are suitable for use in the construction of electrochemical cell 104, and are generally application dependent. Suitable cell chemistries preferably include lithium ion, lithium-ion polymer, nickel-metal hydride, nickel cadmium, metal chloride, silver zinc, and similar commercially accessible implementations. Alternatively, electrolyte 108 may comprise a liquid acid, as in lead-acid battery technology, or may comprise a gel impregnated into a porous sheet of plastic. Upon reading the teachings of this specification, those of ordinary skill in the art will now understand that, under appropriate circumstances, considering such issues as intended use, advances in technology, etc., other cell technologies, such as, fuel cells, high-capacity ultra-capacitors, super-capacitors, high energy-density cells, etc., may suffice.

Magnetic field source 106 preferably comprises at least one permanent magnet or electromagnet, as shown. Most preferably, magnetic field source 106 comprises an electromagnet powered by electrical current generated by electrochemical cell 104. Preferably, magnetic field source 106 produces at least one magnetic field (B), having lines of flux extending in a first direction generally identified herein as magnetic flux line 119, as shown. In preferred embodiments of the present invention, magnetic field (B) forms at least one magnetic circuit in which an electrode lamination 110 is a constituent component.

Single-cell motor-battery 102 preferably comprises at least one control circuit 116 preferably adapted to control, among other physical operations, the direction and level of electrical current flow within cells. The preferred electrical conduction and circuiting of electrochemical cell 104 results in a flow of electrical current (I), within electrode laminations 110, in a direction, identified herein as current flow direction 118, oriented generally perpendicular to flux line 119, as shown. Preferably, electrochemical cell 104 is physically positioned by a physical structure of the system to place electrical current (I) in at least one position of interaction with the magnetic field (B), as shown (at least embodying herein positioner means for positioning such electrochemical energy source means in at least one position of interaction with such at least one magnetic field). Such interaction between electric current (I) and magnetic field (B) produces at least one magnetic force (F) acting on electrochemical cell 104 in at least one third direction, identified herein as magnetic force line 121, generally perpendicular to both current flow direction (I) and magnetic flux line 119, as shown. According to known physical laws, when an electrical current moves in a magnetic field in a direction perpendicular to the direction of the magnetic field, a magnetic force line 121 may be generated in a direction orthogonal to the direction of the magnetic flux line 119 and to current flow direction 118.

Preferably, electrode laminations 110 are further adapted to function as a magnetic field concentrating-component concentrating magnetic field (B) (at least embodying herein wherein such electrode conductor means comprises magnetic field concentrator means for concentrating such at least one magnetic field; whereby magnetic field interaction with such at least one electric current is enhanced). Thus, the electrode laminations 110 of electrochemical cell 104 efficiently combines three essential electrodynamic functions, supplying a magnetic path for the concentration of magnetic field (B), supplying a conductive path for electric current (I), and supplying an electrode to support an electrochemical cell reaction with electrolyte 108. The preferred utilization of electrochemical cell components to directly generate an extractable mechanical force is unique to battery power systems.

The embodiment of FIG. 1 provides a generalized schematic overview illustrating the basic functions of the present invention. Practical embodiments preferably utilize enhanced plate shapes, current pathways, and field orientations, as described and enabled below. Despite the simplicity of the depicted single-cell motor-battery 102, under appropriate circumstances, the level of force produced by a single-cell embodiment is applicable to the driving of small or microscale devices. The concepts underlying embodiments of the present invention may eventually provide significant advancements in technological areas such as the field of nanotechnology. For larger applications, such as electric powered vehicle systems, it is preferred to combine multiple cells to form apparatus of greater power density, as described below.

Figure 2:
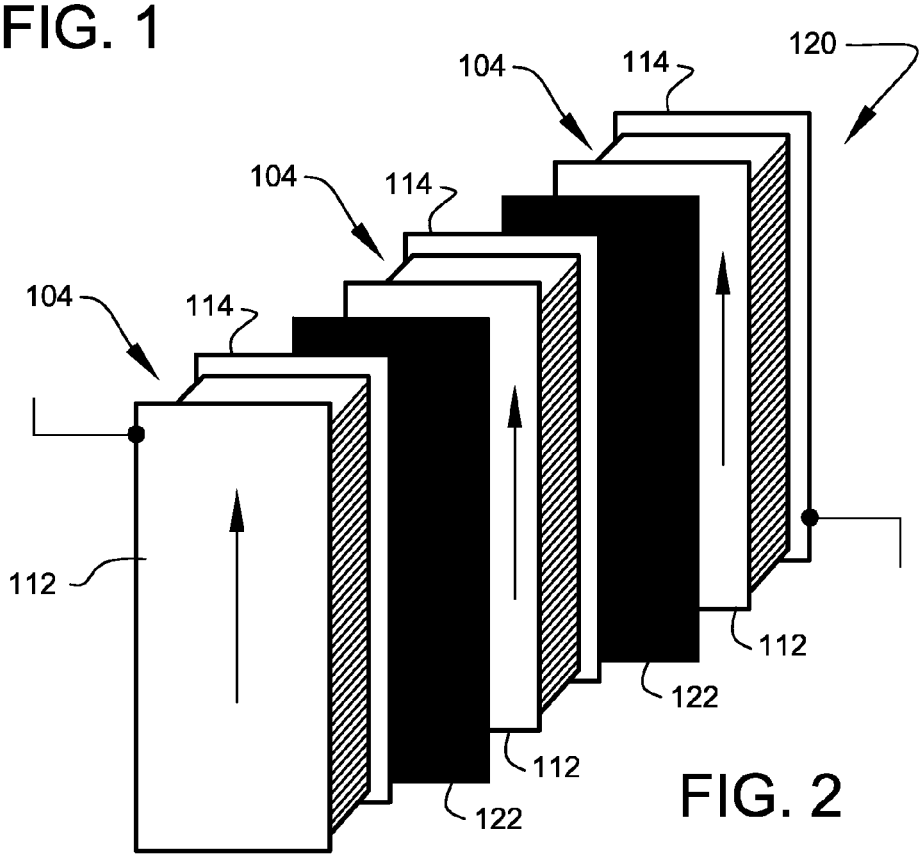
FIG. 2 shows a perspective view of a plurality of motor-battery cells operationally grouped to form a motor-battery coil according to a preferred embodiment of the present invention.

FIG. 2 shows a perspective view of a plurality of electrochemical cells 104 operationally grouped to form laminated coil 120 according to a preferred embodiment of the present invention. Preferably, laminated coil 120 comprises a sequential lamination of individual electrochemical cells 104, as shown. Preferably, anode plates 112 are electrically isolated from cathode plates 114 of adjacent electrochemical cells 104 by isolative laminations 122, as shown (at least embodying herein at least one electrical insulator structured and arranged to electrically insulate such at least one electrically conductive anode portion from such electrically conductive cathode portion of at least one adjacent such at least one electrochemical cell). Preferably, individual electrochemical cells 104 within laminated coil 120 are electrically coupled (in series or in parallel), as further described in FIG. 11.

As in the embodiment of FIG. 1, the conductive laminations of the assembled laminated coil 120 perform three essential functions. First, the laminations function as a magnetic field concentrator. Second, the laminations perform a current conduction function generally corresponding to the coil windings that form the poles of a conventional electric motor armature (rotor). Third, the laminations provide the function of the electrode plates of an electrochemical cell. This preferred combining of functions greatly reduces the redundancy of structures required to support system operation. Such reductions directly influence the size and weight of drive systems based on motor-battery system 100. Significant size and weight reductions are readily achievable in such systems, with corresponding increases in system performance including operational range.

Figure 3:
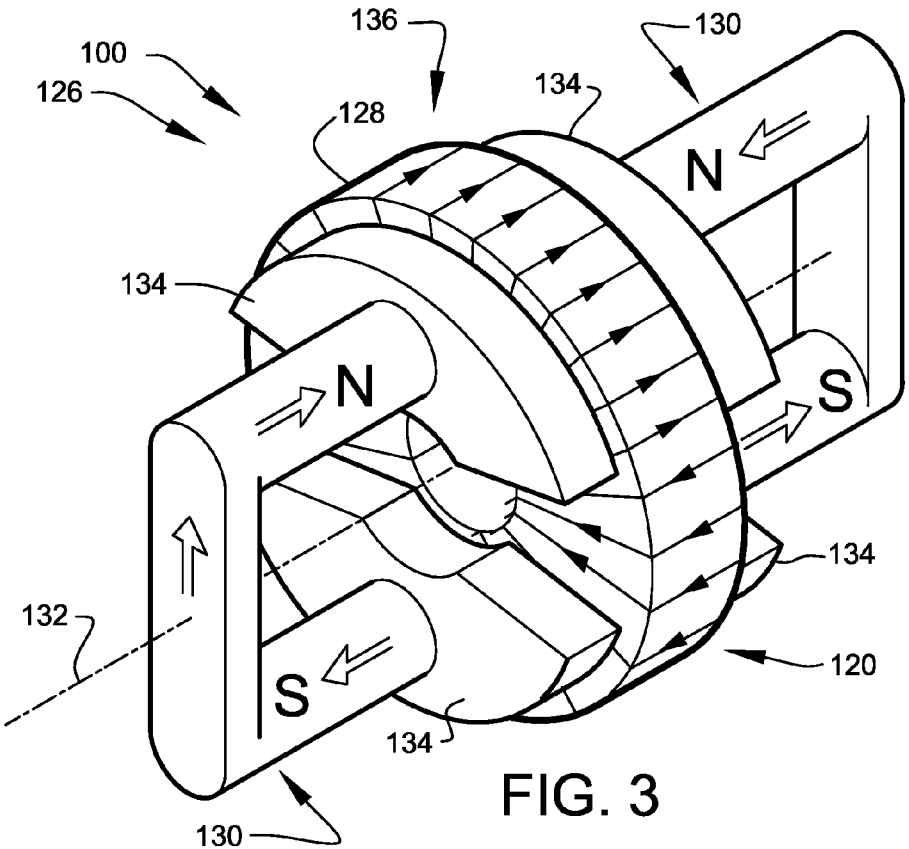
FIG. 3 shows a perspective view illustrating a radial motor battery according to a preferred embodiment of the present invention.

FIG. 3 shows a perspective view, illustrating radial motor battery 126 according to an alternate preferred embodiment of the present invention. Radial motor battery 126 preferably utilizes a generally toroidal configuration of laminated coil 120, identified herein as motor battery 128. Preferably, the magnetic field source of radial motor battery 126 is provided by field magnets 130 mounted on each side of the face of motor battery 128. Preferably, axial gaps between field magnets 130 and motor battery 128 allow relative movement between with adjacent structures. Minimal gap distances are generally preferred, within the practical mechanical limitations of the materials, thus minimizing overall field reluctance losses within the magnetic circuit. Magnetic orientations within field magnets 130 are generally indicated by the larger arrow depictions. Electrical current (I) in motor battery 128 (generally indicated by the small arrow depictions applied to the external surface of the rotor) is acted upon by field magnets 130 to provide a torque force applied about rotational axis 132, as shown. Current flow is regulated by at least one control, such as, for example, by electrical commutation, as further described below. It is noted that motor battery 128 both stores and supplies electrical power used to operate radial motor battery 126. It is further noted that, the above-described structures and arrangements of motor battery 128 enable the development of power generation (generator) embodiments of motor-battery system 100. In such embodiments, a mechanical force applied to the cells is preferably used to generate electrical current that is subsequently stored within the same.

Motor battery 128 preferably comprises a motion-enabling structure allowing motion relative to this stator-like assembly of field magnets 130 (at least embodying herein wherein such positioner means comprises motion enabler means for enabling relative motion between such electrochemical energy source means and such magnetic field means). Preferably, motor battery 128 is adapted to rotate about rotational axis 132, thus forming armature 136 (at least embodying herein such motion enabler means comprises rotator means for allowing rotation of such electrochemical energy source means about at least one rotational axis). Rotational axis 132 preferably comprises an orientation non-parallel with the magnetic force lines (magnetic force line 121 of FIG. 1) produced by the interaction of the electrical currents within the magnetic fields. Field magnets 130 preferably comprise magnetic pole-shoes 134 functioning to direct the magnetic field across an extended region of interaction within motor battery 128. Note that in the preferred configuration of radial motor battery 126, power density is increased through the development of multiple magnetic circuits interacting with motor battery 128, as shown.

Preferably, a coaxial placement of a drive shaft along rotational axis 132 (mechanically coupled to armature 136) produces torque on the shaft during system operation. Such torque is extractable from the system as useful mechanical shaft power. Upon reading the teachings of this specification, those of ordinary skill in the art will now understand that, under appropriate circumstances, considering such issues as intended use, advances in technology, etc., other motion arrangements, such as, linear-motion devices, linear actuators, etc., may suffice. Thus, motor battery 128, preferably comprising a substantially unitary structure, preferably combines, within common structures, the functions of electrical power storage, electrical power supply, and electrical mechanical power conversion.

Figure 4:
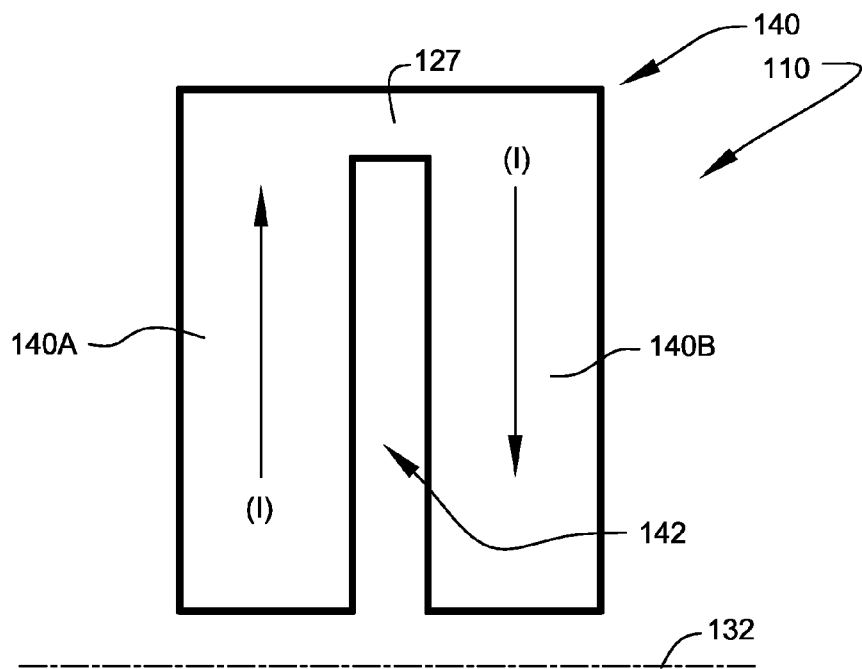
FIG. 4 shows a generalized schematic illustrating a preferred sequential lamination of cell plates of the radial motor battery of FIG. 3.

FIG. 4 shows a generalized schematic illustrating specialty-shaped electrode conductors 110 identified herein as cell plates 140. Preferably, the conductive cell plates 140 of radial motor battery 126 are divided into two generally symmetrical conductive regions separated by nonconductive region 142, as shown. Laminated assembly of this preferred configuration produces sets of adjacent electrochemical cells 104 linked by a common conductive segment 127, as shown. Preferably, flow of electrical current through the cell plates 140 occurs in a generally semi-circular manner, flowing in a first direction within cell plates 140A of a first side, and in a generally opposing direction within cell plates 140B of the opposing side (as generally indicated by the arrow depictions). Referring again to the diagram of FIG. 3, cell plates 140 are preferably oriented within motor battery 128 such that interaction between the magnetic fields and depicted current flows produces magnetic forces extending along the lines non-intersecting and non-parallel to rotational axis 132, more specifically, along non-intersecting lines of force extending generally perpendicularly to rotational axis 132, as shown.

FIG. 5 depicts a preferred refinement to the design of cell plate 140, hereinafter referred to as cell plate 140', as shown. Preferably, cell plate 140' is depicted in an initial flattened configuration consistent with anticipated fabrication methodologies. In volume production, cell plate 140' may preferably comprise a rolled or molded material in which the central thickness of the plate gradually increases to accommodate the inherent variation in lamination thickness requirements progressing from the central rotational axis to the outer rotor circumference. Cell plate 140' preferably comprises an elongated planar member comprising a generally symmetrical mid-length offset, as shown. Preferably, each resulting offset section comprises a terminating extension 144 used to electrically couple cell plate 140' to an external control circuit. FIG. 6 shows a perspective view of the single cell plate 140' of FIG. 5, configured for assembly. Preferably, cell plate 140' is modified to form the depicted arch-shaped member for assembly to commutator hub 146 (of FIG. 7). Preferably, flow of electrical current through cell plate 140' occurs in a generally semi-circular manner, flowing in a first direction within one offset side of the cell plate and in a generally opposing direction within the opposing offset side of the cell plate, as shown by the arrow depictions. Preferably, conductive segment 127' provides a conductive link between the offset sides of cell plate 140', as shown.

FIG. 7 shows a perspective view of the single cell plate 140' assembled to commutator hub 146 of motor battery 128. Preferably, each terminating extension 144 is mounted to commutator hub 146 in a position appropriate to the commutation operations of the armature, as further described below.

FIG. 8 shows a perspective view, illustrating a progressive assembly of motor battery 128. Preferably, cell plates 140' are added to motor battery 128 in an interleaving sequence, as shown. Preferably, layers of electrolyte 108 and isolative laminations 122 are sequentially introduced during cell plate assembly to form pluralities of electrochemical cells 104, as shown in FIG. 2. Alternately, those skilled in the art will now appreciate that partial preassembly of electrochemical cells 104 may facilitate fabrication and/or reduce fabrication costs. Motor battery 128 may preferably comprise application-appropriate quantities of electrochemical cells 104 preferably matching operational performance, cost, and similar design criteria.

Preferably, the cell plates on the near side of the rotor are electrically isolated from the cell plates on the far side of the rotor by insulating disk 148, as shown. A preferred embodiment of insulating disk 148 comprises an iron disk with an isolative material applied to its outer surface. Such an iron disk provides an efficient path for the magnetic circuit to follow. Alternately preferably, additional insulating laminations or nonconductive films may be used as alternate means for electrically isolating adjacent cells. Preferably, laminations within motor battery 128 are mechanically coupled to form a substantially unitary structure capable of transferring such mechanical forces to output shaft of armature 136.

FIG. 9 shows a schematic side view of an assembled armature 136, comprising motor battery 128, including an enlarged detail illustrating preferred sequential laminations of a laminated coil 120. It is noted that the lamination of anode plate 112, electrolyte 108, and cathode plate 114 preferably form a single electrochemical cell 104 within laminated coil 120. Isolative laminations 122 preferably separate adjacent electrochemical cells 104, as shown.

A single motor battery 128 may preferably comprise a single or multiple groupings of discrete laminated coils 120. Preferably, laminated coils 120 may be partially or fully encapsulated in a substantially solid matrix to assist in controlling structural forces developed during rotation. Upon reading the teachings of this specification, those of ordinary skill in the art will now understand that, under appropriate circumstances, considering such issues as intended use, cost factors, advances in technology, etc., other lamination arrangements, such as, for example, the use of non-curvilinear plates, additional laminations (providing catalysts, current control, heat dissipation), etc., may suffice.

FIG. 10 shows a perspective view illustrating connection of terminating extensions 144 of adjacent cell plates 140' to an electrically conductive commutator bar 150 of commutator hub 146. Preferably, commutator hub 146 comprises a circumferentially positioned system of commutator bars 150 preferably functioning to electrically couple one or more cell plates 140' to a commutator assembly of radial motor battery 126. Preferably, cell plates 140' may be connected to commutator bars 150 individually, in series, or in parallel electrical configurations, as described below. Upon reading the teachings of this specification, those of ordinary skill in the art will now understand that, under appropriate circumstances, considering such issues as intended use, expected service life, etc., other cell integration arrangements, such as, designing laminated coils to be a serviceable component allowing for removal and modular replacement, utilizing easily manipulated electrical couplings to facilitate service and coil renewal, designing a rotor to be sealed and to contain a liquid electrolyte between spaced laminations, etc., may suffice.

Figure 11:
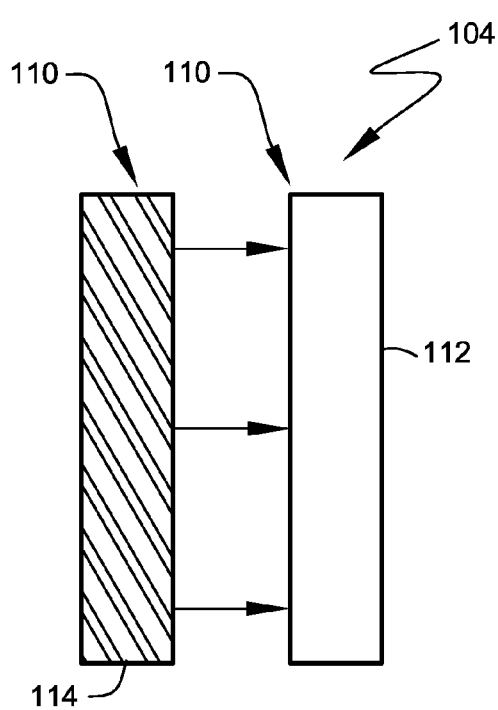
FIG. 11 shows a generalized schematic illustrating internal electrical current flow within the motor-battery cell.
Figure 12:
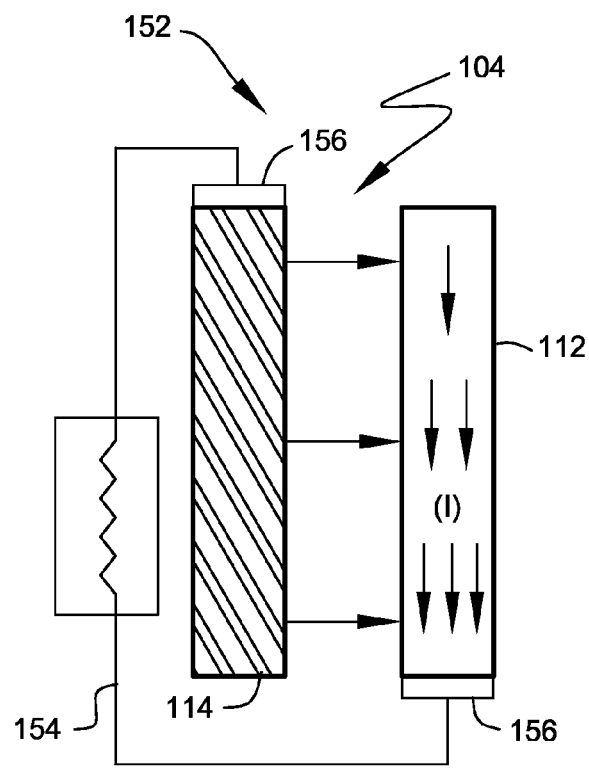
FIG. 12 shows a generalized schematic illustrating a first circuit arrangement for electrical directional current flow external of the motor-battery cell.
Figure 13:
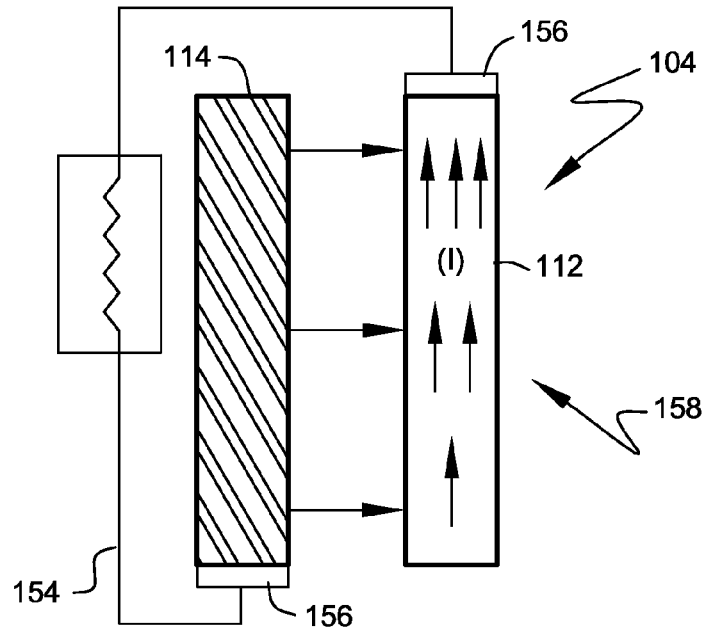
FIG. 13 shows a generalized schematic illustrating a second circuit arrangement for reversing the direction of electrical current flow derived from the motor-battery cell.

FIG. 11 through FIG. 13 schematically illustrate various electrical current flow arrangements instructive in the understanding of commutation methodologies within preferred embodiments of radial motor battery 126. FIG. 11 shows a generalized schematic illustrating internal electrical current flow within electrode laminations 110 of electrochemical cell 104. Commutation in radial motor battery 126 and similar embodiments of motor-battery system 100 is fundamentally different from commutation in conventional electric motors where the objective is to maintain the direction of the current in the external electrical source and reverse its direction through the motor windings. In the embodiments of motor-battery system 100, there is no external current source. The electrical current source is self-generated (originating within the embodiment of motor-battery system 100 itself) and is always in the same direction, from cathode plate 114 to anode plate 112, as shown.

FIG. 12 shows a generalized schematic illustrating first circuit arrangement 152 for directional electrical current flow through external circuit 154 of electrochemical cell 104. Preferably, the radial direction of the electrical current through the length of anode plate 112 is dependent on the location of brushes 156 that complete the circuit through external circuit 154, as shown. In the configuration shown in FIG. 12, brushes 156 are arranged so the current flows through anode plate 112 from the top to the bottom. FIG. 13 shows a generalized schematic illustrating second circuit arrangement 158 for reversing the direction of electrical current flow derived from electrochemical cell 104. In the configuration shown in FIG. 13, brushes 156 are arranged so the current flows through anode plate 112 from the bottom to the top. Note that this reverses the direction of the current through external circuit 154.

Figures 14, 15:
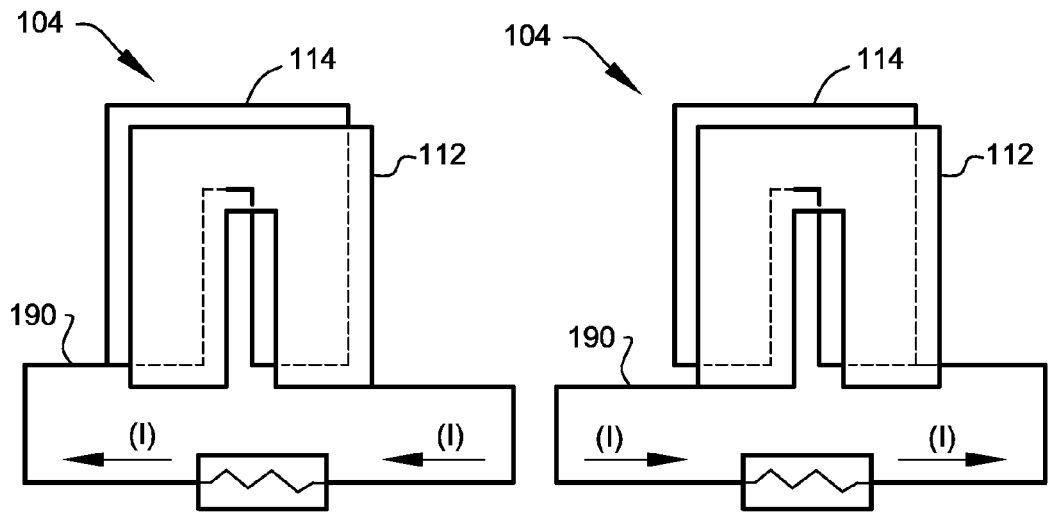
FIG. 14 and FIG. 15 show generalized schematic views further illustrating preferred circuiting arrangements for connections between anode plates and cathode plates of the motor-battery cells.

FIG. 14 and FIG. 15 show generalized schematic views further illustrating preferred circuiting arrangements for connections between anode plates 112 and cathode plates 114 of electrochemical cells 104. Note that in each method, electrical conductors 190 may be brought out sideways, as shown. Thus, one electrical conductor 190 may preferably connect to a commutator bar 150 on the front of motor battery 128 (see FIG. 8) and the other electrical conductor 190 may preferably connect to a second commutator bar 150 on the back side of motor battery 128. Alternatively, both electrical conductors 190 may preferably be brought out either the front or the back side of motor battery 128 and connected to the bars of a two-level commutator. Preferably, the direction of electrical current flow is dependent on the connection method used, as shown.

Figure 16:
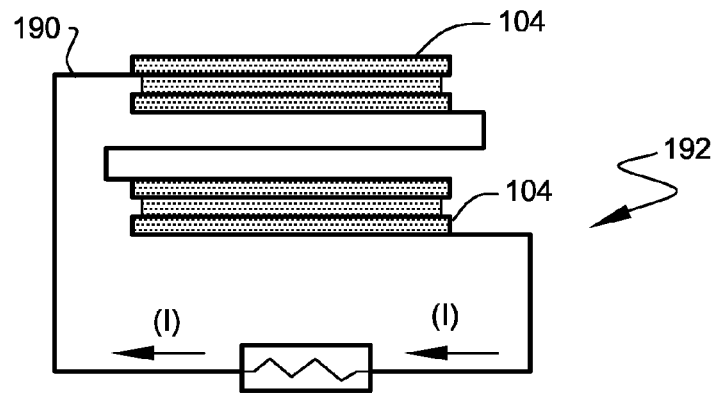
FIG. 16 shows a generalized schematic illustrating a series-type connection between the individual motor-battery cells, according to a preferred embodiment of the present invention.
Figure 17:
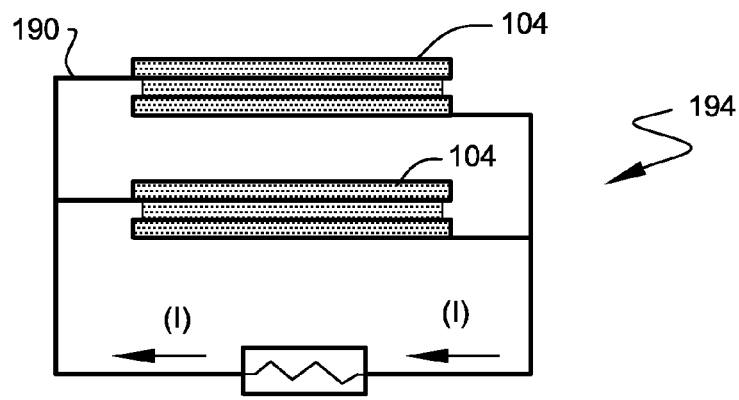
FIG. 17 shows a generalized schematic illustrating a parallel-type connection between the individual motor-battery cells, according to a preferred embodiment of the present invention.

FIG. 16 shows a generalized schematic illustrating a series-type connection 192 between the individual electrochemical cells 104, according to a preferred embodiment of the present invention. Preferably, to form a series-type connection between two or more sets of electrochemical cells 104, electrical conductors 190 are connected in series before they are coupled to the commutator bars. Any number of cells may be so-connected. The direction of the current through the series-connected cells can also be in either direction. FIG. 17 shows a generalized schematic illustrating parallel-type connection 194 between individual electrochemical cells 104, according to a preferred embodiment of the present invention. Thus, electrochemical cells 104 may be electrically coupled to provide current at various voltages, or at various levels of wattage, as required by the application.

Figure 18:
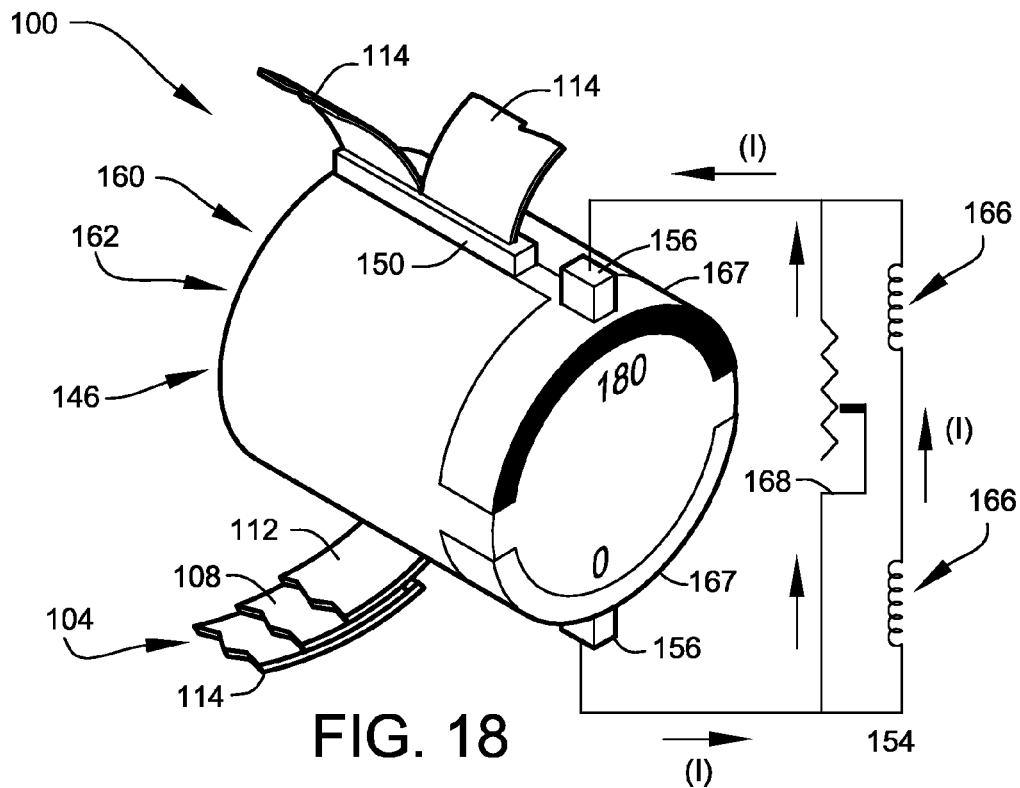
FIG. 18 shows a generalized schematic illustrating a commutator arrangement of a radial motor battery in a first conditional state.

FIG. 18 shows a generalized schematic illustrating commutator hub 146 comprising commutator arrangement 160 in first rotational position 162. For clarity, the majority of electrochemical cells 104 have been omitted from the view. Two independent conductive regions 167 are preferably located circumferentially about commutator hub 146, as shown. Preferably, conductive regions 167 are electrically coupled to commutator bars 150 supporting terminating extensions 144 of the depicted electrochemical cells 104, as shown. Brushes 156 are preferably positioned on the opposite sides of commutator hub 146 and are each adapted to electrically contact conductive regions 167 during rotation of commutator hub 146, as shown. Upon reading the teachings of this specification, those of ordinary skill in the art will now understand that, under appropriate circumstances, considering such issues as intended use, etc., other brush arrangements, such as electronic brush equivalents, etc., may suffice.

In first conditional state 162, the function of brushes 156 at the 0 degree and 180 degree marks of commutator hub 146 is to form a complete circuit path to external circuit 154, directing current through external circuit 154 in the depicted direction.

Figure 19:
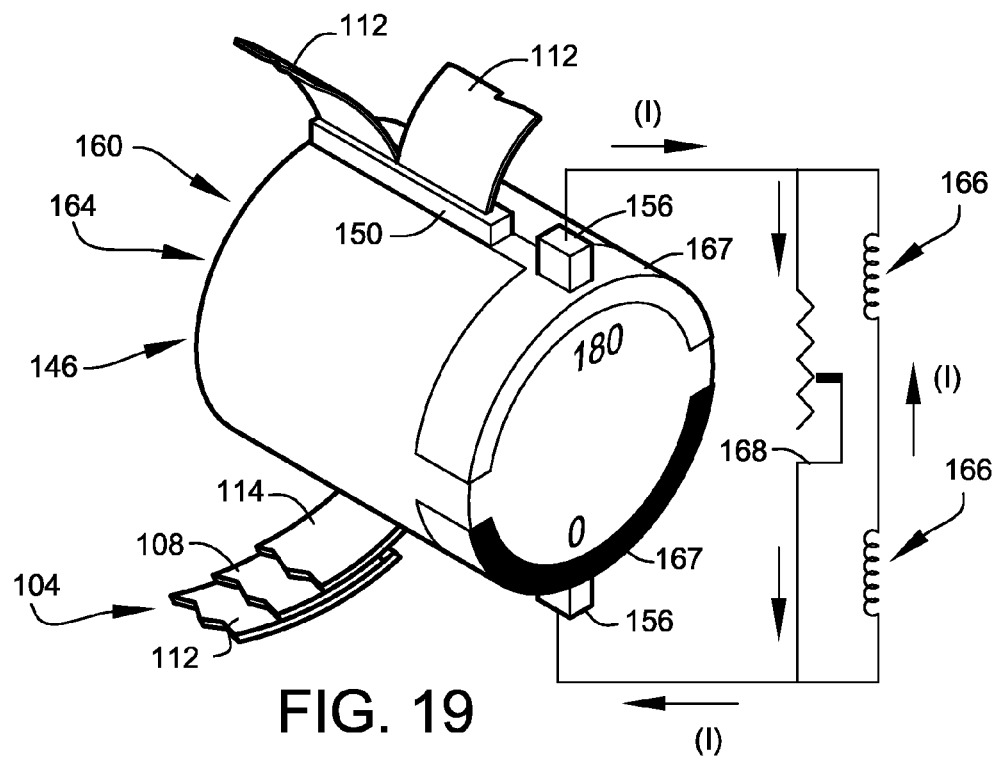
FIG. 19 shows a generalized schematic illustrating the commutator arrangement of FIG. 18 in a second conditional state.

FIG. 19 shows a generalized schematic illustrating commutator arrangement 160 in a second rotational position 164 after 180 degrees of rotation. After commutator hub 146 has moved through 180 degrees of rotation, the terminating anode and cathode ends of electrochemical cell 104 may be reversed relative to brushes 156, thus reversing the direction of the current within external circuit 154, as shown.

In the schematic depictions of FIG. 18 and FIG. 19, external circuit 154 preferably comprises a set of field coils 166 used within electromagnetic embodiments of field magnets 130 to produce operational magnetic fields (see FIG. 3). In addition, external circuit 154 comprises current control component 168 preferably adapted to regulate the magnetic field magnitude by shunting current away from field coils 166 (thus, rotational speed, starting, stopping, etc. is readily controllable), as shown. In the simplified schematic diagram of FIG. 18 and FIG. 19, current control component 168 is (preferably) depicted as a simple variable resistance device. Current control in most implementations may preferably comprise additional levels of current control. Upon reading the teachings of this specification, those of ordinary skill in the art will now understand that, under appropriate circumstances, considering such issues as intended use, cost, advances in technology, etc., other current control arrangements, such as, switches, relays, rectifiers, pulse-width modulation controllers, processor controlled systems, etc., may suffice.

Figures 20, 21:
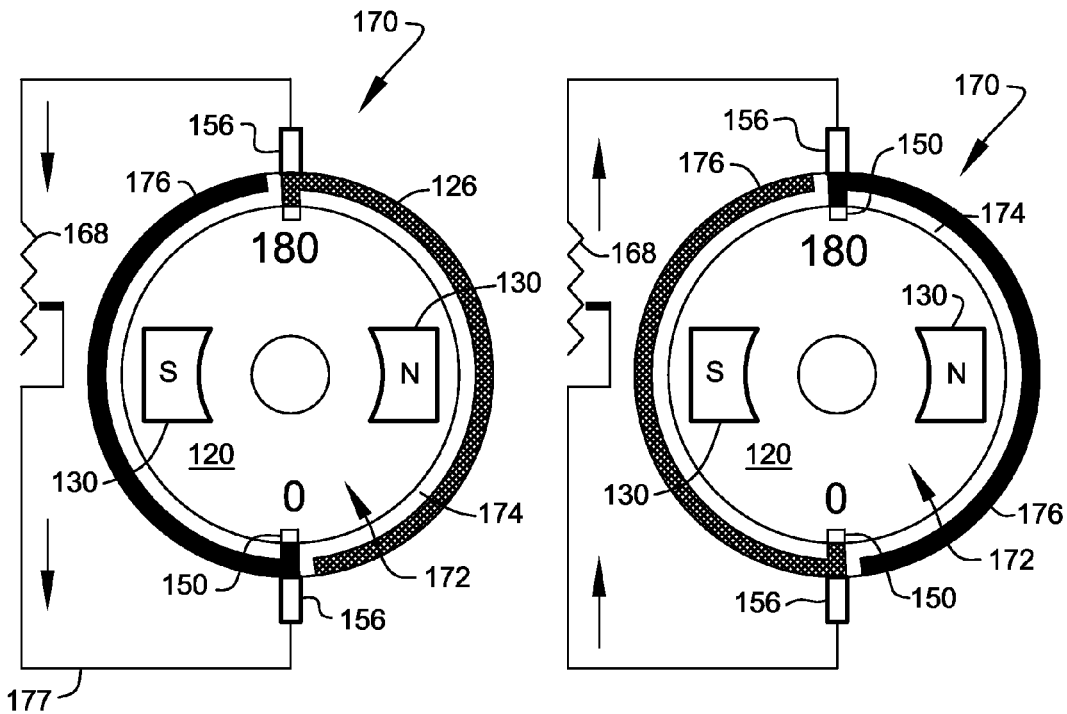
FIG. 20 shows a generalized schematic illustrating the operation of a two-coil-series-connected commutator comprising a first conditional state.
FIG. 21 shows a generalized schematic illustrating the two-coil-series-connected commutator of FIG. 20 in a second conditional state.

FIG. 20 shows a generalized schematic illustrating the operation of a circumferential commutator arrangement 170 comprising a two-coil-series-connected radial motor battery 172, according to an alternate embodiment of the present invention. FIG. 21 shows a generalized schematic illustrating commutator arrangement 170 of the two-coil-series-connected radial motor battery 172 of FIG. 20 after 180 degrees of rotation.

The integrated power arrangements of motor-battery system 100 allow for development of novel and highly efficient commutation configurations. Preferably, commutator arrangement 170 comprises two commutator bars 150, one electrically coupled to an anode termination of the coupled motor-battery coils 120, the other electrically coupled to a cathode termination of the series-coupled motor-battery coils 120. Preferably, each of the two commutator bars 150 are individually affixed to an individual commutator plate 176, with one commutator bar 150 located at 0 degrees and the other located at 180 degrees, as shown. One commutator plate 176 preferably extends from the five-degree position to the 180-degree position, as shown. Preferably, the second commutator plate 176 preferably extends from the 185-degree position to the 360-degree position, as shown. Preferably, each commutator plate 176 is electrically isolated from the underlying motor-battery coils 120 by insulator layer 174, as shown.

Preferably, each brush 156 electrically couples a commutator plate 176 to external circuit 176 to complete the current path through current control component 168. Note that electrical current direction is reversed after 180 degrees of rotation.

The preferred regions of the north and south axial field pole interaction are also shown. The operating magnetic fields may be produced by permanent magnets or electromagnets powered by external circuit 177, as appropriate to the application. Note that the voltage across the brushes may depend on the connections chosen for the interconnection of the cells, e.g., in series or in parallel.

Figure 22:
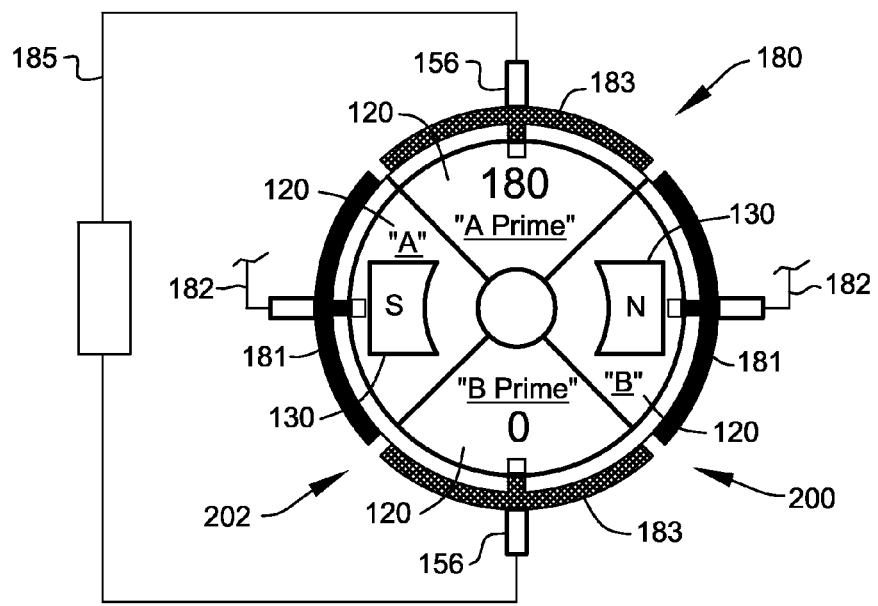
FIG. 22 shows a generalized schematic illustrating the operation of a four-coil commutator.

FIG. 22 shows a generalized schematic illustrating the operation of four-coil commutator 180 of a four-coil radial motor battery 173. Numerous configurations of electrochemical cells 104 and motor-battery coil 120 are possible within the scope of the present invention. One useful embodiment preferably positions two of its four motor-battery coils 120 at 90 degrees and the other at 270 degrees, as shown. These coils, identified herein as coil "A" and coil "B", preferably interact with field magnets 130, as shown, and preferably function to provide the extractable motive power. Electrical current generated by coil "A" and coil "B" is conducted to external controller/field coil circuit 182 through commutator plates 181 and corresponding brushes 156 of power commutator portion 200, as shown.

The remaining two motor-battery coils 120, one at the zero-degree position and the other at the 180-degree position, do not interact with the field coils. These "inactive" coils, identified herein as coil "A Prime" and coil "B Prime", are connected by recharging commutator portion 202 to external controller/recharging circuit 185, as shown. External controller/recharging circuit 185 preferably functions to recharge the "inactive" motor-battery coils 120 of the motor battery by means of a secondary power source, such as, for example, regenerative braking or by an alternator/generator powered by an external source (see FIG. 25). Recharging commutator portion 202 preferably comprises a set of commutator plates 183 and brushes 156 functioning to conduct electrical current from external controller/recharging circuit 185 to coil "A Prime" and coil "B Prime", as shown.

In operation, each motor-battery coil 120 of four-coil radial motor battery 173 functions as a force-producing motor for 90 degrees of rotation after which it enters a period of inactivity during about 90 degrees of rotation, as shown. Preferably, during such periods of inactivity, the motor-battery coil 120 may simply remain inactive for cooling or be recharged, as required (at least embodying herein at least one alternate non-power-producing function).

Figure 23:
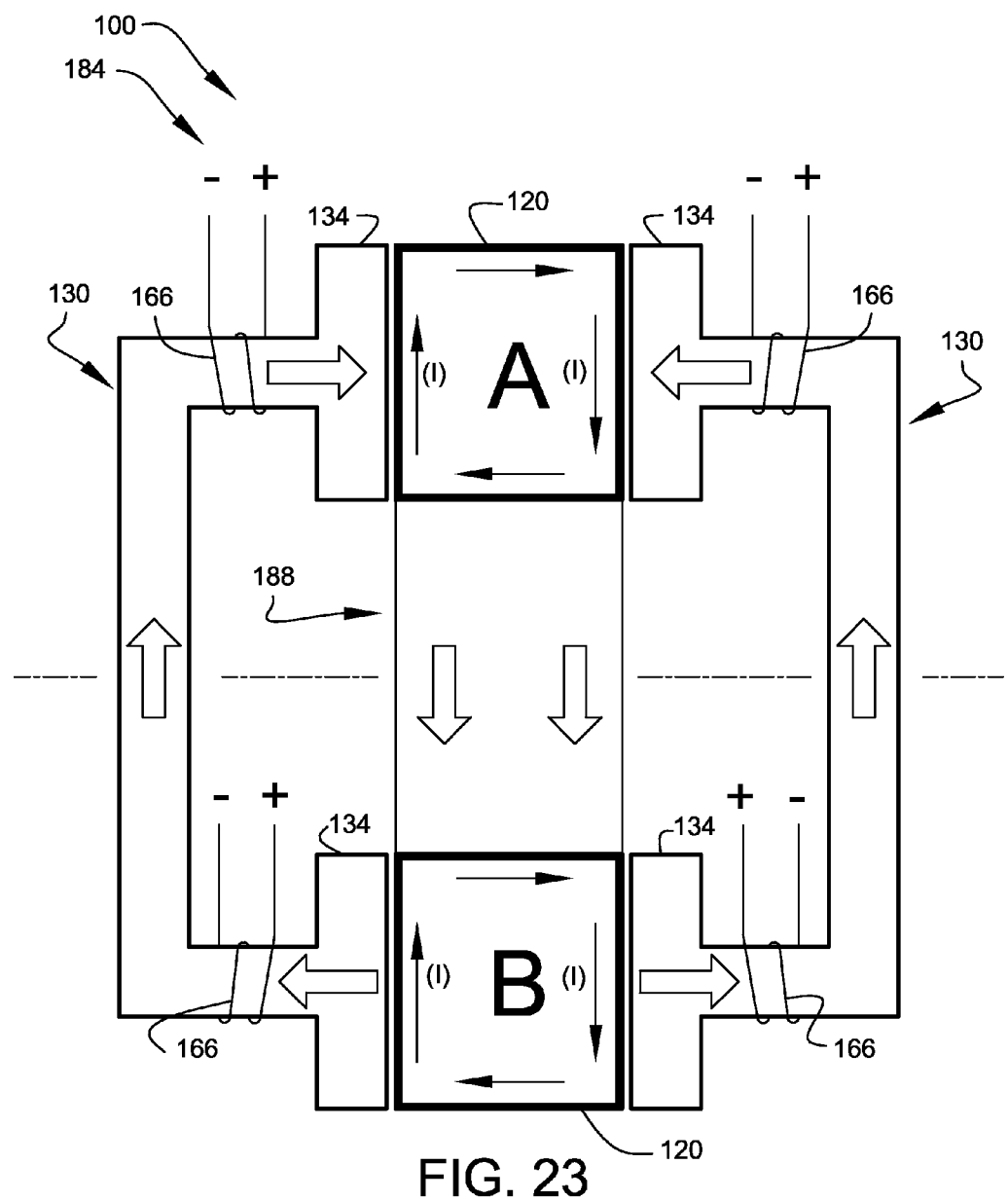
FIG. 23 shows a sectional view schematically illustrating a two-coil radial motor battery, according to a preferred embodiment of the present invention.

FIG. 23 shows a transverse sectional view schematically illustrating a two-coil radial motor battery 184, to more clearly illustrate preferred magnetic circuits and electrical commutation within a preferred representative embodiment of the present invention. Preferably, armature 188 of motor battery 184 comprises the two motor-battery coils 120, identified herein as coil "A" and coil "B", as shown. Preferably, coil "A" and coil "B" are electrically coupled in parallel. Preferably, power commutation in the present preferred embodiment is arranged so that, in the depicted armature position, the electrical current on the left side of coil "A" flows radially outward while the electrical current in coil "B" preferably flows radially inward, as denoted by the small arrow indications and adjoining (I) symbols. The field coils 166 of the electromagnetic field magnets 130 are preferably connected in series with coil "A" and coil "B to produce the magnetic pole directions denoted by the large arrow indications.

During preferred operation, electrical current in coil "A" and coil "B" interact with the magnetic fields generated by field magnets 130 to provide a magnetic force extending perpendicularly to both the direction of current flow and magnetic field orientation (generally into the plane of the illustration) at coil "A" and extending perpendicularly (generally out of the plane of the illustration) at coil "B". This force bias results in rotation of armature 188. More specifically, armature 188 rotates to place coil "A" in the bottom position and coil "B" in the top position. This preferred rotation results in a reversal of the initial spatial directions of the radial electrical currents. Preferably, to maintain the initial direction of the forces, the direction of the magnetic fields must also be reversed. Preferably, such reversal of fields is accomplished automatically as the lower conductive region 167 of the commutator (see FIG. 18), which was initially at a bottom position, rotates to contact brush 156 on the top. Similarly, the upper conductive region 167 that was formerly on the top position rotates to contact brush 156 on the bottom (see again the teachings of FIG. 18 and FIG. 19). The direction of the electrical current through field coils 166 may thus be reversed and armature 188 may continue to rotate in the initial direction. This sequence is preferably repeated with each half-turn of armature 188.

In four-coil radial motor battery 173, that preferably provides for two coils to be either inactive or in a state of being recharged from an external source, the two "extra coils" (coil "A Prime" and coil "B Prime") preferably comprise their own commutator and brush sets (recharging commutator portion 202) and function substantially as described for coil "A" and coil "B". In preferred operations, coil "A Prime" and coil "B Prime" are preferably allowed to cool or be recharged while they are out of the magnetic circuit. They may also be used to provide "on-demand" supplemental power by connecting recharging commutator portion 202 to an appropriately configured external controller during that portion of a revolution when they are positioned to interact with the magnetic fields. Upon reading the teachings of this specification, those of ordinary skill in the art will now understand that, under appropriate circumstances, considering such issues as user preference, intended use, etc., other circuiting arrangements, such as configuring such a "demand-based" controller to recharge coil "A" and coil "B" while they are in the inactive zone, etc., may suffice.

Figure 24:
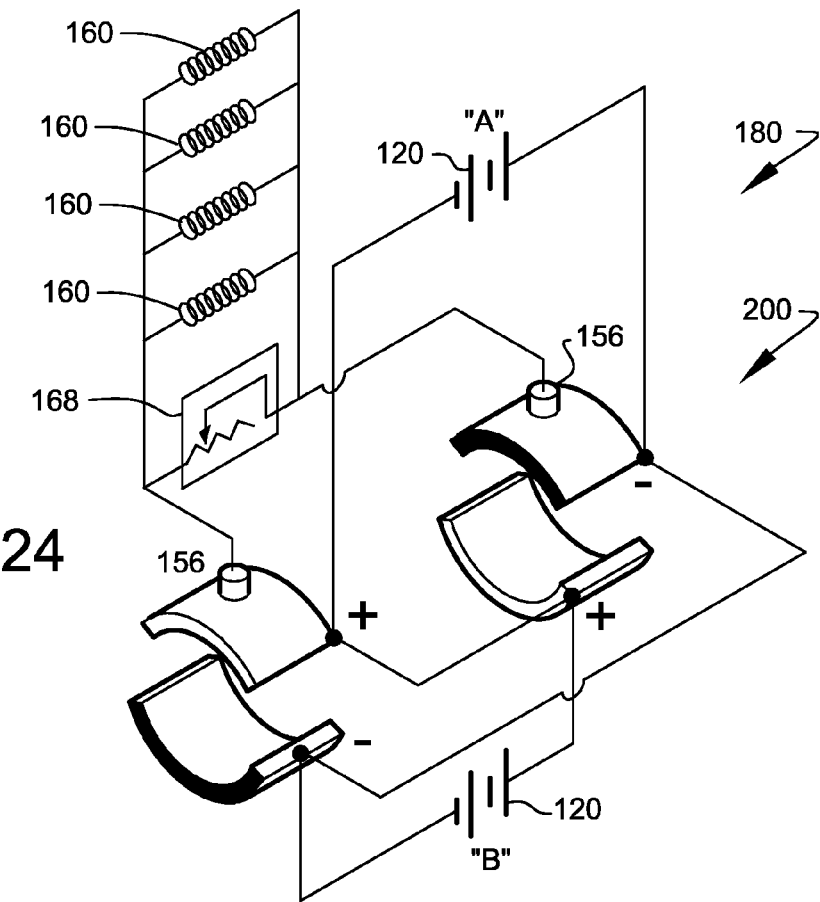
FIG. 24 shows generalized schematic illustrating circuiting arrangements for the power commutators of a four-coil radial motor battery, according to a preferred embodiment of the present invention.

FIG. 24 shows a generalized schematic illustrating circuiting arrangement for the power commutator portion 200 of four-coil commutator 180, according to a preferred embodiment of the present invention. A corresponding recharging commutator portion (see FIG. 25) has been removed from the view for clarity. Preferred connections of coil "A" and coil "B" motor-battery coils 120 to power commutator portion 200, field coils 166, and current control component 168 of external controller/field coil circuit 182 are shown.

Figure 25:
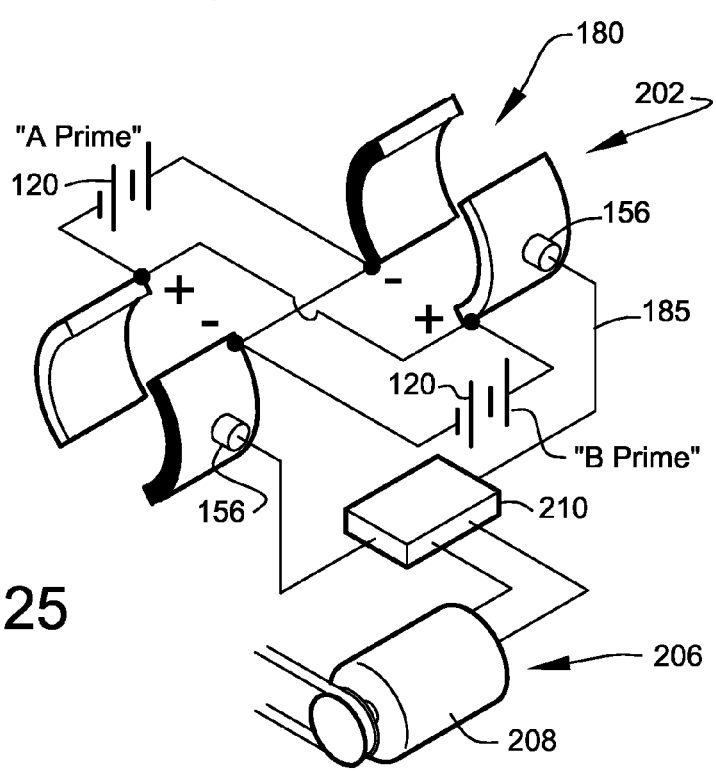
FIG. 25 shows generalized schematic illustrating circuiting arrangements for the recharging commutators of the four-coil radial motor battery of FIG. 26.

FIG. 25 shows generalized schematic illustrating circuiting arrangements for the recharging commutator portion 202 of four-coil commutator 180. Preferred connections of the coil "A Prime" and coil "B Prime" motor-battery coils 120 to external controller/recharging circuit 185 and secondary power source 206 are shown. Note that external controller/recharging circuit 185 comprises current controller 210 functioning to reverse current polarity during each half turn.

External controller/recharging circuit 185 preferably functions to recharge the "inactive" motor-battery coils 120 of the motor battery by secondary power source 206, as shown. Secondary power source 206 preferably comprises a regenerative braking system and/or alternator/generator 208 powered by an external source, as shown. Upon reading the teachings of this specification, those of ordinary skill in the art will now understand that, under appropriate circumstances, considering such issues as user preference, intended use, etc., other secondary power arrangements, such as inductive couplings, fuel cells, secondary batteries, flywheel storage systems, internal combustion-based generators, storage capacitors, Sterling-cycle heat recovery devices, etc., may suffice.

Figure 26:
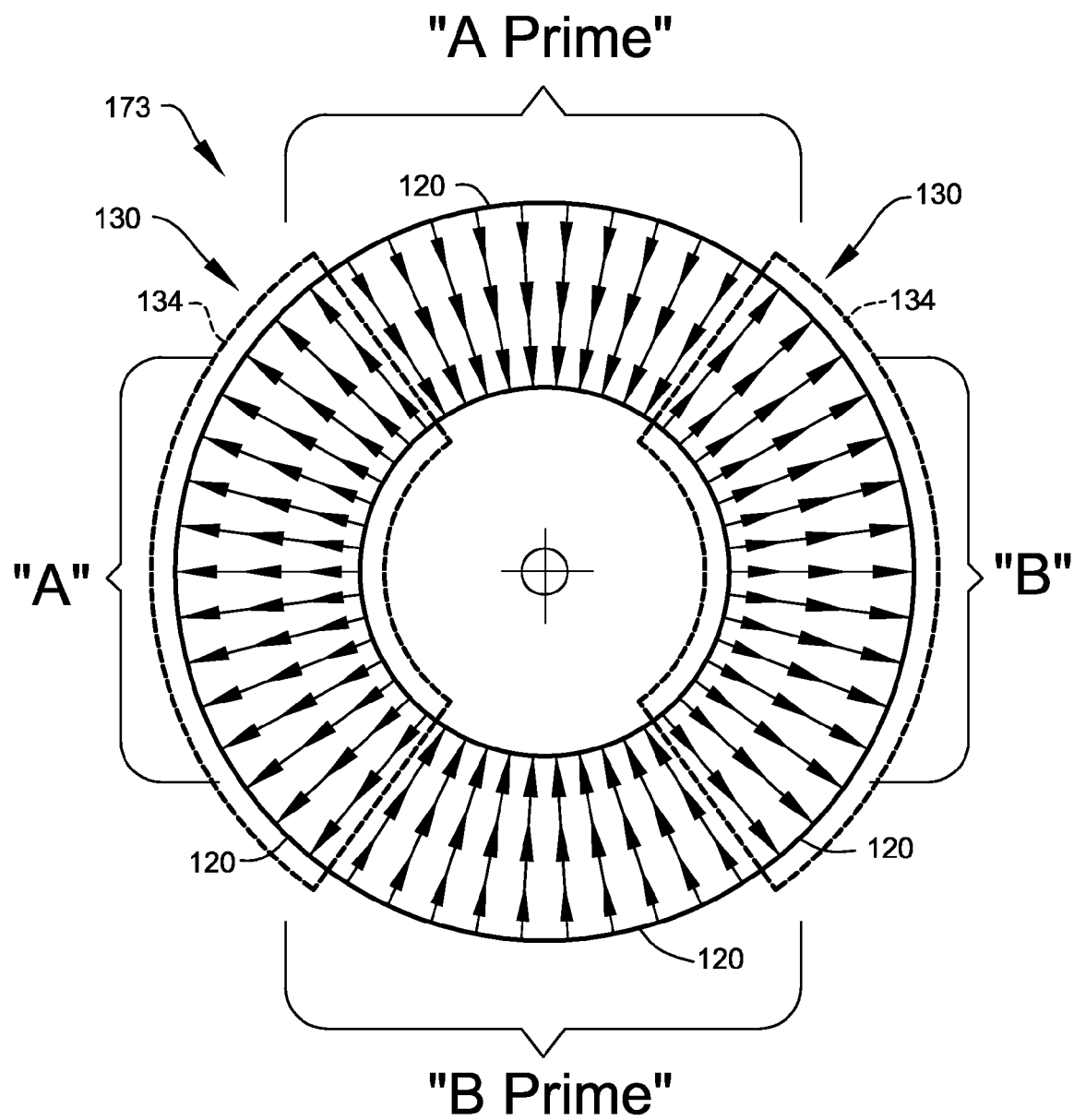
FIG. 26 shows a side view schematically illustrating a preferred coil arrangement, within a four coil radial motor battery, according to preferred embodiment of the present invention.

FIG. 26 shows a side view schematically illustrating a preferred coil arrangement, within four-coil radial motor battery 173, according to preferred embodiment of the present invention. Preferred orientations of current flows in the power and charging cell coils is shown. Note that magnetic pole-shoes 134 of field magnets 130 do not interact with charging coils "A Prime" and "B Prime".

Note that the direction of the current flow in coil "A" and coil "A Prime" is radially outward while the direction of the current flow in coil "B" and coil "B Prime" is radially inward. With this preferred arrangement, the pole orientation of the field coils must be reversed every 180 degrees. However, in alternate preferred embodiments of motor-battery system 100, the direction of all coils may be made identical thus producing a "uni-pole" motor. In this alternate preferred embodiment, the direction of the current does not have to be reversed every 180 degrees. The field may then be provided by permanent magnets or, alternately, the permanent magnets may be integral to the armature rotor and the battery coils arranged to provide the field coils. The function of brushes 156 in this preferred alternate arrangement would be to simply couple the coil-generated current to an external motor controller. Upon reading the teachings of this specification, those of ordinary skill in the art will now understand that, under appropriate circumstances, considering such issues as user preference, intended use, advances in technology, etc., other motor control arrangements, such as eliminating the brushes completely by integrating modern electronics, with remote control capabilities, into the rotor to provide the on and off switching of the coil current and to provide a modern Pulse Width Modulation (PWM) or other method of speed control and battery charging circuitry, etc., may suffice.

Furthermore, upon reading the teachings of this specification, those of ordinary skill in the art will now understand that, under appropriate circumstances, considering such issues as intended use, etc., other coil arrangements, such as the development of alternate embodiments utilizing four electromagnetic shoes (that do not use permanent magnets), etc., may suffice. In such an embodiment, all four of the electromagnetic field coils may be energized when full power was being extracted from such a motor. Such an arrangement would place all coil cells under a magnetic field and maximize the torque produced.

In addition, upon reading the teachings of this specification, those of ordinary skill in the art will now understand that, under appropriate circumstances, considering such issues as intended operation, materials selection, etc., other coil energizing arrangements, such as allowing two coils to be left un-energized during operation thus allowing the coil cells to cool off during a portion of each revolution (to maximize battery life), allowing a control circuit to sense when the brakes were being applied and provide current to all electromagnetic field coils (allowing all four coil cells to be charged via regenerative braking), etc., may suffice. It is further noted that, within the afore-mentioned arrangements, none of the electromagnetic field coils may be energized during external charging of such a motor-battery from the electrical power grid. It is also noted that such options would not be available if permanent magnets were used. In such permanent-magnet configurations, the magnetic field could not be controlled electrically and the rotor would have to be locked mechanically during external recharging from the power grid.

Moreover, upon reading the teachings of this specification, those of ordinary skill in the art will now understand that, under appropriate circumstances, considering such issues as intended use, etc., other charging arrangements, such as charging the "A-prime" and "B-prime" cell coils of an electric vehicle from an onboard gasoline engine to keep the cell coils charged to within a preferred range of depletion to maximize battery life may suffice. In this case, preferably, the cell coils do not have to extend for 90 degrees each. The 360 degrees available may be apportioned as required or preferred by the vehicle designer (although there must be a minimum of two of cell coils to provide the necessary commutation). It is further noted that the speed of non-permanent-magnet embodiments may be regulated by controlling either the current through electromagnetic field coils of a stator or the current through the coil cells of a rotor.

Figure 27:
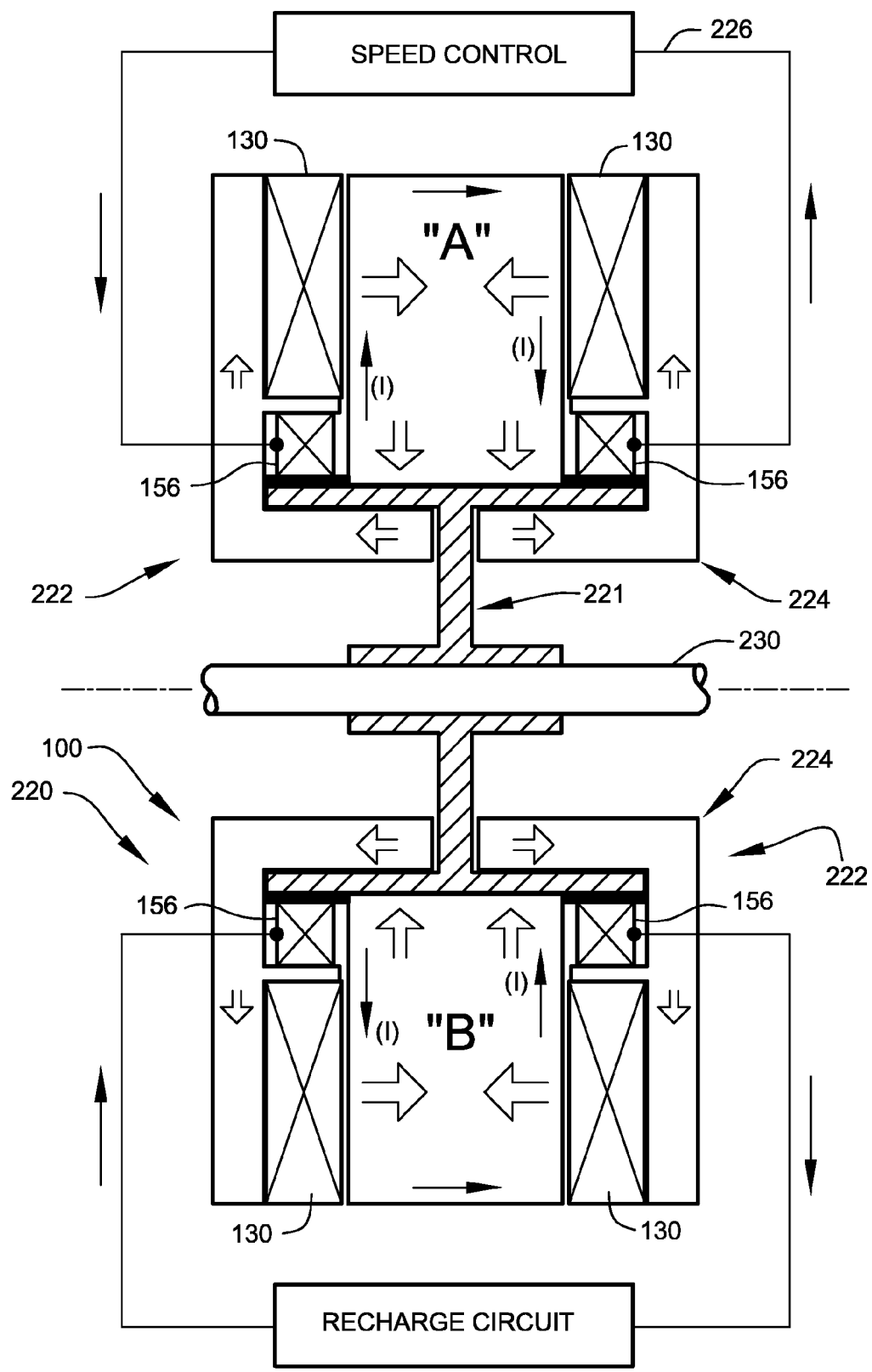
FIG. 27 shows a sectional view schematically illustrating an alternate radial motor battery comprising a permanent magnet stator assembly, according to a preferred embodiment of the present invention.

FIG. 27 shows a transverse sectional view schematically illustrating an alternate radial motor battery 220 comprising permanent magnet stator assembly 222, according to a preferred embodiment of the present invention. Numerous alternating current (AC) and direct current (DC) embodiments of Motor-battery system 100 are possible, as shown. A preferred embodiment comprising permanent magnet stators and four-coil rotor 221 is shown in FIG. 27. Alternate radial motor battery 220 preferably comprises cell coil "A", cell coil "B", permanent magnet 130, shoe and brush holder assembly 224, brushes 156 serving cell coil "A", cell coil "B, speed controller circuit 226, cell recharging circuit 228, as shown. Preferably, mechanical power is extracted from the system at drive shaft 230, as shown. Coil "A Prime", coil "B Prime", brushes, and associated charging circuit are preferably located 90 degrees from the depicted transverse sectional view.

In the depicted armature position, the preferred electrical current flows within coil "A" and coil "B" are denoted by the small arrow indications and adjoining (I) symbols. The magnetic field orientations within permanent magnet stator assembly 222 are denoted by the large arrow indications. Upon reading the teachings of this specification, those of ordinary skill in the art will now understand that, under appropriate circumstances, considering such issues as intended use, cost, etc., other magnetic arrangements within the rotor assembly, such as wound magnetic field coils, etc., may suffice.

Figure 28:
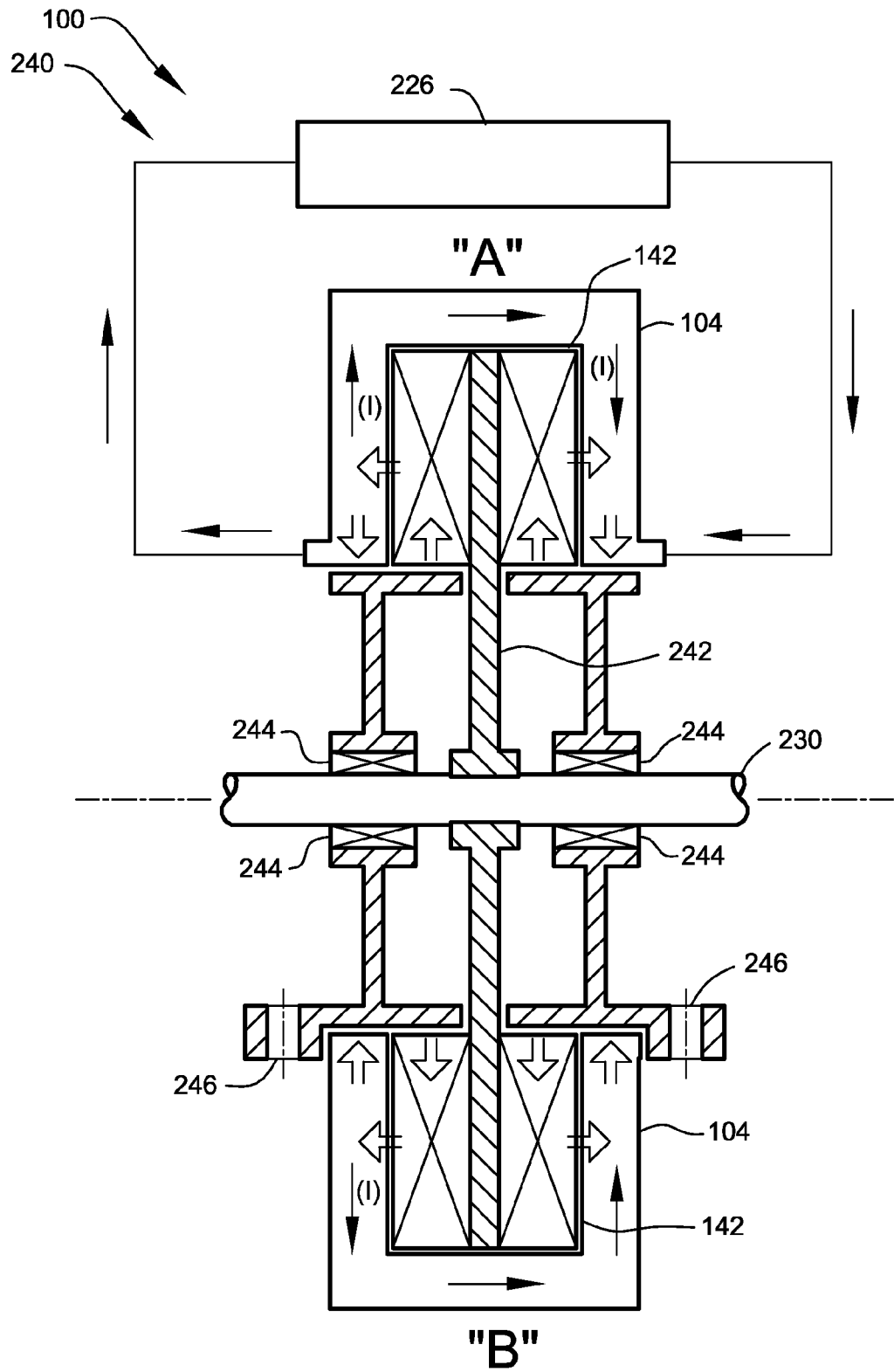
FIG. 28 shows a sectional view schematically illustrating an alternate radial motor battery comprising a permanent magnet rotor assembly, according to another preferred embodiment of the present invention.

FIG. 28 shows a transverse sectional view schematically illustrating alternate radial motor battery 240 comprising a permanent magnet rotor assembly 242, according to another preferred embodiment of the present invention. Alternate radial motor battery 240 preferably comprises permanent magnet rotor assembly 242, stator coil "A", stator coil "B", speed controller circuit 226. Preferably, permanent magnet rotor assembly 242 rotates within gap 142 of the positionally fixed electrochemical cells 104 of stator coil "A" and stator coil "B", as shown. Preferably, permanent magnet rotor 242 is mechanically coupled to drive shaft 230, as shown. Preferably, mechanical power (torque) generated by the rotation of permanent magnet rotor assembly 242 is extracted from the system at drive shaft 230, as shown. Stator structures supporting stator coil "A" and stator coil "B are preferably adapted to contain a plurality of bearings 244 functioning to rotationally support drive shaft 230, as shown. The stator structure further comprises mounts 246 adapted to assist mounting of alternate radial motor battery 240 to a mounting point of the intended application. Upon reading the teachings of this specification, those of ordinary skill in the art will now understand that, under appropriate circumstances, considering such issues as intended use, cost, etc., other magnetic arrangements within the rotor assembly, such as wound magnetic field coils, etc., may suffice.

Figure 29:
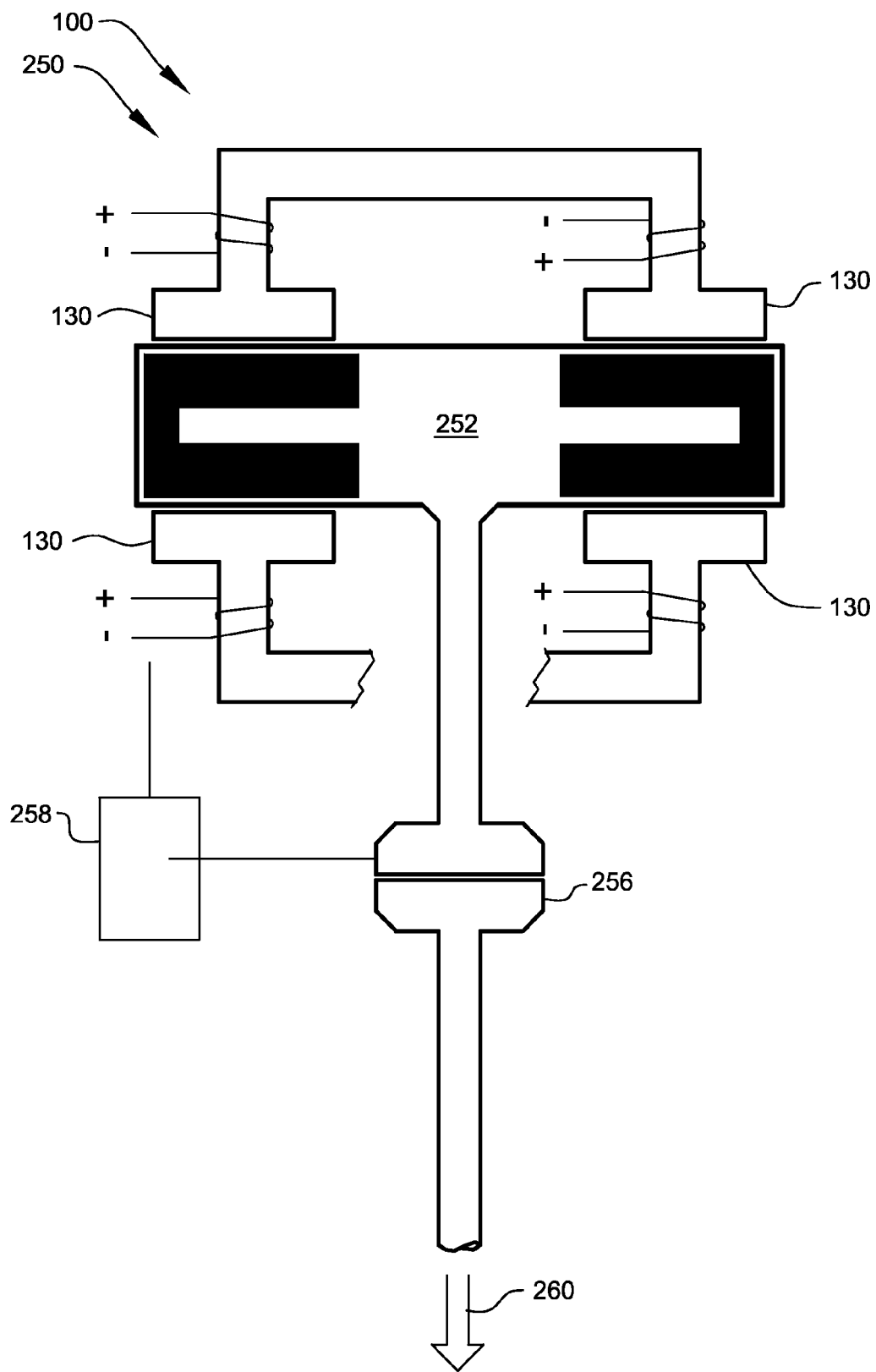
FIG. 29 shows generalized schematic illustrating a motor battery adapted to comprise a flywheel-type power storage device, according to another alternate embodiment of the present invention.

FIG. 29 shows generalized schematic illustrating alternate motor battery 250 of motor-battery system 100, preferably adapted to function as a flywheel-type power storage device, according to another alternate embodiment of the present invention.

In alternate motor battery 250, shaft energy is produced by the self-powered rotation of motor-battery flywheel 252, as shown. Preferably, excess kinetic energy not required for immediate propulsion is stored in the rotating mass of motor-battery flywheel 252. Preferably, this stored energy is extracted when needed for propulsion or other power requirements, as shown. Preferably, shaft 254 comprises variable coupler 256 functioning to couple and decouple shaft 254 from motor-battery flywheel 252 and load 260, as shown. Controller 258 preferably controls both the operation (rotational speed) of motor-battery coil 252 and operational timing of variable coupler 256, as shown. Preferably, flywheel 252 is kinetically self-charged but can also be charged by regeneration from an external source, such as vehicle during braking.

Alternate motor battery 250 is especially well suited as a power source for hybrid-electric vehicles. In this preferred application, alternate motor battery 250 is self-accelerated to a very high rotational speed. Once accelerated, alternate motor battery 250 is preferably adapted to maintain rotational speed for extended periods using low-friction arrangements, preferably including magnetically levitated bearings and/or by encapsulating motor-battery flywheel 252 within an air-evacuated housing. Preferably, alternate motor battery 250 is mechanically connected to the drive wheels of the vehicle and power is extracted to propel the vehicle.

Figure 30:
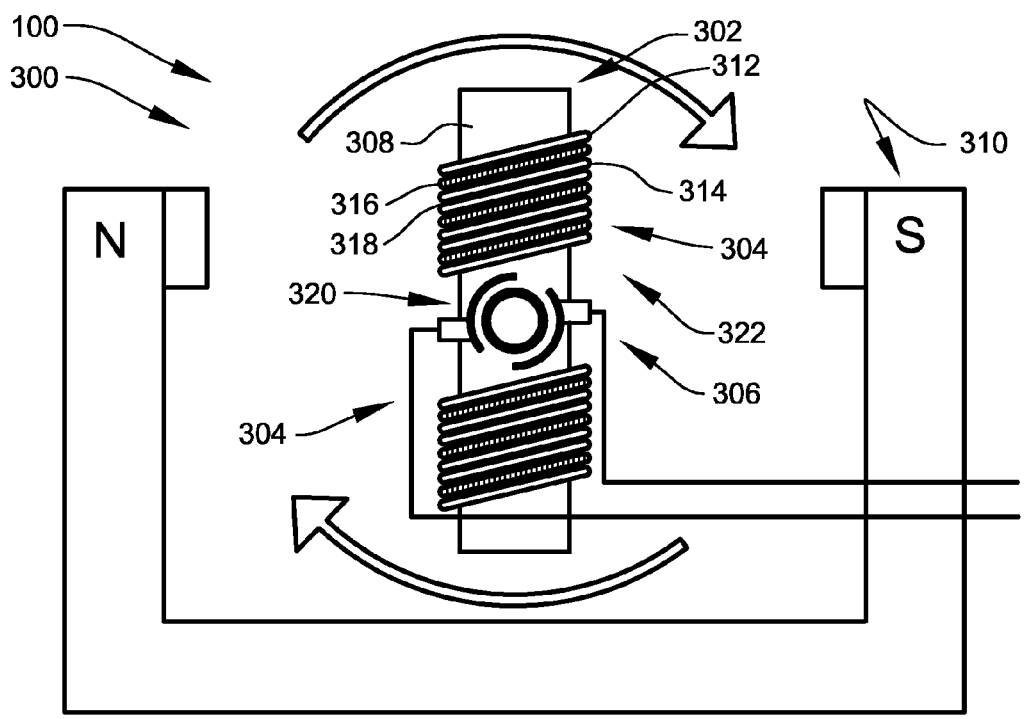
FIG. 30 shows generalized schematic, illustrating an alternate motor battery comprising an armature having dual windings arranged to form at least one magnetic-field-producing battery-coil, according to another preferred embodiment of the present invention.

FIG. 30 shows a generalized schematic, illustrating alternate motor battery 300, according to another preferred embodiment of the present invention. Preferably, alternate motor battery 300 comprises armature 302 rotatably supported within at least one magnetic field generated by stator assembly 310, as shown. Armature 302 preferably comprises magnetically conductive core 308 supporting dual windings 304, as shown. Preferably, dual windings 304 comprise a series of parallel conductive windings preferably separated by arrangements of electrolytic and isolative layers. More specifically, dual windings 304 preferably comprise anode winding 312, cathode winding 314, electrolyte layer 316, and isolative layer 318, as shown. Preferably, electrolyte layer 316 is disposed in operative relation between anode winding 312 and cathode winding 314, as shown. Preferably, isolative layer 318 is disposed between anode winding 312 and cathode winding 314 to prevent current shorting across the conductors, as shown. This preferred arrangement forms at least one electrochemical cell 322. Preferably, armature 302 is thus structured and arranged to form at least one magnetic-field-producing battery-coil 306, preferably capable of producing at least one salient magnetic pole, and furthermore preferably capable of storing and delivering electrical current usable to generate the operating magnetic field of the at least one salient magnetic pole. Preferably, the field current is generated substantially entirely within the windings. The resulting flow of current within magnetic-field-producing battery-coil 306 is preferably controlled through commutation, preferably by commutator arrangement 320, as shown. Preferred commutation within alternate motor battery 300 preferably follows the general strategies described within the prior embodiments.

Figure 31A:
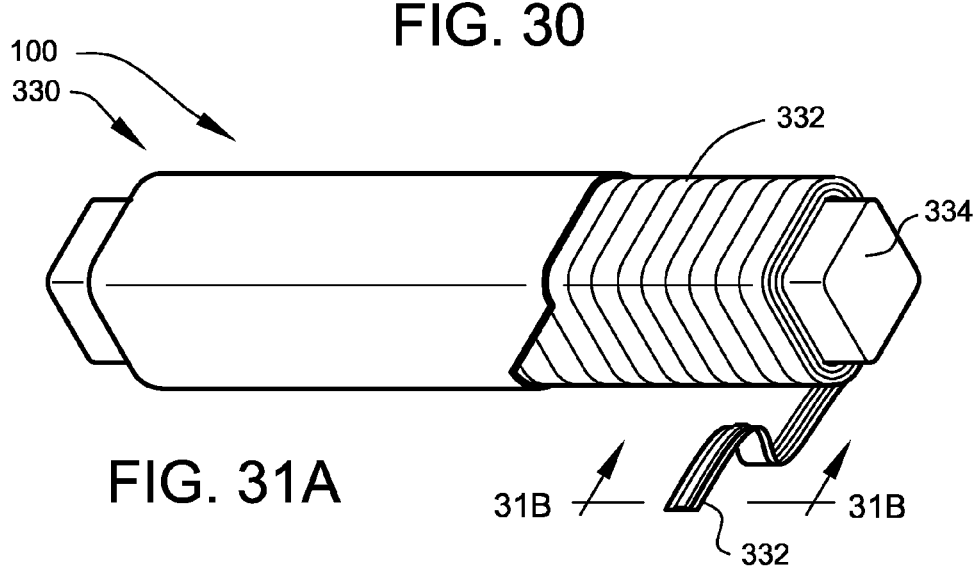
FIG. 31A shows a perspective view of a magnetic-field-producing battery-coil for a rotary electric device comprising at least one electrically-conductive thin-film battery cell wound around a magnetically conductive core, according to another preferred embodiment of the present invention.
Figure 31B:
FIG. 31B shows a sectional view through the section 31B-31B of FIG. 31A.

FIG. 31A shows a perspective view of magnetic-field-producing battery-coil 330 for a rotary electric device comprising at least one electrically-conductive thin-film battery cell 332 preferably located around a central core, preferably magnetically conductive core 334, as shown. FIG. 31B shows a sectional view through the section 31B-31B of FIG. 31A. Preferably, magnetic-field-producing battery-coil 330 (at least embodying herein a wound magnetic field coil) is useful in the construction of rotary electric devices (such as, electric motors, electric generators, electric alternators, and the like). Upon reading the teachings of this specification, those of ordinary skill in the art will now understand that, under appropriate circumstances, considering such issues as intended use, cost, etc., other core arrangements, such as air cores, etc., may suffice.

Unlike magnetic-field-producing battery-coil 306, magnetic-field-producing battery-coil 330 preferably comprises field windings composed of one or more battery cells, most preferably, electrically-conductive thin-film battery cell 332, as shown. Preferably, each electrically-conductive thin-film battery cell 332 is supplied as a substantially flexible ribbon having a longitudinal length substantially greater that its maximum width, as shown (it is noted that the depicted width of electrically-conductive thin-film battery cell 332 is not to scale and has been exaggerated to aide in illustration). Upon reading the teachings of this specification, those of ordinary skill in the art will now understand that, under appropriate circumstances, considering such issues as production methodologies, advances in technology, production cost, etc., other ribbon width arrangements, such as producing ribbons having widths approaching those of a conventional copper winding, etc., may suffice.

Figure 38:
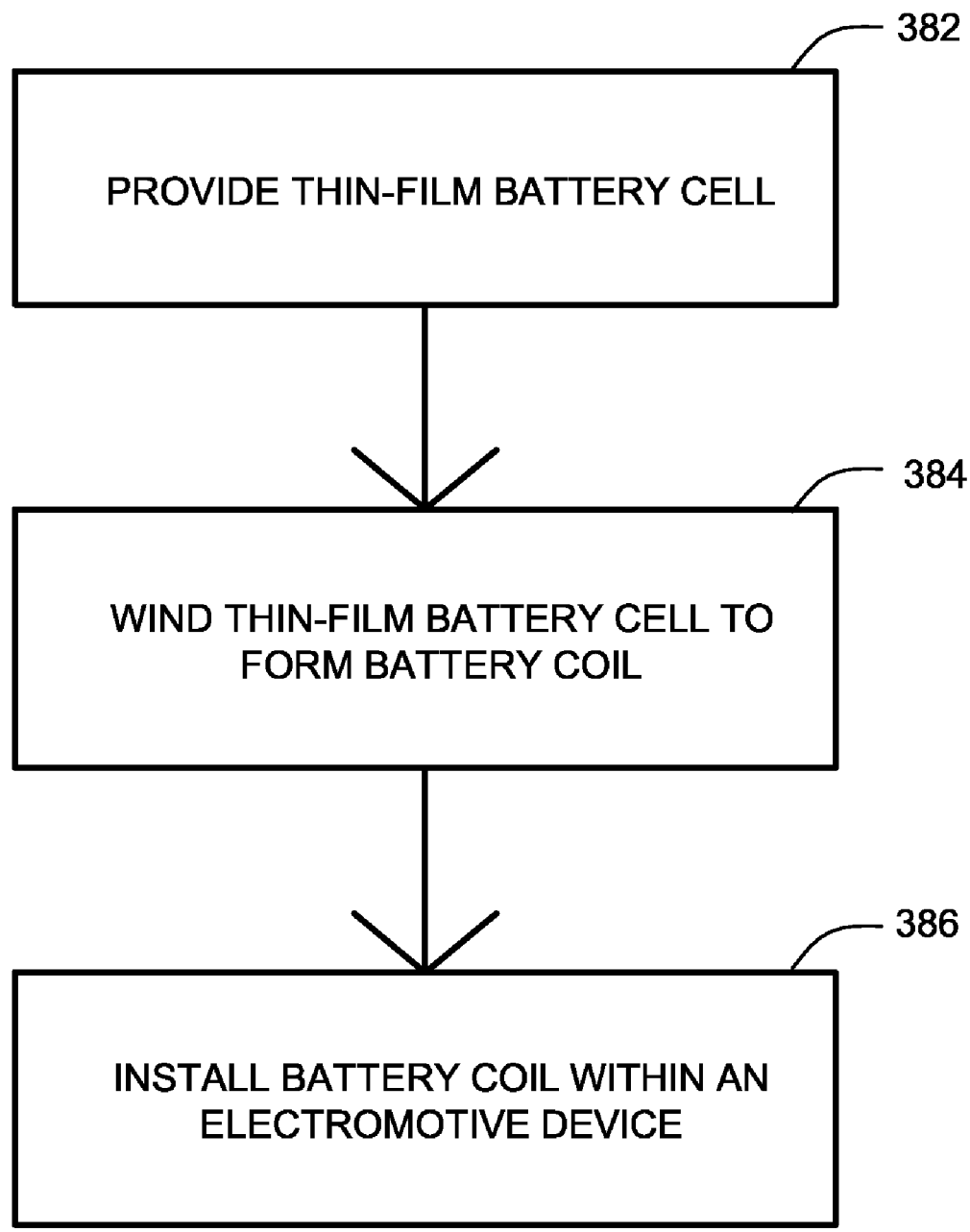
FIG. 38 shows a diagram, illustrating a preferred method of forming the magnetic-field-producing battery-coil of FIG. 31A, according to a preferred method of the present invention.

Preferably, electrically-conductive thin-film battery cell 332 comprises sufficient flexibility to allow the above-described winding to occur. FIG. 38 shows a diagram, generally illustrating the preferred steps used in forming magnetic-field-producing battery-coil 330.

As in the prior electrochemical cell embodiments, electrically-conductive thin-film battery cell 332 is structured and arranged to produce electrical current derived from at least one electrochemical process. Such electrical current is preferably used to generate at least one magnetic field within magnetic-field-producing battery-coil 330.

Thin film solid-state batteries are preferably constructed by depositing the components of the battery as thin films (less than 5 μm) on at least one supportive substrate. A preferred embodiment of electrically-conductive thin-film battery cell 332 preferably comprises at least one flexible substrate 338 (at least embodying herein at least one supportive substrate) supporting at least one cathode 342 in operative relation with at least one cathode current collector 340, at least one anode 346 in operative relation with at least one anode current collector 348, and at least one electrolyte 344 structured and arranged to support the above-described electrochemical process. Preferably, electrolyte 344 is disposed in operative relation with both anode 346 and cathode 342, as shown in FIG. 31B. At least one flexible polymer foil is preferably used as flexible substrate 338. Preferably, a low temperature deposition process is used to construct electrically-conductive thin-film battery cell 332, as further described below. Such a preferred low temperature deposition process is used, for example, in commercial thin-film battery cells made by Excellatron Solid State LLC. of Atlanta, Ga. (URL: www.excellatron.com). Most current thin-film battery technologies utilize a lithium-based chemistry. Upon reading the teachings of this specification, those of ordinary skill in the art will now understand that, under appropriate circumstances, considering such issues as design preference, intended use, advances in technology, etc., other thin-film battery chemistries, such as carbon zinc, zinc manganese dioxide, biomaterials, nanomaterials, future technologies, etc., may suffice.

Preferably, cathode current collector 340 and anode current collector 348 are deposited by sputtering of an appropriate metal in an argon (Ar) atmosphere (at a thickness of approximately 0.3 μm). Preferably, cathode films of $LiC_oO_2$ or $LiMn_2O_4$ are deposited by radio frequency magnetron sputtering of sintered targets of the respective compounds in $Ar+O_2$, while films of $V_2O_5$ are deposited by reactive sputtering of V in $Ar+O_2$. Preferably, a sputtered LiPON electrolyte film covers cathode 342 and a portion of flexible substrate 338 up to anode current collector 348, in order to isolate substrate 338 from anode 346. Preferably, a protective layer 337 may be applied to protect the assembly.

Preferably, electrically-conductive thin-film battery cell 332 comprises at least one lithium-based chemistry. For a thin-film lithium battery cell, a thin layer of lithium metal is thermally evaporated on LiPON as anode 346. For a thin-film lithium-ion battery, a layer of $Sn_3N_4$ (deposited by sputtering of Sn target in $N_2$ environment) is used as anode 346. It is noted that the configuration and operation of such electrically-conductive thin-film battery cells are described in greater detail in, for example, U.S. Pat. No. 6,835,493 to Zhang et al., incorporated herein by reference for further examples of implementation engineering. Upon reading the teachings of this specification, those of ordinary skill in the art will now understand that, under appropriate circumstances, considering such issues as intended use, cost, etc., other creation/energy storage arrangements, such as the use of windings comprising battery plates (wet or dry), super capacitors, etc., may suffice.

Conventional rechargeable batteries have significant capacity fade at temperatures higher than 60° Centigrade (C.). Electrically-conductive thin-film battery cell 332, as constructed in the above descriptions, preferably comprises comparatively high temperature stability. Thin-film battery cells of the above-described type may operate at temperatures up to about 150° C. This preferred thermal characteristic makes electrically-conductive thin-film battery cell 332 especially well suited for use in high-powered rotary electric devices, such as, for example, electric vehicle drive motors, as further described in FIG. 32.

FIG. 32 shows a perspective view illustrating alternate radial motor battery 350 according to a preferred embodiment of the present invention. FIG. 33 shows a front view illustrating alternate radial motor battery 350 of FIG. 32. FIG. 34 shows a side view illustrating alternate radial motor battery 350. FIG. 35 shows a perspective view including a partial cutaway through the section 35-35 of FIG. 33. FIG. 36 shows a sectional view through the section 36-36 of FIG. 33. FIG. 37 shows an exploded perspective view illustrating preferred components of alternate radial motor battery 350. Preferably, alternate radial motor battery 350 is constructed using field coils generally matching the preferred structures and arrangements of magnetic-field-producing battery-coil 330 (see again FIG. 31A). It is further noted that bearings and other support structures have been omitted from the illustration for clarity.

Preferably, alternate radial motor battery 350 comprises rotor assembly 354 rotatably supported within stator assembly 352, as shown. Preferably, rotor assembly 354 and stator assembly 352 are separated by radial air gap 356, as shown. Preferably, stator assembly 352 comprises at least one, preferably a plurality of radially-arranged stator magnetic-field-sources 358, as shown. Preferably, each stator magnetic field sources 358 structured and arranged to produce at least one salient magnetic pole oriented toward rotor assembly 354 and extending through radial air gap 356, as shown.

Preferably, each stator magnetic-field-source 358 is produced by at least one wound magnetic field coil 362, as shown. Preferably, each magnetic field coil 362 comprises a construction substantially similar to magnetic-field-producing battery-coil 330, as previously noted above. More specifically, magnetic field coil 362 comprises at least one magnetically conductive core 364 and at least one field winding 366 wound around magnetically conductive core 364, as shown. Preferably, magnetically conductive core 364 comprises soft iron or an iron alloy. Each magnetically conductive core 364 may preferably comprise magnetic pole-shoes 365 functioning to direct the magnetic field across an extended region of interaction. Outer support structures 367 preferably function to maintain positioning of the stator elements, as shown.

Field windings 366 preferably comprise the above-described electrically-conductive thin-film battery cells 332, each one preferably adapted to produce electrical current derived from at least one electrochemical process. Preferably, electrical current derived from electrically-conductive thin-film battery cells 332 is used to energize magnetic field coil 362 to produce a magnetic field forming the magnetic poles.

Preferably, rotor assembly 354 comprises at least one, preferably a plurality of rotor magnetic-field-sources 360, each one preferably structured and arranged to produce at least one salient magnetic pole oriented to face stator assembly 352 through radial air gap 356. Preferably, each rotor magnetic-field-source 360 comprises a permanent magnet 368 adapted to generate a salient magnetic pole within rotor assembly 354. Rotor assembly 354 preferably comprises cylindrical core 361, as shown. The interior of cylindrical core 361 is partially hollow and may preferably be used to house electronic circuits, transmission gears, etc., as required.

Preferably, the permanent magnets 368 are recessed into the surface of the outside circumference of rotor assembly 354, as shown. It is preferred that stator assembly 352 comprise 16 magnetic field coil 362 to match the 16 magnets permanent magnets 368 of rotor assembly 354. Rare-earth permanent magnets are preferred for use as permanent magnets 368 due to their inherent high magnetic fields and low losses. This preferred characteristic assists in the generation of relatively constant torque for a given current flow within magnetic field coil 362. This preferred characteristic is very useful for many industrial applications, and is especially useful in land vehicle drive systems. Rare earth permanent magnets suitable for use as permanent magnets 368 include those of the NdFe group and alternately preferably include permanent Samarium Cobalt magnets (SmCo). Upon reading the teachings of this specification, those of ordinary skill in the art will now understand that, under appropriate circumstances, considering such issues as intended use, cost, etc., other magnetic arrangements within the rotor assembly, such as ceramic magnets, ferrite magnets, wound magnetic field coils, etc., may suffice.

Preferably, electromotive interaction between two or more respective salient magnetic poles of rotor assembly 354 and stator assembly 352 results in rotational movement that is preferably converted into motive power output at shaft 370. More specifically, each salient magnetic pole of rotor assembly 354 comprises at least one relational arrangement to each salient magnetic pole of stator assembly 352. In such a preferred physical arrangement, rotation of rotor assembly 354 is enabled by an armature reaction between rotor assembly 354 and stator assembly 352 (in combination with a means for dynamically controlling the flow of electrical current within magnetic field coils 362).

In preferred embodiments of the present invention, the hollow frustoconical void 371 occurring on each side of stator assembly 352 is filled with an additional electrochemical cell 372, as shown. This preferably provides additional energy storage capacity within alternate radial motor battery 350. In addition, electrochemical cell 372 may be utilized as a secondary means for field generation.

Alternate radial motor battery 350 is preferably adaptable to a range of rotary electric device applications. It is anticipated that alternate radial motor battery 350 may operate over a speed range of about 10 to 1. This preferably eliminates the need for a transmission in most vehicle applications (other than the most demanding low-speed/high-torque applications). It is further noted that, alternate radial motor battery 350 may preferably comprise one large motor, to be installed within a vehicle in the manner of a conventional engine, or alternately preferably, may comprise a set of smaller motors that could be mounted within each wheel. The preferred direct drive (no transmission) capability of alternate radial motor battery 350 may make such "distributed" arrangements feasible, especially if the controls were built into the hollow portion of rotor assembly 354. For example, a preferred embodiment may preferably comprise a road-going tire mounted to the outside of the above-described motor battery. In this way, the weight of the wheel and rim are eliminated in vehicles that comprise a motor battery at each wheel. Upon reading the teachings of this specification, those of ordinary skill in the art will now understand that, under appropriate circumstances, considering such issues as intended use, marketing, etc., other motor-battery arrangements, such as a wheel-mounted motor-battery configuration offered as a conversion kit to adapt conventional vehicles to all-electric or hybrid-electric power, utilizing permanent magnets within the stator, etc., may suffice. Computerized development tools may preferably be utilized to assist in the design of specific motor-battery applications. For example, RMxprt software by Ansoft Corporation of Pittsburgh, Pa. may be used to assist the design, analysis, and simulation of the preferred embodiments of motor-battery system 100 described herein.

Alternate radial motor battery 350 is well suited to operation under high-performance electronic controllers used in electric vehicle applications. Such preferred controllers achieve improved performance by delivering a series of high current pulses to the field coils. The preferred thin-film cells of alternate radial motor battery 350 are well suited to handle these pulses. Such preferred high-performance controllers include automotive electronic motor controllers produced by, for example, UQM Technologies, Inc. of Frederick, Colo.

FIG. 38 shows a diagram, illustrating preferred method 380 of forming magnetic-field-producing battery-coil 330 of FIG. 31, according to a preferred method of motor-battery system 100. It is noted that the initial preferred step of method 380 preferably presupposes that at least one new or existing magnetically conductive core 334 has been provided as a starting point.

Preferably, at least one electrically-conductive thin-film battery cell 332 is provided as indicated in preferred step 382. It is preferred that this electrically-conductive thin-film battery cell generally follows the preferred structures and arrangements of electrically-conductive thin-film battery cell 332 of FIG. 31A and FIG. 31B. Next, as indicated in preferred step 384, electrically-conductive thin-film battery cell 332 is wound around magnetically conductive core 334 to form magnetic-field-producing battery-coil 330 (as shown in FIG. 31A). In a subsequent preferred step of method 380, magnetic-field-producing battery-coil 330 is incorporated into at least one electromotive device structured and arranged to produce at least one useable mechanical force, as indicated in preferred step 386. Such an electromotive device may preferably comprise alternate radial motor battery 350.

Figure 39:
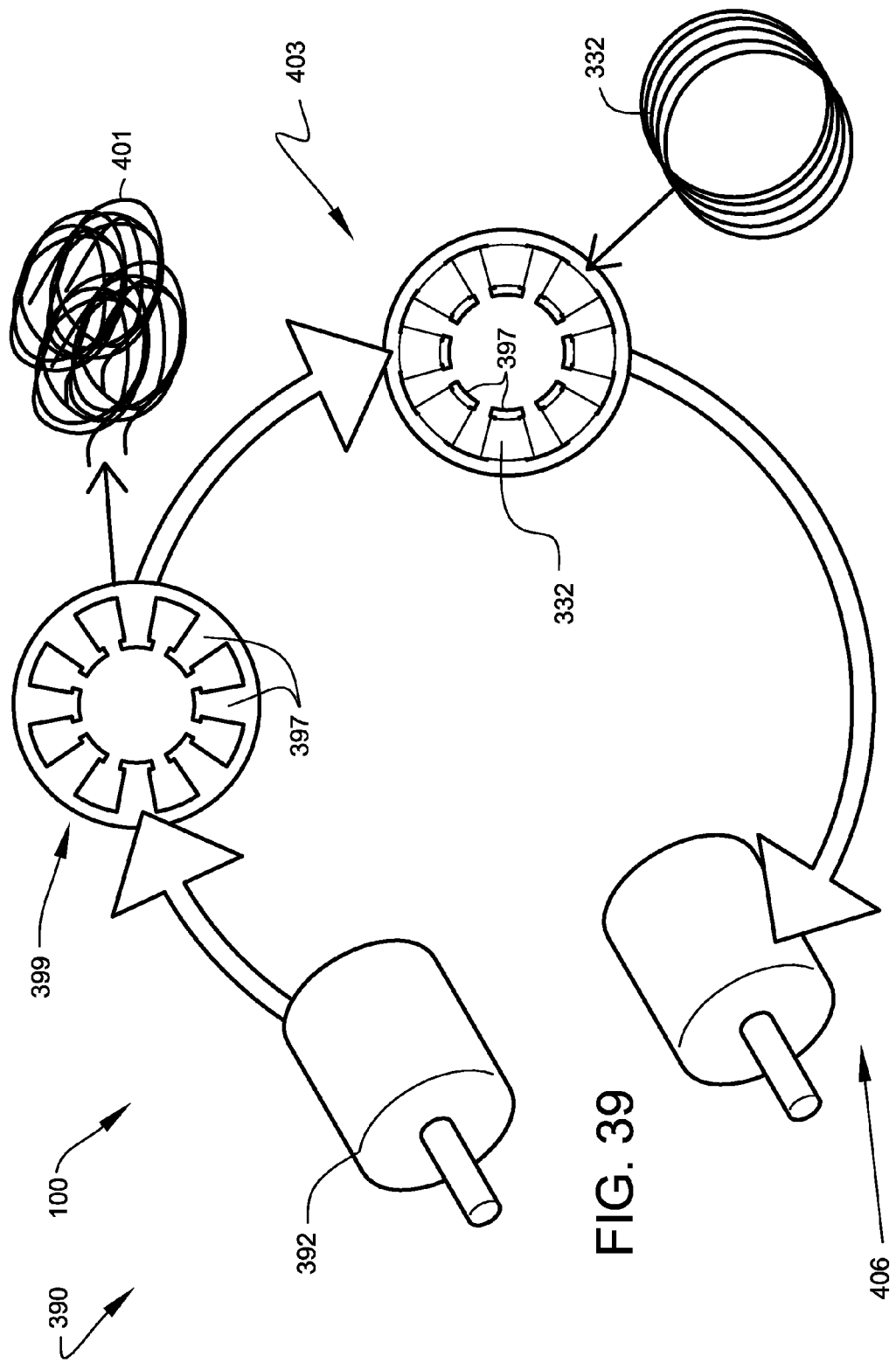
FIG. 39 shows a diagram, illustrating a preferred method of modifying a conventional electric motor to form a preferred motor-battery embodiment.

FIG. 39 shows a diagram, illustrating preferred method 390 of modifying conventional electric motor 392 to form a preferred motor-battery embodiment 394, according to a preferred method and embodiments of motor-battery system 100. The preferred steps of method 390 comprise the disassembly of conventional electric motor 392 followed by the replacement of the conventional copper windings with electrically-conductive thin-film battery cells 332 of the same general dimensions. This preferred modification produces a combined electric motor-battery 398 containing magnetic-field coil-windings comprising the above-described electrically-conductive thin-film battery cells 332. It is noted that the above-described modification is essentially "transparent" to the control system of conventional electric motor 392. Preferably, conventional electric motor 392 may comprise an "off the shelf" unit. Preferably, electrically-conductive thin-film battery cells 332 in the configuration of a continuous ribbon may be produced specifically for the rotary electric device to be modified under method 390.

Thus, there is described herein, method 390 related to converting conventional electric motor 392 (a conventional rotary electric device) to at least one combined electric motor-battery 398. First, substantially all the copper (or equivalent) windings 401 are removed from of copper-wound stator coils 395 leaving bare the magnetically-conductive cores 397, as indicated in preferred step 399. Next, as indicated in preferred step 403, a sufficiently long ribbon of electrically-conductive thin-film battery cell 332 is provided. Next, the ribbon of electrically-conductive thin-film battery cell 332 is wound around the magnetically-conductive cores 397 to form at least one motor-battery embodiment 394, as indicated in preferred step 406. It is again noted that electrically-conductive thin-film battery cell 332 is structured and arranged to produce electrical current derived from at least one electrochemical process; and such electrical current is usable to generate at least one magnetic field within the resulting magnetic-field-producing battery-coils of motor-battery embodiment 394.

Figure 40:
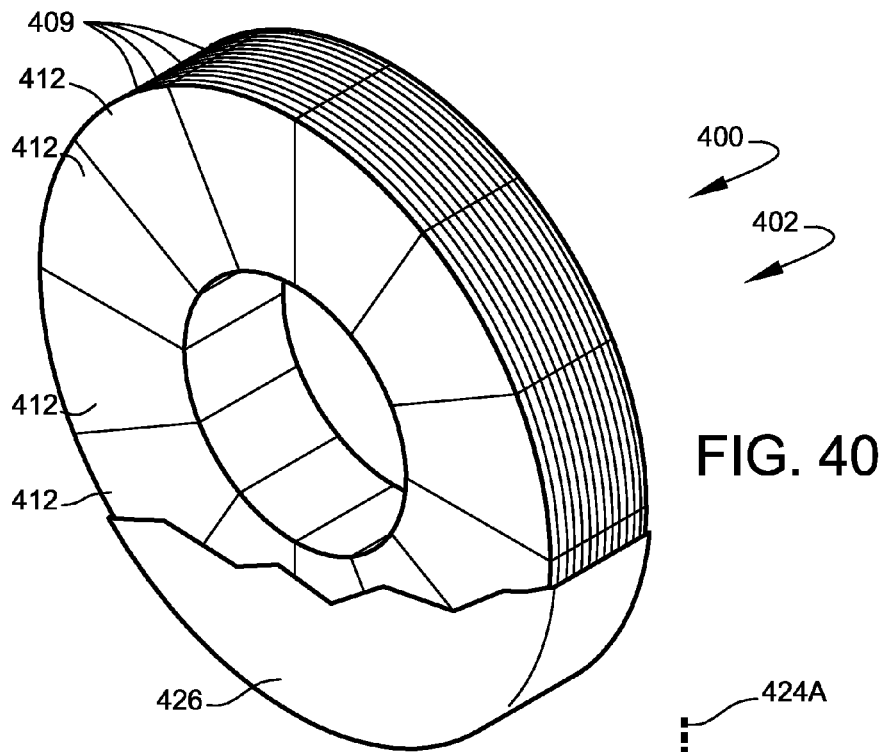
FIG. 40 shows a perspective view, in partial section, schematically illustrating preferred arrangements of an alternate motor-battery assembly, utilizing a laminated plate construction, according to another preferred embodiment of the present invention.
Figure 41:
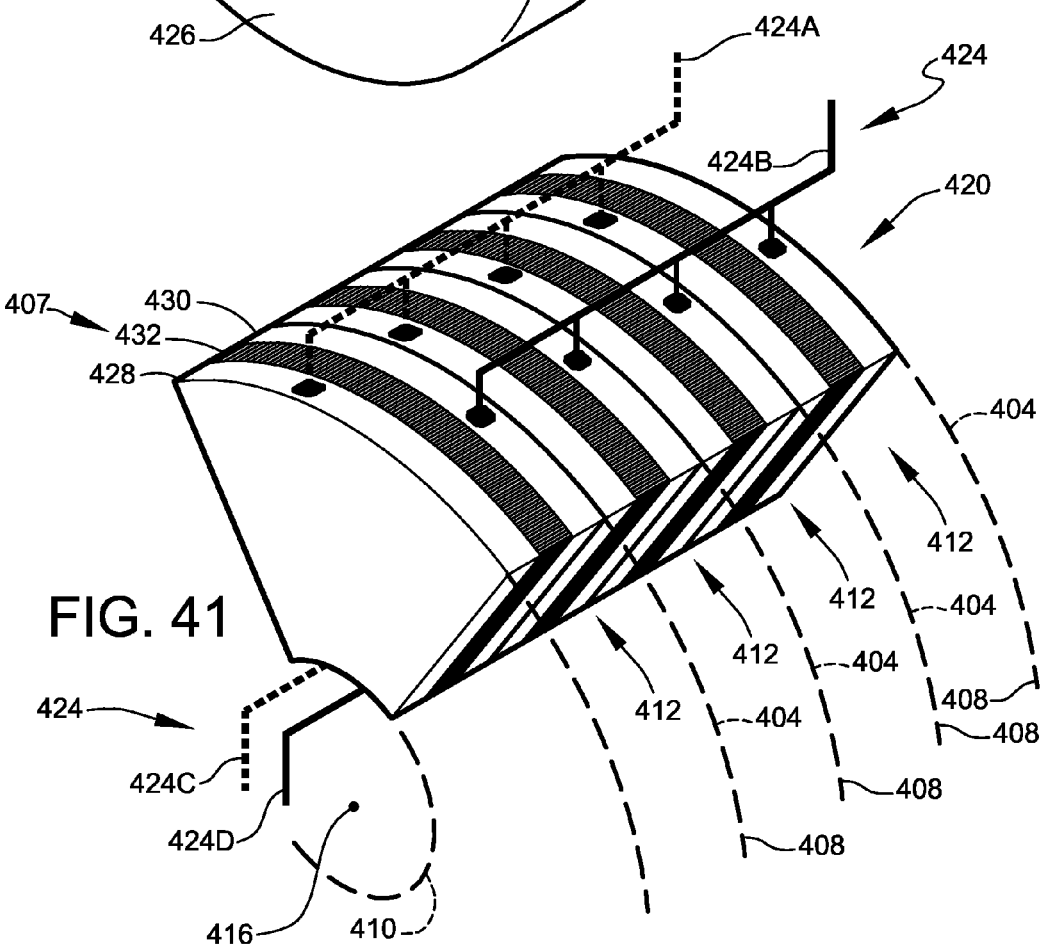
FIG. 41 shows a diagrammatic perspective view, schematically illustrating four cells of the alternate motor-battery assembly of FIG. 40, isolated from the assembly for descriptive purposes.

FIG. 40 shows a perspective view, in partial section, schematically illustrating preferred arrangements of an alternate motor-battery assembly 400, comprising a preferred laminated plate construction 402, according to another preferred embodiment of the present invention. FIG. 41 shows a diagrammatic perspective view, schematically illustrating a stacked arrangement of four current-producing cells 412 deposited on four motor-battery laminations 409, isolated from the overall assembly for illustrative purposes.

The preferred laminated plate construction 402 of alternate motor-battery assembly 400 preferably comprises a plurality of dimensionally thin plate-like substrates, each one supporting a thin electrolytic layer. The preferred laminated plate construction 402 of alternate motor-battery assembly 400 preferably comprises at least one magnetically-conductive substrate 404 (see FIG. 42) to provide a magnetically-conductive support for electrochemical-cell layers 407 (at least embodying herein an electrochemical energy source structured and arranged to produce at least one electrical potential from at least one electrochemical process). Magnetically-conductive substrate 404 preferably comprises at least one material having a low magnetic reluctance. Magnetically-conductive substrate 404 most preferably comprises at least one substantially ferrous material, most preferably a thin steel foil. Upon reading this specification, those with ordinary skill in the art will now appreciate that, under appropriate circumstances, considering such issues as cost, advances in technology, intended use, etc., other material arrangements such as, for example, using ceramic magnetic materials, metallic alloys forming permanent magnets, magnetic resins/plastics, etc., may suffice.

To facilitate the integration of alternate motor-battery assembly 400 in a wide range of rotary-shaft and similar apparatus, the preferred physical geometry of magnetically-conductive substrate 404 is that of a circular disk, as shown. Upon reading this specification, those with ordinary skill in the art will now appreciate that, under appropriate circumstances, considering such issues as cost, user preference, etc., other geometric arrangements such as, for example, non-circular plates, rectilinear plates for linear applications (such as, rail guns), thicker plate arrangements, etc., may suffice.

Figure 42:
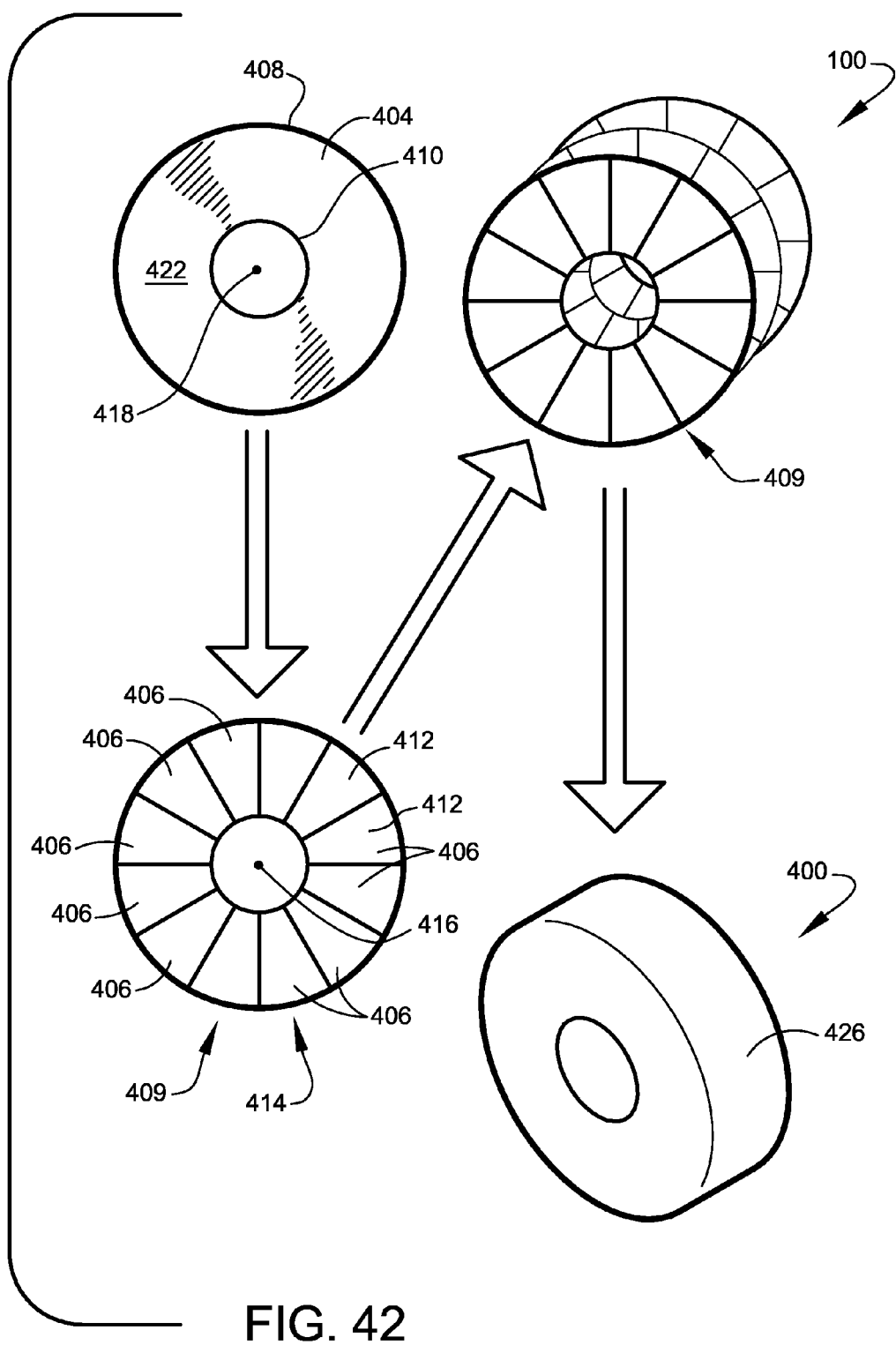
FIG. 42 shows a schematic diagram illustrating the primary preferred steps in the formation of the alternate radial motor-battery assembly of FIG. 40.

FIG. 42 shows a schematic diagram illustrating the primary preferred steps in the formation of alternate motor-battery assembly 400 of FIG. 40. Reference is now made to the illustration of FIG. 42, with continued reference to prior FIG. 40 and FIG. 41. A preferred method of constructing alternate motor-battery assembly 400 begins with the formation of the above-described magnetically-conductive substrate 404, preferably comprising an annular disk 408, preferably formed with a central aperture 410, as shown. In preferred embodiments of the system, each annular disk 408 comprises a flat steel foil having a thickness of about 0.002 inch. In a preferred arrangement, the ferrous material of magnetically-conductive substrate 404 comprises at least one electrically-isolative surface coating, preferably comprising at least one ferrous oxide compound. Since the disks are made from a ferrous material, they can be optionally magnetized to assist the magnetic field source, in alternate preferred embodiments of the device.

In a subsequent preferred step, electrochemical-cell layers 407 are preferably deposited on the surface of magnetically-conductive substrate 404, preferably resulting in the formation of a single motor-battery lamination 409, as shown. The electrochemical-cell layers 407 are preferably arranged to comprise a plurality of discrete current-producing cells 412, as shown. Each discrete current-producing cell 412 of the plurality preferably functions to produce at least one electrical potential from at least one electrochemical process. Such electrical potential is preferably used to produce, within the current-producing cell 412, a flow of electrical current generating an electromotive force in the presence of a magnetic field.

Each motor-battery lamination 409 preferably comprises a substantially radial arrangement 414 of current-producing cells 412, as shown. Such radial arrangement 414 preferably comprises a substantially uniform array of "pie-shaped" current-producing cells 412 organized about a central point of radial symmetry 416, preferably coincidental with the center point 418 of annular disk 408, as shown. For illustrative purposes, a preferred embodiment of disk 408 comprises a radially-symmetric arrangement of twelve discrete current-producing cells 412, each comprising a shape generally resembling a hollow sector of a circle, as shown. It is noted that other preferred embodiments of alternate motor-battery assembly 400 may comprise a greater or smaller number of current-producing cells 412, depending on the required capacity of the motor-battery device. As thin film battery technology and manufacturing reliability improve, larger cell areas producing fewer cells per disk may preferably be used. This may preferably reduce further manufacturing costs.

The above-described disk-preparation process is preferably repeated until a selected number of motor-battery laminations 409 are produced. The motor-battery laminations 409 are next preferably assembled in a stacked organization 420, as shown. FIG. 41 shows a partial diagrammatic perspective view, isolated from the overall assembly for illustrative purposes, schematically illustrating the preferred stacking of four motor-battery laminations 409. In the illustration of FIG. 41 the magnetically-conductive annular disks 408, as indicated by the dashed-line depiction, has been omitted from the view to better illustrate the preferred stacked arrangement of individual current-producing cells 412. The preferred stacked organization 420 is preferably aligned coaxially in an arrangement substantially perpendicular to the planar support surface 422 of annular disk 408, as shown. As the preferred system arrangements are inherently modular, any preferred number of motor-battery laminations 409 can be combined, in a manner akin to washers on a bolt, to produce preferred alternate motor-battery assemblies 400 as large as required (within the constraints established by the strength of the magnetic-field source, which establishes a magnetic circuit passing through stacked organization 420).

Individual electrical leads 424 are preferably affixed to each current-producing cell 412, preferably allowing the assembled alternate motor-battery assembly 400 to be operably coupled to an external controlling device adapted to control current flow within the cells. The principal construction of the alternate motor-battery assembly 400 is preferably completed by encapsulating the stack of motor-battery lamination 409 within a steel foil enclosure 426, as shown. Foil enclosure 426 is preferably sealed by laser-welding to provide a moisture-protective outer barrier.

Each current-producing cell 412 preferably comprises three electrochemical-cell layers 407, as shown. These preferably comprise at least one anode layer 428 and at least one cathode layer 430 preferably placed in interactive relation with at least one electrolytic layer 432 supporting the required electrochemical process. Anode layer 428, cathode layer 430, and electrolytic layer 432 are preferably formed by at least one thin-film deposition process. The thin-film battery layers preferably comprise total thickness of about 0.001 inches per disk. A mask is used to define which regions of the substrate will receive the thin-film layers.

Current-producing cells 412 preferably utilize a lithium-based chemistry. Preferred electrolyte chemistries support the production of secondary-type cells. Upon reading the teachings of this specification, those of ordinary skill in the art will now understand that, under appropriate circumstances, considering such issues as design preference, intended use, advances in technology, etc., other thin-film battery chemistries, such as carbon zinc, zinc manganese dioxide, biomaterials, nanomaterials, future technologies, etc., may suffice.

In the preferred embodiments of alternate motor-battery assembly 400, four individual leads 424 are preferably affixed to each current-producing cell 412, preferably permitting the flow of current to be reversed through the radial length of the cell. Upon reading this specification, those with ordinary skill in the art will now appreciate that, under appropriate circumstances, considering such issues as cost, preference, etc., other electrical lead arrangements such as, for example, using two leads in a homopolar motor configuration (In such a homopolar application, the current always flows in the same direction), may suffice. In all other applications, the current along the length of each current-producing cell 412 must have the preferred capability of being reversed in direction (even thought the direction of the electrons through the electrolyte is essentially always the same direction).

Preferably, as depicted in the preferred embodiment of FIG. 41, lead 424A electrically couples the outer periphery of one or more anode layers 428 and lead 424B electrically couples the outer periphery of one or more cathode layers 430. Preferably, lead 424C electrically couples the inner periphery of one or more anode layers 428 and lead 424D electrically couples the inner periphery of one or more cathode layers 430. Respective cell layers may preferably be coupled in parallel, as shown, with consideration preferably given to the maximum current-carrying capacity of the thin-film layers.

Figure 43:
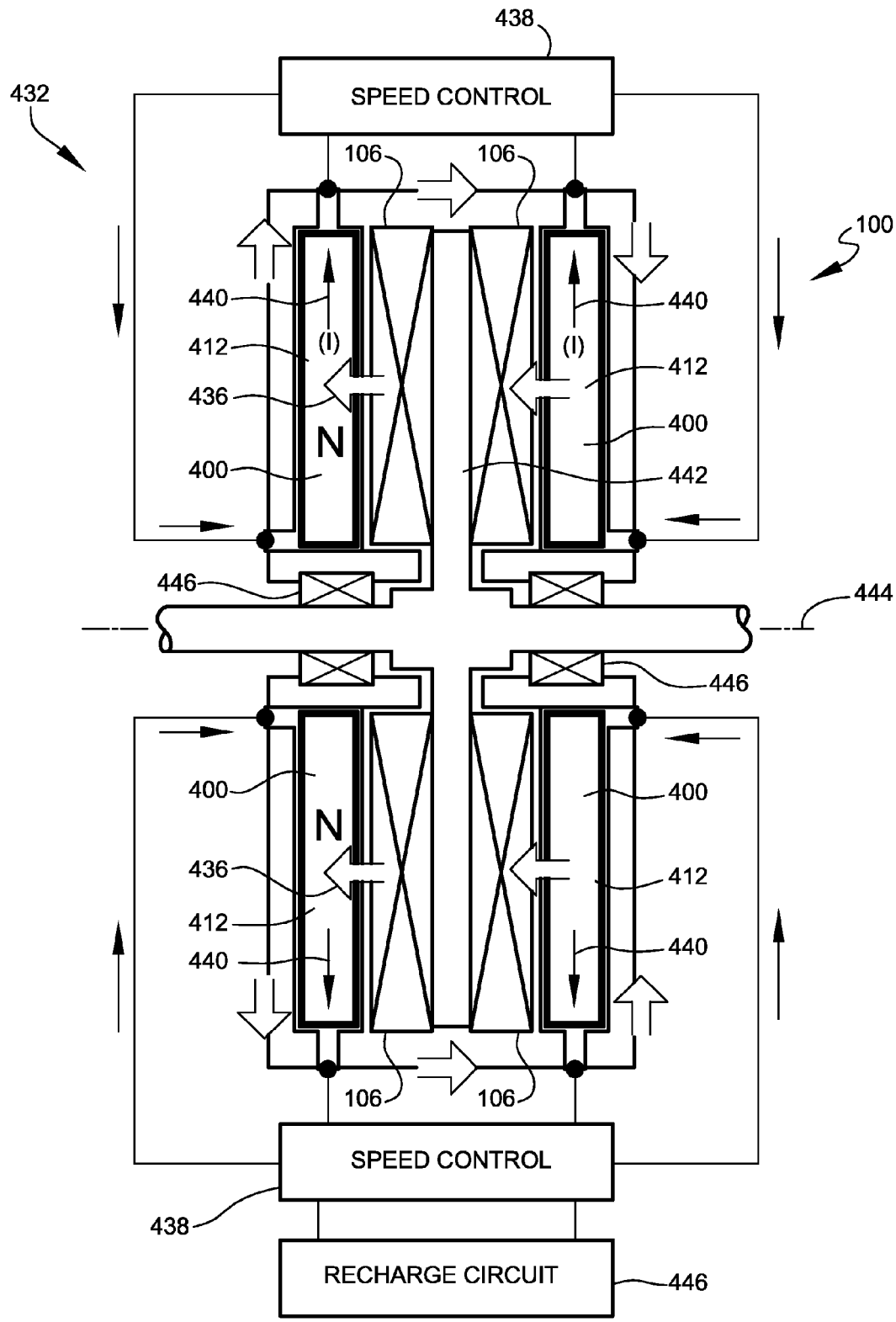
FIG. 43 shows a diagrammatic sectional view, schematically illustrating an alternate radial motor battery, constructed around the alternate motor-battery assembly of FIG. 40.

FIG. 43 shows a diagrammatic sectional view, schematically illustrating an alternate radial motor battery 432, demonstrating the preferred use of a set of alternate motor-battery assemblies 400 to enable a rotary-power device. Alternate radial motor battery 432 preferably comprises at least one magnetic field source 106, preferably originating within a magnetic rotor assembly, most preferably a multi-pole permanent-magnet rotor assembly 442, as shown. Alternately preferably, magnetic field source 106 may preferably comprise an electromagnetic field source. A physical positioner 434 preferably supports the rotor assembly 442 between a fixed stator comprising a pair of ring-shaped alternate motor-battery assemblies 400, as shown.

The permanent magnets of rotor assembly 442 are preferably arranged to produce a plurality of magnetic circuits having lines of flux passing through a respective stack of current-producing cells 412, as shown. More specifically, the plurality of magnetic circuits comprise magnetic flux lines 436 preferably aligned in a first direction passing through a respective stack of current-producing cells 412, such first direction substantially perpendicular to the planar surfaces of laminated annular disks 408. Thus, the magnetic fields produced by permanent-magnet rotor assembly 442 preferably form magnetic circuits in which the electrode layers (anode layer 428 and cathode layer 430) of current-producing cells 412 directly interact.

Alternate radial motor battery 432 preferably comprises at least one control circuit 438 preferably adapted to control, among other physical operations, the direction of electrical current flow within current-producing cells 412. The preferred radial circuiting of current-producing cells 412 results in a flow of electrical current, within anode layer 428 and cathode layer 430, preferably moving between the central and outer leads. Physical positioner 434 is preferably structured and arranged to align the arrangement of current-producing cells 412 to generate a current flow direction 440 preferably oriented generally perpendicular to magnetic flux lines 436, as shown. Interaction between the electric current and magnetic flux lines 436 produces an electromotive force, acting between the current-producing cells 412 and the magnetic poles of the rotor, in a third direction oriented generally perpendicular to the rotational axis 444 of rotor assembly 442 (at least embodying herein wherein the rotational axis comprises an orientation non-parallel with such third direction).

Rotor assembly 442 is preferably supported by bearings 446 to provide free rotation of the assembly relative to the alternate motor-battery assemblies 400 of the stator (at least embodying herein at least one motion enabler structured and arranged to enable relative motion between such at least one electrochemical energy source and such at least one magnetic field source; wherein such at least one motion enabler comprises at least one rotator structured and arranged to allow rotation about at least one rotational axis wherein such at least one interaction force produces such relative motion). At least one useable mechanical force is preferably extractable from such relative motion induced by such electromotive force.

Each lead is preferably coupled to external control circuit 438 adapted to control current flow within the motor-battery assembly (see also FIG. 43). Control circuit 438 is preferably structured and arranged to control the level of the electromotive interaction force. The preferred structures and arrangements of alternate motor-battery assembly 400 enable the use of either alternating current (AC) or direct current (DC) based control circuits 438. The preferred structures and arrangements of alternate motor-battery assembly 400 also enable the use various number of phases and poles, preferably including three-phase two-pole AC design. Upon reading this specification, those with ordinary skill in the art will now appreciate that, under appropriate circumstances, considering such issues as cost, user preference, etc., other design arrangements such as, for example, motor-battery units ranging from a homopolar design to multi-phase AC units, etc., may suffice.

In a preferred control arrangement, alternate radial motor battery 432 is preferably configured as a two-pole three-phase AC unit, preferably operated using at least one pulse-width-modulation control strategy. In this preferred AC arrangement, control circuit 438 preferably functions to convert (invert) the DC voltage from the alternate motor-battery assemblies 400 to three-phase AC voltage and adjust AC voltage amplitude and frequency based on current demand, speed, and torque. In addition, control circuit 438 preferably comprises at least one recharging circuit 446, as shown, preferably functioning to recharge inactive current-producing cells 412 by means of a secondary power source, such as, for example, regenerative vehicle braking or by an alternator/generator powered by an external source. Three-phase AC voltage generated by the braking is preferably converted by recharging circuit 446 back to DC prior to recharging the inactive current-producing cells 412. Control circuit 438 may preferably collect sensor data from alternate radial motor battery 432 (for example, shaft speed, lamination temperatures, back EMF to identify rotation direction, etc.), which is used by control circuit 438 to properly implement the pulse-width-modulation control.

It is noted that the preferred unidirectional orientation of current flow and magnetic circuiting allow operation of the preferred embodiments as either AC or DC units, without the need for commutation. In a preferred embodiment of the system, each of the 12 cells of the motor-battery laminations 409 are preferably configured to communicate individually with control circuit 438. This means that one or more cells may be allocated by the controller for the provision of energy, to operate accessories, to be recharged, etc. Furthermore, preferred arrangements control circuit 438 may preferably include the contemporaneously enabling of current flow in all current-producing cells 412 to provide a substantially instantaneous full torque output on demand.

Control circuit 438 preferably comprises at least one current reversing capability to controllably reverse the direction of current flow within the current-producing cells 412. The reversing capability is preferably enabled by the preferred four-lead connection arrangements at the current-producing cells 412. To reverse the rotation of the motor, the controller simply reverses the direction of current flow through the leads of alternate motor-battery assembly 400. FIG. 11 through FIG. 17 provides additional information related to preferred means for the control of current flow within the cells.

Upon reading this specification, those with ordinary skill in the art will now appreciate that, under appropriate circumstances, considering such issues as cost, intended use, etc., other arrangements such as, for example, a homopolar configuration of the laminated motor-battery apparatus wherein the steel annular disks of the motor-battery assemblies are permanently magnetized as a Halbach array, etc. may suffice. Those with ordinary skill in the art will now appreciate that this would preferably direct all of the magnetic field of the rotor's permanent magnets to one side of the magnets, (i.e., the side facing the air gap adjacent the magnetized annular disks of the stator). Those with ordinary skill in the art will further appreciate that this would increase the strength of the magnetic field interacting with the current flowing through the annular disks. Such a configuration would produce a motor-battery embodiment having a surprising power density. Those with ordinary skill in the art will further appreciate that such homopolar embodiments could be used in both AC and DC applications and could use electromagnets or permanent magnets (including Halbrach arrays) to create either the stator or rotor fields for use with all usual commutation schemes such as brushes and electronic sensing/switching means, and with various control schemes such as pulse width modulation, etc., and with various combinations of phases and poles as appropriate for the application.

In adapting alternate radial motor battery 432 to a specific application, such as the operation of a vehicle, it is typically the kilowatt hour (KWH) requirements of the application that drives the volume and weight of the overall alternate radial motor battery 432. In adapting alternate radial motor battery 432 to a vehicle application, the size and weight of the vehicle is preferably identified along with the intended range of travel between charges. This establishes a specification for the KWH requirements. In most cases, the capacity of electrochemical cells is a principal design factor. The electromotive capacity of the resulting motor-battery system is generally larger than required. The Applicant has found that this feature of the system can be used to reduce the operating current within electrode laminations to lower temperatures within the motor-battery assembly (typically less than about 100 degrees C.). This preferred feature permits the use of a wide range of battery chemistries and further increases the durability of the overall system.

Upon reading this specification, those with ordinary skill in the art will now appreciate that, under appropriate circumstances, considering such issues as cost, user preference, etc., other motor-battery arrangements such as, for example, deploying multi-megawatt motor-battery systems for Navy ships (missile destroyers), submarines, military and civilian aircraft, etc., may suffice.

Figure 44:
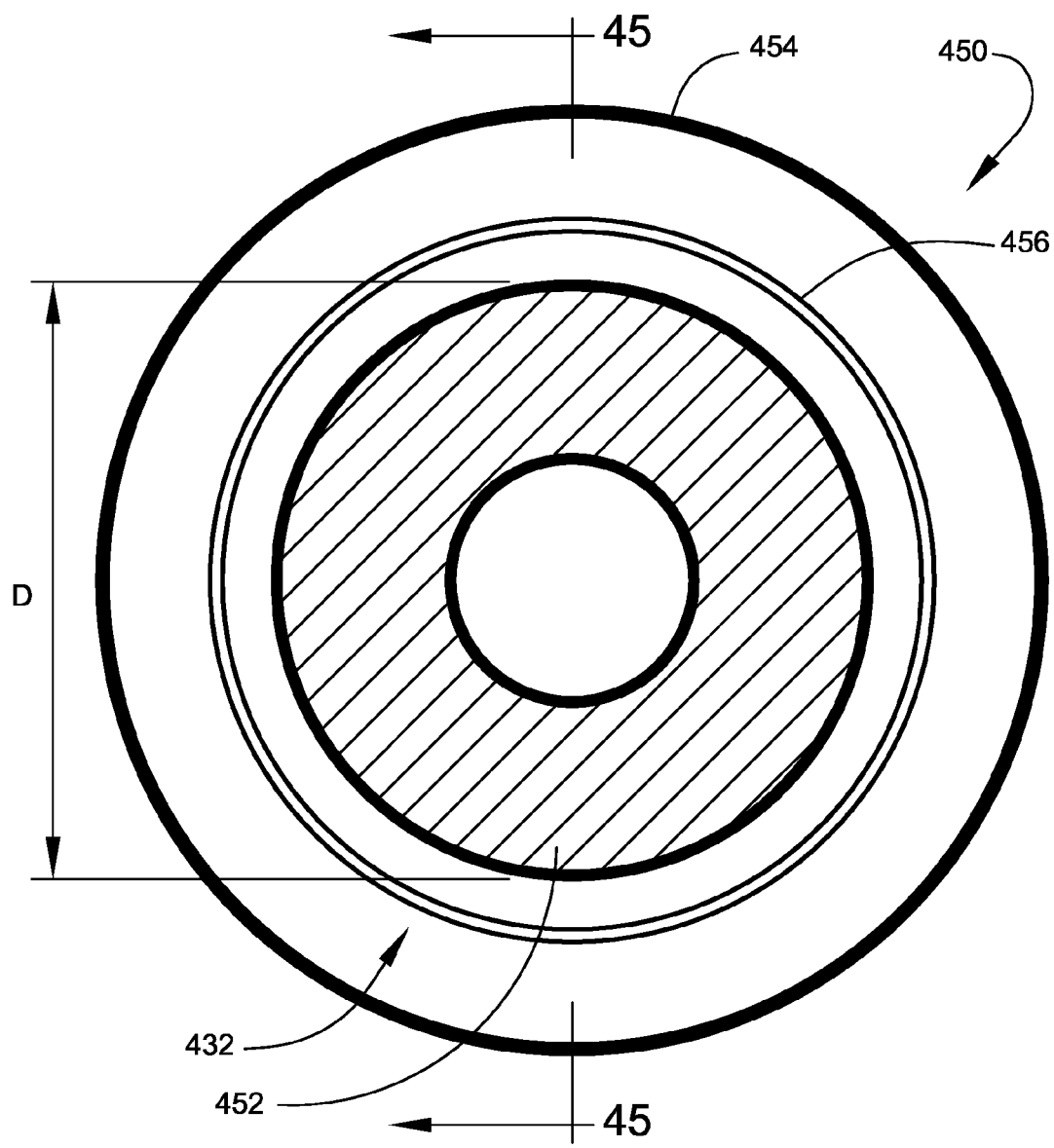
FIG. 44 shows a diagrammatic sectional view, schematically illustrating a vehicle wheel incorporating a motor-battery assembly, according to another preferred embodiment of the present invention.
Figure 45:
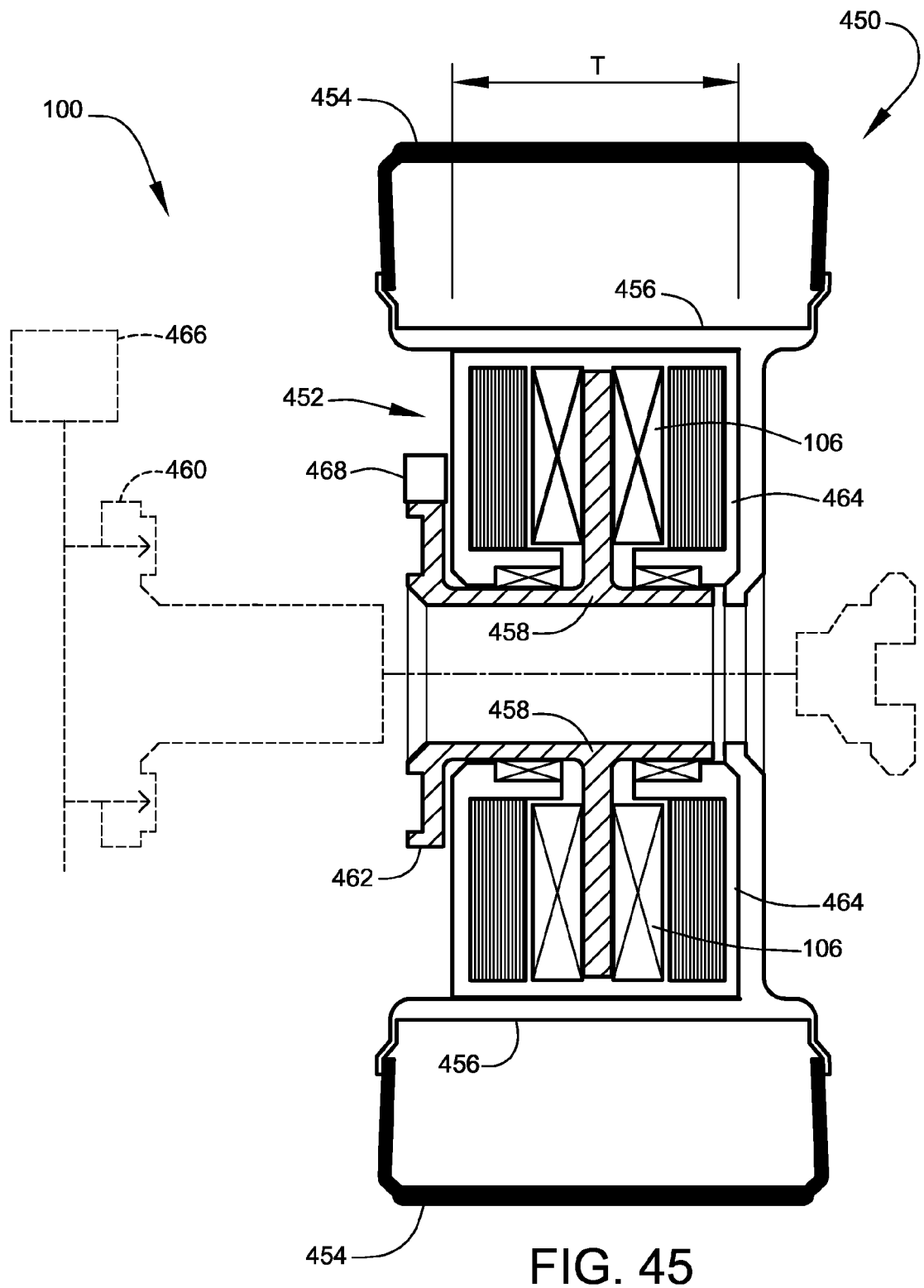
FIG. 45 shows a diagrammatic sectional view, through the section 45-45 of FIG. 44, illustrating preferred arrangements of the vehicle wheel of FIG. 44.

FIG. 44 shows a diagrammatic sectional view, schematically illustrating a preferred vehicle wheel 450, incorporating a motor-battery unit 452, according to another preferred embodiment of the present invention. FIG. 45 shows a diagrammatic sectional view, through the section 45-45 of FIG. 44, illustrating preferred mechanical arrangements of vehicle wheel 450 of FIG. 44. Vehicle wheel 450 preferably comprises at least one torque-generating motor-battery unit 452 integrated substantially within the vehicle-mountable wheel assembly, as shown. Motor-battery unit 452 is preferably structured and arranged to act directly on the wheels to accelerate the vehicle.

Vehicle wheel 450 preferably comprises an outer tire 454 mounted circumferentially to a circular wheel rim 456, the wheel rim 456 preferably containing at least one motor-battery unit 452, as shown. Motor-battery unit 452 preferably comprises one of the above-described embodiments of motor-battery system 100. More preferably, motor-battery unit 452 comprises an embodiment substantially similar to alternate radial motor battery 432.

Motor-battery unit 452 is preferably configured to comprise a fixed a central stator 458 surrounded by an outer rotor 464, as shown. Central stator 458 preferably comprises magnetic field source 106, as shown, with outer rotor 464 preferably comprising a motor-battery structure. In a preferred embodiment of the vehicle-wheel system, magnetic field source 106 comprises an array of high-gauss permanent magnets, with outer rotor 464 comprising a set of alternate motor-battery assemblies 400. It is further noted that, in alternate preferred embodiments of the vehicle wheel, the arrangement may be inverted wherein the motor-battery component comprise the stator and the magnetic field source the outer rotor. Such "outrunner" designs are capable of producing high levels of torque and can be tailored to the intended application by adapting the number of laminations.

Figure 46:
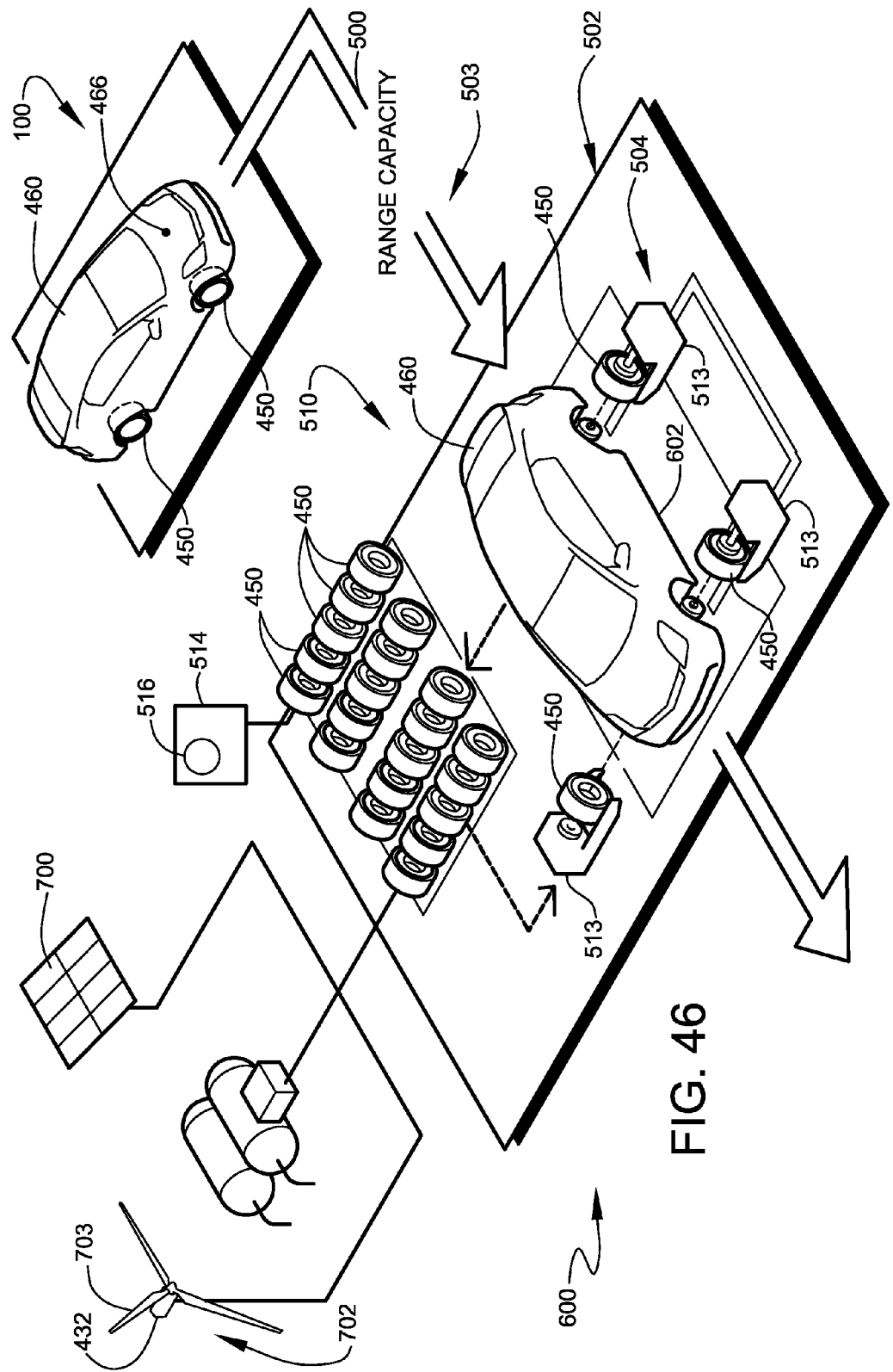
FIG. 46 shows a diagrammatic perspective view; schematically illustrating a preferred method related to the use of the vehicle wheel of FIG. 44, according to preferred methods and embodiments of the present invention.

Central stator 458 is preferably coupled to a least one vehicle mount 462 preferably adapted to allow the mounting of vehicle wheel 450 on a vehicle (see vehicle 460 of FIG. 46). Depending on the design arrangements of vehicle 460, central stator 458 may be linked with vehicle mount 462 through one or more intervening components. For example, preferred embodiments of vehicle wheel 450 may comprise additional integrated suspension components, shock absorbers, steering apparatus, braking devices, etc.

Outer rotor 464 of motor-battery unit 452 is preferably situated within central stator 458 in a substantially coaxial orientation with respect to their radial centers, as shown. A minimum air gap distance is preferably maintained between outer rotor 464 and central stator 458 to permit free rotation of outer rotor 464 about central stator 458 while maximizing sufficient integrity within the magnetic circuit. For a standard passenger vehicle, motor-battery unit 452 preferably comprises an outer diameter D of about 40.5 centimeters (16 inches) and a thickness T of about 10 centimeters (four inches). Using an average mid-size passenger vehicle, applicant has calculated that each vehicle wheel 450 may provide an operational range of about 80 kilometers (50 miles). It is noted that such an operational range is dependent on variables that include weight of vehicle, service demand, ambient temperature, frequency of regenerative braking, etc.

Outer rotor 464 is firmly joined with wheel rim 456 to enable the transmission of torque between motor-battery unit 452, wheel rim 456, and outer tire 454. Motor-battery unit 452 is preferably operably coupled with an external controller/charger 466, preferably located within vehicle 460, as shown. Controller/charger 466 preferably functions to control the current within motor-battery unit 452, supply electrical power for recharging, and monitor the operational status (charge capacity, hours of operation, cell temperature, etc.) of vehicle wheel 450. A sensor 468 is preferably incorporated within each vehicle wheel 450 to monitor and report the state of charge in each wheel to the onboard controller/charger 466 of vehicle 460. Upon reading this specification, those with ordinary skill in the art will now appreciate that, under appropriate circumstances, considering such issues as cost, design preference, etc., other controller arrangements such as, for example, embedding control circuits within the vehicle wheel, etc., may suffice.

Vehicle wheel 450 is preferably designed to be quickly mountable and demountable with respect to the vehicle. Vehicle wheel 450 is preferably designed to be mountable and demountable using one or more automated means, as further described in FIG. 46, FIG. 46 shows a diagrammatic perspective view; schematically illustrating a preferred method related to the use of vehicle wheel 450 of FIG. 44, according to preferred methods and embodiments of the present invention. FIG. 46 illustrates a representative vehicle 460 preferably configured to receive one or more vehicle wheels 450, as shown. In reference to the illustration of FIG. 46, it is helpful to consider each of the vehicle wheels 450 as a storage device containing a reserve of electrical "fuel". As noted above, each vehicle wheel 450 comprises a known range capacity 500 (for example, about 80 kilometers) based on the electrical storage capacity of the integrated motor-battery unit 452. The sensor 468 incorporated within each vehicle wheel 450 monitors and reports the state of charge in each wheel to the onboard controller/charger 466 of vehicle 460. Preferably, after the known range capacity 500 has been reached (and the charge of the operating wheel nears depletion), controller/charger 466 automatically switches the drive operation from the electrically-depleted wheel to an electrically-charged wheel. This process is preferably repeated until all the remaining wheels are depleted. The user then locates a recharging station 502 capable of switching out one or more of the electrically-depleted wheels. The number of vehicle wheels 450 replaced preferably corresponds to the distance from the next recharging station or destination of the user. To reduce vehicle weight during operation, a minimum number of vehicle wheels 450 are installed preferably corresponding to the user's required travel range; the remaining wheels would preferably comprise a conventional (non-motorized) design.

As most users drive less than 65 kilometers per day, and have the capacity to recharge the motor-battery unit at home overnight, it is anticipated vehicle 460 will typically operate with one or two motor-battery equipped vehicle wheels 450. When a user has the need to travel an extended distance, the user simply locates a recharging station 502 to add an appropriate number of additional motor-battery equipped vehicle wheels 450 to vehicle 460. Upon reading this specification, those with ordinary skill in the art will now appreciate that, under appropriate circumstances, considering such issues as cost, user preference, etc., other vehicle arrangements such as, for example, utilizing global positioning systems (GPS) to identify the location of nearby stations, utilizing onboard or external processors to calculate range/wheel capacity, utilizing onboard or external processors to establish travel routes based on availability of station infrastructure, etc., may suffice.

FIG. 46 diagrammatically depicts a preferred transportation infrastructure system 510 for servicing vehicles 460 utilizing motor-battery equipped vehicle wheels 450. Transportation infrastructure system 510 preferably comprises a plurality of recharging stations 502 preferably spaced along at least one travel route 503 appropriate for vehicular travel use. Transportation infrastructure system 510 is preferably adapted to offers drivers a level of convenience similar to conventional petroleum-based service stations. Transportation infrastructure system 510 is preferably deployed within urban regions as well as along extended transportation routes.

Each recharging station 502 preferably comprises at least one inventory of motor-battery units, preferably in the form of a stock of vehicle wheels 450. The stock of vehicle wheels 450 may preferably comprise standardized units, or may vary in size and configuration to accommodate a range of vehicle types and/or manufacturer standards. Each recharging station 502 preferably comprises at least one motor-battery exchanging apparatus 504 structured and arranged to assist exchanging electrically depleted motor-battery vehicle wheels 450 for electrically-charged vehicle wheels 450 from the inventory.

In a highly preferred embodiment of the system, motor-battery exchanging apparatus 504 comprises one or more automated robotic devices, identified herein as automated wheel-mounting apparatus 513. Automated wheel-mounting apparatus 513 are preferably structured and arranged to provide substantially automated removal and mounting of vehicle wheels 450. Such wheel-changing "robots" automatically replace a depleted vehicle wheel 450 with a fully charged one within a few minutes, allowing the user to drive on long distance trips without undergoing the time-consuming "recharging" process en route. The automated replacement process preferably occurs while the driver remains in vehicle 460. Similar wheel installation robots are currently used on conventional car assembly lines today.

Each recharging station 502 preferably comprises at least one motor-battery charger 512 structured and arranged to recharge electrically-depleted motor-battery units on site. Motor-battery charger 512 is preferably equipped with at least one motor-battery analyzer 514 preferably adapted to determine the physical condition of an electrically-depleted motor-battery unit. This preferably includes gathering data associated with hours of operation, ability to hold charge, and charge status. Motor-battery analyzer 514 preferably comprises at least one charge-status tester 516 to test the charge status of the electrically-depleted motor-battery unit. This allows the system the ability to prorate a driver for any remaining charge that may reside within the vehicle wheel 450 being replaced.

Recharging of electrically-depleted vehicle wheels 450 is preferably accomplished on site using, in part, at least one renewable electrical power source, as shown. Such renewable electrical sources preferably comprise solar photovoltaic (PV) power 700, wind power 702, biogas production, etc. Wind power 702 may preferably be supplied by motor-battery equipped wind turbines 703 capable of generating and storing electrical energy. Such wind turbines 703 may preferably comprise a modular arrangement of alternate radial motor battery 432 organized around a wind driven shaft. Motor-battery equipped wind turbines 703 further eliminate the hazards of the batteries being installed on the ground as well as provide extra energy due to the elimination of the "I squared R" losses found in conventional systems.

Upon reading this specification, those with ordinary skill in the art will now appreciate that, under appropriate circumstances, considering such issues as cost, operator preference, etc., other arrangements such as, for example, automated storage and handling apparatus, transportation systems designed to deliver remotely-charged wheels to a service site, systems to automatically match a particular vehicle and appropriately compatible wheel design, etc., may suffice.

The above described apparatus arrangements of vehicle wheel 450 and transportation infrastructure system 510 enabled the development of preferred vehicle configurations and operation methods. In accordance with another preferred embodiment hereof, motor-battery system 100 preferably provides a motor-battery vehicle system 600 related to the production and operation of a motorless-vehicle chassis 602. By utilizing the technology described herein, vehicle 460 is preferably manufactured and supplied to the using entity with no battery, no motor, and no tires. There are several reasons why this preferred arrangement is beneficial to the transportation-vehicle field. First among these is that the buyer/lessee of vehicle 460 greatly reduce their initial economic expenditure associated with the vehicle acquisition. Currently, a conventional electric drive motor and battery pack constitutes more than half of the total cost of a conventional electric vehicle. Motor-battery vehicle system 600 provides for an alternate means of supplying the motor and batteries, preferably by leasing the motor battery-equipped vehicle wheels 450 to the entity or entities associated with the operation of vehicle 460, as further described below.

Figure 47:
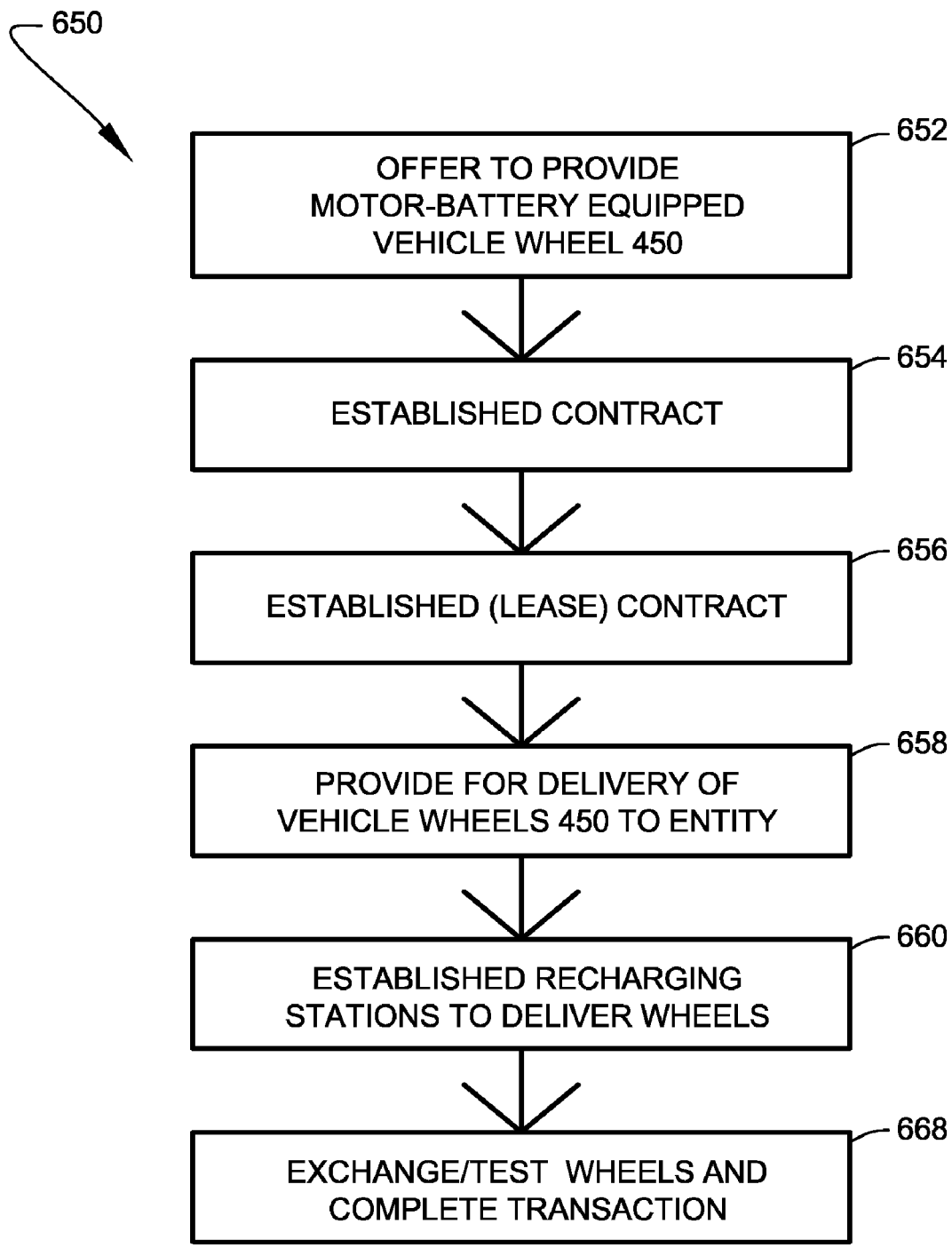
FIG. 47 is a flow diagram illustrating the preferred steps of a method, enabled by the apparatus present invention, according to another preferred embodiment of the present invention.

In accordance with another preferred embodiment hereof, this invention provides method 650 related to equipping to the motorless-vehicle chassis 602 of vehicle 460 with motor-battery equipped vehicle wheels 450. FIG. 47 is a flow diagram illustrating the preferred steps of method 650 according to motor-battery system 100.

In initial preferred step 652 of method 650, an offer to provide at least one motor-containing vehicle wheel, more preferably at least one motor-battery equipped vehicle wheel 450 is preferably made to at least one entity associated with the operation of such at least one motorless-vehicle chassis 602. Such an entity may preferably comprise private vehicle owners, a company operating a fleet of vehicles, a governmental entity, etc. Upon reading this specification, those with ordinary skill in the art will now appreciate that, under appropriate circumstances, considering such issues as industry standards, user preference, etc., additional sub-steps such as, for example, arranging for the establishment of standards for wheel sizes, mounting methodologies, manufacturing of the motor-battery equipped wheels, etc., may suffice.

In subsequent preferred step 654, at least one contract is established providing for the use of the motor-battery equipped vehicle wheels 450 by such entity. In preferred step 656, at least one lease arrangement enabling such use by the entity is preferably established within the contract. By allowing the consumer to lease vehicle wheels 450, the entity gains the advantage of low initial acquisition cost along with assurance of continuous mechanical reliability. In addition, leasing of the technology provides the entity with the ability to upgrade the motor battery with the latest technology over time, without replacing the entire motorless-vehicle chassis 602. In the resulting marketplace, both the manufacturer of motorless-vehicle chassis 602 and supplier of wheels 450 benefit from simplified and cost-effective manufacturing along with a highly flexible market utilizing standardized vehicle components.

In preferred step 658, a provision for delivery of vehicle wheels 450 to such entity. Such delivery is preferably enabled by the establishment of a plurality of recharging stations 502, as generally described in FIG. 46 (and identified herein as preferred step 660). Each such recharging station 502 is preferably supplied with at least one transaction processor 665

(see FIG. 46) to process at least one payment transaction associated with the exchange of such at least one electrically-depleted motor-containing vehicle wheels 450 with electrically-charged motor-containing vehicle wheels 450.

Even further, method 650 preferably comprises the preferred step 668 of exchanging at least one electrically-depleted motor-containing wheels 450 of a motorless-vehicle chassis 602 with at least one electrically-charged motor-containing vehicle wheel 450 from on-site inventory; testing the charge status of the motor battery; and processing at least one payment transaction associated with the exchange. Upon reading this specification, those with ordinary skill in the art will now appreciate that, under appropriate circumstances, considering such issues as cost, operator preference, etc., other arrangements such as, for example, utilizing barcode scanning technology to complete a transaction, utilizing RFID technology to complete a transaction, utilizing GPS or cellular technology to complete a transaction, etc., may suffice. Upon reading this specification, those with ordinary skill in the art will now appreciate that, under appropriate circumstances, considering such issues as cost, operator preference, market factors, etc., other re-fueling arrangements such as, for example, utilizing "large" motor-battery systems, for example, for use under the hood or in the trunk, etc., of the vehicle, which may similarly be exchanged at refueling stations, may suffice.

Those skilled in the art will now appreciate that motor-battery system 100 is adaptable to be beneficially utilized within many areas of technology ranging from miniature electro-battery drives to large on-road vehicle applications.

Those with ordinary skill in the art will now appreciate that, under appropriate circumstances, considering such issues as advances in technology, energy costs, etc., other more-exotic motor-battery configurations such as, for example, combining motor-battery technology with an internal combustion engine, etc., may suffice. In such an example, the metallic piston of an internal combustion engine is replaced with a piston of the same dimensions but constructed out of high-temperature ceramic magnet materials. A motor battery coil is made to slide over the outside diameter of the cylinder. The resulting arrangement preferably operates like a solenoid. When operating in the electric-motor mode the magnetic field produced by the coil pulls the magnetic piston up. At the top of the stroke the controller commutates the direction of the current in the motor-battery coil. This reverses the polarity of the coil and repels the magnetic piston downward. Both the intake and exhaust valves are held open while the system is in the electric motor mode so there is no compression force to oppose the movement of the piston. In the range extending mode the controller preferably turns the motor-battery coil off and sets the intake and exhaust valves to operate normally. Fuel is preferably injected and the engine performs as a conventional internal combustion engine. The motor-battery coils can also be turned on while the system is in the gas engine mode. The up-and-down motion of the magnetic piston then induces a current in the motor-battery coils to recharge them. Such an apparatus will also function in this manner during regenerative braking. In a multi-cylinder configuration one of the cylinders can operate continuously in this mode to provide the current required to power the vehicle's lights and other accessories.

Those with ordinary skill in the art will now appreciate that, under appropriate circumstances, considering such issues as advances in technology, energy costs, etc., yet other motor-battery configurations, such as, for example, an extension on the cylinder wall configured as a magnetic shoe around the centerline of the crankshaft, may suffice. In such an arrangement, the throw rod is configured as a disk on which a set of permanent magnets are affixed. A controller opens both the intake and exhaust valves when the system is to act as an electric motor. Under extended range operation the control shuts off the battery cells and operates the valves and fuel injectors in the normal fashion. During regenerative braking both valves are again opened and the cell is put back into active mode to be recharged by the rotating magnets.

Those with ordinary skill in the art will now appreciate that, under appropriate circumstances, considering such issues as advances in technology, energy costs, etc., yet other motor-battery configurations, such as, for example, a Sterling cycle combined with motor-battery technology, may suffice. In such an example, a Sterling cycle tri-mode system operating as described for the dual-mode system with the exception that the engine may comprise two ceramic magnetic pistons. A unique characteristic of such a Sterling cycle engine is that if it is forced to rotate by an external motive force it will perform as an air-conditioner compressor.

The inherent compactness achievable in the preferred embodiments of motor-battery system 100 results in significant reductions in transmission losses within the system (power equaling the current squared times resistance). More significantly, the use of applicant's motor-battery system 100 effectively expands the potential performance of most electrically driven systems by combining essential electric motor and electrochemical battery functions into a common set of structures, thus reducing overall size and mass of the system.

Applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A method related to making at least one wound magnetic field coil for a rotary electric device, such at least one wound magnetic field coil comprising at least one magnetically conductive core, said method comprising the steps of:
   a) providing at least one electrically-conductive thin-film battery cell; and
   b) winding said at least one electrically-conductive thin-film battery cell around the at least one core to form at least one magnetic-field-producing battery-coil;
   c) wherein such at least one electrically-conductive thin-film battery cell is structured and arranged to produce electrical current derived from at least one electrochemical process; and
   d) such electrical current is usable to generate at least one magnetic field within said at least one magnetic-field-producing battery-coil.

2. The method according to claim 1 wherein such at least one electrically-conductive thin-film battery cell comprises:
   a) at least one supportive substrate structured and arranged to support
      i) at least one cathode current collector,
      ii) in operative relation with such at least one cathode current collector, at least one cathode;
      iii) in operative relation with such at least one cathode, at least one electrolyte structured and arranged to support such at least one electrochemical process,
      iv) in operative relation with such at least one electrolyte, at least one anode, and
      v) in operative relation with such at least one anode, at least one anode current collector;

b) wherein such at least one supportive substrate comprises at least one substantially flexible ribbon having a longitudinal length and a maximum width; and c) wherein such longitudinal length is substantially greater than such maximum width.

3. The method according to claim 1 wherein such at least one electrically-conductive thin-film battery cell comprises at least one lithium-based chemistry.

4. The method according to claim 1 further comprising the step of incorporating such at least one magnetic-field-producing battery-coil into at least one electromotive device structured and arranged to produce at least one useable mechanical force.

5. A combined electric motor-battery system comprising:
    a) at least one stator and at least one rotor separated from each other by at least one radial air gap for electromotive interaction therebetween;
    b) wherein said at least one stator comprises at least one stator magnetic field source structured and arranged to produce at least one salient magnetic pole oriented so as to face said at least one rotor through such radial air gap;
    c) wherein said at least one rotor comprises at least one rotor magnetic field source structured and arranged to produce at least one salient magnetic pole oriented so as to face said at least one stator through such radial air gap;
    d) wherein at least one of said at least one stator magnetic field source and said at least one rotor magnetic field source comprises at least one wound magnetic field coil;
    e) wherein said at least one wound magnetic field coil comprises
        i) at least one core, and
        ii) at least one field winding;
    f) wherein said at least one field winding is structured and arranged to produce electrical current derived from at least one electrochemical process;
    g) wherein such electrical current is used to energize said at least one wound magnetic field coil to produce such at least one salient magnetic pole; and
    h) wherein electromotive interaction generated between at least two of such at least one salient magnetic poles is converted into motive power output.

6. The combined electric motor-battery system of claim 5 wherein said at least one field winding comprises at least one electrically-conductive thin-film battery cell.

7. The combined electric motor-battery system of claim 5 wherein said at least one electrically-conductive thin-film battery cell comprises:
    a) at least one supportive substrate structured and arranged to support
        i) at least one cathode current collector,
        ii) in operative relation with such at least one cathode current collector, at least one cathode;
        iii) in operative relation with such at least one cathode, at least one electrolyte structured and arranged to support such at least one electrochemical process,
        iv) in operative relation with such at least one electrolyte, at least one anode, and
        v) in operative relation with such at least one anode, at least one anode current collector;
    b) wherein such at least one supportive substrate comprises at least one substantially flexible ribbon having a longitudinal length substantially greater that its maximum width.

8. The combined electric motor-battery system of claim 5 further comprising:
    a) at least one at least one commutator structured and arranged to dynamically control current flow within said at least one wound magnetic field coil;
    b) wherein said at least one stator comprises a plurality of said at least one wound magnetic field coils, each one structured and arranged to generate one such at least one salient magnetic pole of said at least one stator;
    c) wherein said at least one rotor comprises a plurality of permanent magnets, each one structured and arranged to generate one such at least one salient magnetic pole of said at least one rotor;
    d) wherein said plurality of permanent magnets are arranged along at least one outer periphery of said at least one rotor;
    e) wherein said at least one rotor is rotatably supported within said at least one stator;
    f) wherein each such at least one salient magnetic pole of said at least one rotor comprises at least one relational arrangement to each such at least one salient magnetic pole of said at least one stator enabling, in combination with the dynamic control of current flow within said plurality of said at least one wound magnetic field coils, rotation of said at least one rotor due to armature reaction between said at least one stator and said at least one rotor.

9. The combined electric motor-battery system of claim 6 wherein said at least one electrically-conductive thin-film battery cell comprises at least one lithium-based chemistry.

10. A method related to converting a conventional rotary electric device to at least one combined electric motor-battery, said method comprising the steps of:
    a) substantially removing conventional magnetic windings from at least one core of the conventional rotary electric device;
    b) providing at least one electrically-conductive battery cell; and
    c) forming said at least one electrically-conductive battery cell around the at least one core to form at least one magnetic-field-producing battery-coil;
    d) wherein such at least one electrically-conductive battery cell is structured and arranged to produce electrical current derived from at least one electrochemical process; and
    e) such electrical current is usable to generate at least one magnetic field within said at least one magnetic-field-producing battery-coil.

11. A power system related to the production of at least one useable mechanical force using at least one magnetic field source structured and arranged to produce at least one magnetic field having lines of flux extending in at least one first direction, said power system comprising:
    a) at least one magnetically-conductive substrate to provide magnetically-conductive support;
    b) deposited on said at least one magnetically-conductive substrate, at least one electrochemical energy source structured and arranged to produce at least one electrical potential from at least one electrochemical process; and
    c) at least one positioner structured and arranged to position said at least one electrochemical energy source in at least one position of interaction with such at least one magnetic field;
    d) wherein said at least one electrochemical energy source comprises at least one electrode structured and arranged to conduct at least one flow of electrical current, derived from such at least one electrical potential, in at least one second direction perpendicular to such first direction;

e) wherein interaction between such at least one electric current and such at least one magnetic field produces at least one interaction force acting substantially directly on said at least one electrochemical energy source in a third direction perpendicular to both such at least one first direction and said at least one second direction; and f) wherein action of such at least one interaction force on said at least one electrochemical energy source produces such at least one useable mechanical force.

12. The power system according to claim 11 wherein:
a) said at least one electrochemical energy source comprises at least one electrolytic layer structured and arranged to support such at least one electrochemical process;
b) said at least one electrode comprises at least one anode layer and at least one cathode layer,
c) said at least one anode layer and said at least one cathode layer are structured and arranged to be in interactive relation with said at least one electrolytic layer; and
d) said at least one anode layer, said at least one cathode layer, and said at least one electrolytic layer are formed substantially by at least one thin-film deposition process.

13. The power system according to claim 12 wherein said at least one magnetically-conductive substrate comprises at least one substantially ferrous material.

14. The power system according to claim 12 wherein:
a) said at least one substantially ferrous material comprises at least one electrically isolative coating; and
b) said at least one electrically isolative coating comprises at least one ferrous oxide compound.

15. The power system according to claim 12 wherein:
a) said at least one electrochemical energy source comprises a plurality of discrete current-producing cells, each discrete current-producing cell of said plurality being structured and arranged to produce such at least one electrical potential from such at least one electrochemical process and such at least one magnetic force in the presence of such at least one magnetic field;
b) said plurality of discrete current-producing cells comprises at least one substantially radial arrangement; and
c) such at least one substantially radial arrangement comprises a central point of radial symmetry.

16. The power system according to claim 15 wherein
a) said at least one magnetically-conductive substrate comprises at least one disk-shaped member having a center point substantially coincidental with said central point of radial symmetry; and
b) said plurality of discrete current-producing cells are arranged substantially symmetrically about said center point.

17. The power system according to claim 16 wherein:
a) said at least one disk-shaped member comprises at least one substantially planar support surface structured and arranged to support said plurality of discrete current-producing cells;
b) said plurality of discrete current-producing cells preferably comprises at least one stacked organization preferably aligned substantially perpendicular to said at least one substantially planar support surface.

18. The power system according to claim 13:
a) wherein such at least one magnetic field source is structured and arranged to produce such at least one magnetic field;
b) wherein said at least one positioner is structured and arranged to position said at least one disk-shaped member and said at least one magnetic field source to provide at least one direct interaction of said at least one electrochemical energy source with such at least one magnetic force;
c) wherein said at least one positioner comprises
   i) at least one magnetic field aligner structured and arranged to align at least one line of magnetic flux, of such at least one magnetic field, in at least one first direction,
   ii) at least one electric-current aligner structured and arranged to align such at least one flow of electrical current conducted by said at least one electrode, in at least one second direction substantially perpendicular to such first direction, and
   iii) at least one motion enabler structured and arranged to enable relative motion between said at least one electrochemical energy source and said at least one magnetic field source;
d) wherein such at least one interaction force produces such relative motion; and
e) wherein such at least one useable mechanical force is extractable from such relative motion.

19. The power system according to claim 18 wherein:
a) said at least one motion enabler comprises at least one rotator structured and arranged to allow rotation about at least one rotational axis;
b) such at least one rotational axis comprises an orientation non-parallel with such third direction; and
c) such at least one interaction force produces at least one rotational torque about said at least one rotational axis.

20. The power system according to claim 18 wherein said at least one magnetic field source comprises at least one electromagnetic field generator.

21. The power system according to claim 18 wherein said at least one magnetic field source comprises at least one permanent magnet.

22. The power system according to claim 19 further comprising:
a) at least one current controller structured and arranged to control movement of such at least one electric current within said at least one electrode;
b) wherein such control of such at least one electric current within such at least one magnetic field controls the level of such at least one interaction force.

23. The power system according to claim 22 wherein:
a) said plurality of discrete current-producing cells are electrically coupled to form at least one parallel circuit; and
b) said at least one current controller comprises at least one current reverser structured and arranged to controllably reverse the direction of current flow within said at least one electrode.

24. The power system according to claim 23 wherein said at least one electrochemical cell comprises at least one secondary-type cell.

25. The power system according to claim 24 wherein said at least one current controller comprises at least one recharging circuit.

26. The power system according to claim 23 further comprising:
a) at least one vehicular wheel structured and arrange to providing rolling vehicular motivation using such rotational torque;
b) wherein said at least one vehicular wheel comprises at least one vehicular mount structured and arranged to removably mount said at least one vehicular wheel to at least one vehicle.

27. The power system according to claim 26:
  a) wherein such at least one vehicle is structured and arrange to mountably receive said at least one vehicular wheel;
  b) wherein said at least one vehicle comprises
    i) at least one monitor structured and arranged to monitor the operational status of said at least one vehicular wheel, and
    ii) at least one user control structured and arranged to provide at least partial user control of the operation of said at least one current controller.

28. A transportation infrastructure system, related to servicing of at least one motor-battery equipped vehicle, said transportation infrastructure system, comprising:
  a) a plurality of recharging stations spaced along at least one route appropriate for vehicular travel use;
  b) wherein each recharging station of said plurality comprises
    i) at least one stock of motor-battery units, each one structured and arranged to be exchangeable with at least one motor-battery unit of such at least one motor-battery equipped vehicle,
    ii) at least one motor-battery exchanging apparatus structured and arranged to assist exchanging at least one electrically depleted motor-battery unit of such at least one motor-battery equipped vehicle with at least one electrically-charged motor-battery of said at least one stock of motor-battery units;
  c) wherein each said motor-battery unit comprises
    i) at least one magnetic field source structured and arranged to produce at least one magnetic field, and
    ii) at least one battery structured and arranged to produce electrical current from at least one electrochemical process;
  d) wherein said at least one battery comprises at least one battery electrode structured and arranged to conduct at least one flow of such electrical current;
  e) wherein interaction between such at least one flow of such electric current and such at least one magnetic field produces at least one electromotive force acting substantially directly on said at least one battery electrode; and
  f) wherein said at least one motor-battery unit is structured and arranged to convert such at least one electromotive force to at least one mechanical force usable to motivate such at least one motor-battery equipped vehicle.

29. The transportation infrastructure system according to claim 28 wherein each recharging station of said plurality further comprises at least one motor-battery charger structured and arranged to produce such at least one electrically charged motor-battery by recharging such at least one electrically-depleted motor-battery unit.

30. The transportation infrastructure system according to claim 28 wherein each recharging station of said plurality further comprises:
  a) at least one motor-battery analyzer structured and arranged to analyze such at least one electrically-depleted motor-battery unit;
  b) wherein said at least one motor-battery analyzer comprises at least one charge-status tester structured and arranged to test the charge status of such at least one electrically-depleted motor-battery unit.

31. The transportation infrastructure system according to claim 28 wherein said at least one motor-battery unit comprises:
  a) at least one vehicular wheel structured and arrange to providing rolling vehicular motivation using such at least one mechanical force;
  b) wherein said at least one vehicular wheel comprises at least one vehicular mount structured and arranged to removably mount said at least one vehicular wheel to at least one vehicle.

32. The transportation infrastructure system according to claim 28 wherein said at least one motor-battery exchanging apparatus comprises at least one automated wheel-mounting apparatus structured and arranged to provide substantially automated removal and mounting of said vehicular wheel.

33. A motor-battery vehicle system related to motivating at least one motorless-vehicle chassis comprising:
  a) at least one vehicle wheel structured and arranged to provide rolling support of such at least one motorless-vehicle chassis;
  b) wherein each said at least one vehicle wheel comprises
    i) contained substantially within said at least one vehicle wheel, at least one electrical motor structured and arranged to apply to said at least one vehicle wheel at least one rotational force usable to motivate such at least one motorless-vehicle chassis,
    ii) contained substantially within said at least one vehicle wheel, at least one battery structured and arranged to supply operating electrical current to said at least one electrical motor, and
    iii) at least one mount structured and arranged to rotationally mount said at least one vehicle wheel to such at least one vehicle chassis;
  c) wherein motivation of such at least one motorless-vehicle chassis by said at least one vehicle wheel is accomplished by operation of said at least one electrical motor utilizing such operating electrical current provided substantially entirely by said at least one battery contained substantially within said at least one vehicle wheel.

34. A method, related to motivating at least one motorless-vehicle chassis, comprising the steps of:
  a) offering to provide at least one motor-containing vehicle wheel structured and arranged to provide rolling motivation of such at least one vehicle chassis when mounted thereon;
  b) arranging with at least one entity associated with the operation of such at least one motorless-vehicle chassis, at least one contract providing for the use of such at least one motor-containing vehicle wheel by such at least one entity; and
  c) receiving from such at least one entity, at least one compensation for such use;
  d) providing for delivery of such at least one motor-containing vehicle wheel to such at least one entity.

35. The method according to claim 34 further comprising the step of establishing, within such at least one contract, at least one lease arrangement for such use of such at least one motor-containing vehicle wheel by such at least one entity.

36. The method according to claim 34 further comprising the step of providing within each such at least one motor-containing vehicle wheel, at least one battery structured and arranged to electrically power such at least one motor-containing vehicle wheel.

37. The method according to claim 36 further comprising the steps of:
  a) establishing a plurality of recharging stations spaced along at least one route appropriate for vehicular travel use; and
  b) providing within each such recharging station of said plurality
    i) at least one stock of such at least one motor-containing vehicle wheels, ii) at least one wheel-exchanging apparatus structured and arranged to assist exchanging at least one electrically-depleted motor-containing vehicle wheel of such at least one motorless-vehicle chassis with at least one electrically-charged motor-containing vehicle wheel of such at least one stock, iii) at least one charge-status tester structured and arranged to test the charge status of such at least one battery, and iv) at least one transaction processor to process at least one payment transaction associated with the exchange of such at least one electrically-depleted motor-containing vehicle wheel with such at least one electrically-charged motor-containing vehicle wheel.

38. The method according to claim 37 further comprising the steps of:

a) exchanging at least one electrically-depleted motor-containing vehicle wheel of such at least one motorless-vehicle chassis with at least one electrically-charged motor-containing vehicle wheel of such at least one stock;

b) testing the charge status of such at least one battery; and c) processing at least one payment transaction associated with the exchange of such at least one electrically-depleted motor-containing vehicle wheel with such at least one electrically-charged motor-containing vehicle wheel.

39. A power system comprising:

a) at least one magnetic field source structured and arranged to produce at least one magnetic field having lines of flux extending in at least one first direction;

b) at least one electrochemical energy source structured and arranged to produce at least one electrical potential from at least one electrochemical process; and c) at least one positioner structured and arranged to position said at least one electrochemical energy source in at least one position of interaction with such at least one magnetic field;

d) wherein said at least one electrochemical energy source comprises at least one electrode structured and arranged to conduct at least one flow of electrical current, derived from such at least one electrical potential, in at least one second direction perpendicular to such first direction;

e) wherein interaction between such at least one electric current and such at least one magnetic field produces at least one magnetic force acting substantially directly on said at least one electrochemical energy source in a third direction perpendicular to both such at least one first direction and said at least one second direction; and f) wherein action of such at least one magnetic force on said at least one electrochemical energy source produces at least one useable mechanical force.

* * * * *

UNITED STATES PATENT AND TRADEMARK OFFICE
CERTIFICATE OF CORRECTION

| | | |
|---|---|---|
| PATENT NO. | : 7,659,680 B1 | |
| APPLICATION NO. | : 12/508507 | |
| DATED | : February 9, 2010 | |
| INVENTOR(S) | : McVickers | |

It is certified that error appears in the above-identified patent and that said Letters Patent is hereby corrected as shown below:

Col. 41 Claim 7, lines 64 to 67 "wherein such at least one supportive substrate comprises at least one substantially flexible ribbon having a longitudinal length substantially greater that its maximum width." should read --wherein such at least one supportive substrate comprises at least one substantially flexible ribbon having a longitudinal length substantially greater than its maximum width.--

Col. 42 Claim 8, lines 3 to 5 "at least one at least one commutator structured and arranged to dynamically control current flow within said at least one wound magnetic field coil;" should read --at least one commutator structured and arranged to dynamically control current flow within said at least one wound magnetic field coil:--

Col. 44 Claim 26, lines 61 to 63 "at least one vehicular wheel structured and arrange to providing rolling vehicular motivation using such rotational torque;" should read --at least one vehicular wheel structured and arranged to providing rolling vehicular motivation using such rotational torque ;--

Col. 45 Claim 27, lines 2 to 4 "wherein such at least one vehicle is structured and arrange to mountably receive said at least one vehicular wheel;" should read --wherein such at least one vehicle is structured and arranged to mountably receive said at least one vehicular wheel;--

Col. 46 Claim 31, lines 65 to 68 "at least one vehicular wheel structured and arrange to providing rolling vehicular motivation using such at least one mechanical force;" should read --at least one vehicular wheel structured and arranged to providing rolling vehicular motivation using such at least one mechanical force;--

Signed and Sealed this
Fourteenth Day of June, 2011

David J. Kappos
*Director of the United States Patent and Trademark Office*